United States Patent
Mercado

(10) Patent No.: US 9,874,721 B2
(45) Date of Patent: Jan. 23, 2018

(54) CAMERA LENS SYSTEM

(71) Applicant: Apple Inc., Cupertino, CA (US)

(72) Inventor: Romeo I. Mercado, Fremont, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/830,646

(22) Filed: Aug. 19, 2015

(65) Prior Publication Data

US 2016/0231533 A1 Aug. 11, 2016

Related U.S. Application Data

(60) Provisional application No. 62/113,970, filed on Feb. 9, 2015.

(51) Int. Cl.
  *G02B 3/02* (2006.01)
  *G02B 13/08* (2006.01)
  (Continued)

(52) U.S. Cl.
  CPC ........... *G02B 13/0045* (2013.01); *G02B 9/62* (2013.01); *G02B 13/0085* (2013.01);
  (Continued)

(58) Field of Classification Search
  CPC ................ G02B 13/0045; G02B 13/18; G02B 13/0085; G02B 9/62; G02B 9/64; G02B 1/041
  (Continued)

(56) References Cited

U.S. PATENT DOCUMENTS 4,550,987 A  11/1985 Tachihara
4,902,115 A  2/1990 Takahashi
(Continued)

FOREIGN PATENT DOCUMENTS

CN  101750706 A  6/2010
CN  103199926 A  12/2016
(Continued)

OTHER PUBLICATIONS

PCT/US2016/022150 filed Mar. 11, 2016, Invitation to Pay Additional Fees, dated Jun. 15, 2016.
(Continued)

*Primary Examiner* — Mahidere Sahle
(74) *Attorney, Agent, or Firm* — Blakely Sokoloff Taylor & Zafman LLP

(57) ABSTRACT

An optical imaging lens assembly that may have six lens components. The first, third, fourth, and fifth lens components may have positive refractive power. The second and sixth lens components may have negative refractive power. The lens assembly may satisfy the relation $|f/f_5|+|f/f_6|<1.4$, wherein f is a focal length of the optical imaging lens assembly, $f_5$ is a focal length of the fifth lens component, $f_6$ is a focal length of the sixth lens component. The lens assembly may also satisfy the further relation $0.8<|f/f_5|+|f/f_6|$. The first lens component may include a wafer lens having a lens element molded on one or both surfaces of a planar substrate or two wafer lenses having a lens element molded on one surface of each of two planar substrates. The wafer lens may include an electrically controlled electrochromic surface having variable light transmittance.

23 Claims, 40 Drawing Sheets

(51) Int. Cl.
*G02B 13/00* (2006.01)
*G02B 27/00* (2006.01)
*G02F 1/157* (2006.01)
*H04N 5/225* (2006.01)
*G02B 9/62* (2006.01)

(52) U.S. Cl.
CPC ......... *G02B 27/0025* (2013.01); *G02F 1/157* (2013.01); *H04N 5/2252* (2013.01); *H04N 5/2254* (2013.01)

(58) Field of Classification Search
USPC .................................................. 359/642–830
See application file for complete search history.

(56) References Cited

U.S. PATENT DOCUMENTS

| | | | |
|---|---|---|---|
| 8,599,495 | B1 | 12/2013 | Tsai et al. |
| 8,599,498 | B2 | 12/2013 | Tsai et al. |
| 8,743,482 | B1 | 6/2014 | Tsai et al. |
| 8,749,896 | B2 | 6/2014 | Shinohara |
| 8,760,774 | B2 | 6/2014 | Lai et al. |
| 8,830,595 | B2 | 9/2014 | Huang |
| 8,867,149 | B2 | 10/2014 | Hsu et al. |
| 9,341,819 | B2 | 5/2016 | Chen et al. |
| 9,366,842 | B2 | 6/2016 | Chen et al. |
| 9,435,983 | B2 | 9/2016 | Liao et al. |
| 2003/0227664 | A1 | 12/2003 | Anoop et al. |
| 2011/0002053 | A1 | 1/2011 | Ovrutsky et al. |
| 2011/0255856 | A1 | 10/2011 | Pavel et al. |
| 2011/0261429 | A1 | 10/2011 | Sbar et al. |
| 2012/0188654 | A1 | 7/2012 | Huang |
| 2013/0016261 | A1 | 1/2013 | Tanaka et al. |
| 2013/0050846 | A1 | 2/2013 | Huang |
| 2013/0215489 | A1 | 8/2013 | Forrest et al. |
| 2013/0301147 | A1 | 11/2013 | Yamada |
| 2013/0329306 | A1 | 12/2013 | Tsai et al. |
| 2014/0153117 | A1* | 6/2014 | Hagiwara .......... G02B 13/0045 359/757 |
| 2014/0192422 | A1 | 7/2014 | Tang et al. |
| 2015/0103414 | A1 | 4/2015 | Baik |
| 2015/0153546 | A1 | 6/2015 | Tang et al. |
| 2015/0160435 | A1 | 6/2015 | Chen et al. |

FOREIGN PATENT DOCUMENTS

| | | |
|---|---|---|
| EP | 2708929 A2 | 3/2014 |
| EP | 2860564 A1 | 4/2015 |
| JP | 2007322604 A | 12/2007 |
| JP | 2014123034 A | 7/2014 |
| JP | 5651881 B1 | 1/2015 |
| TW | 201239446 A | 10/2012 |
| TW | 201317619 A | 5/2013 |
| TW | 201413284 A | 4/2014 |
| TW | 201413284 A | 4/2014 |
| TW | 201421062 A | 6/2014 |
| TW | 201433813 A | 9/2014 |
| TW | 201435383 A | 9/2014 |
| TW | 201441660 A | 11/2014 |
| TW | 104297904 A | 1/2015 |
| TW | 201502570 A | 1/2015 |
| TW | 201504673 A | 2/2015 |
| TW | 201508318 A | 3/2015 |
| TW | 201514534 A | 4/2015 |
| TW | M498897 | 4/2015 |

OTHER PUBLICATIONS

PCT Invitation to Pay Additional Fees and, Where Applicable, Protest Fee, for PCT/US2016/014626, dated Apr. 25, 2016.
Office Action dated Dec. 22, 2016 for Taiwan Application No. 105109903 (with English Translation).
Office Action dated Jan. 11, 2017 for U.S. Appl. No. 14/830,650.
PCT/US2016/022150, Notification of Transmittal of the International Search Report and the Written Opinion of the International Searching Authority, or the Declaration, dated Aug. 9, 2016.
PCT/US2016/014626, Notification of Transmittal of the International Search Report and the Written Opinion of the International Searching Authority, or the Declaration, dated Aug. 11, 2016.
PCT/US2016/024365, Notification of Transmittal of the International Search Report and the Written Opinion of the International Searching Authority, or the Declaration, dated Aug. 16, 2016.
PCT/US2016/014626, Invitation to Pay Additional Fees, dated Apr. 25, 2016.
PCT/US2016/024365, Invitation to Pay Additional Fees, dated Jun. 17, 2016.
U.S. Appl. No. 14/830,650, Office Action dated Jan. 11, 2017.
Office Action for ROC (Taiwan) Patent Application No. 105111549 dated Jun. 22, 2017 w/English translation.
ROC (Taiwan) Pat. Appln. No. 105103860, Office Action dated Mar. 8, 2017.
ROC (Taiwan) Pat Appln. No. 105111549, Office Action dated Mar. 1, 2017.

* cited by examiner

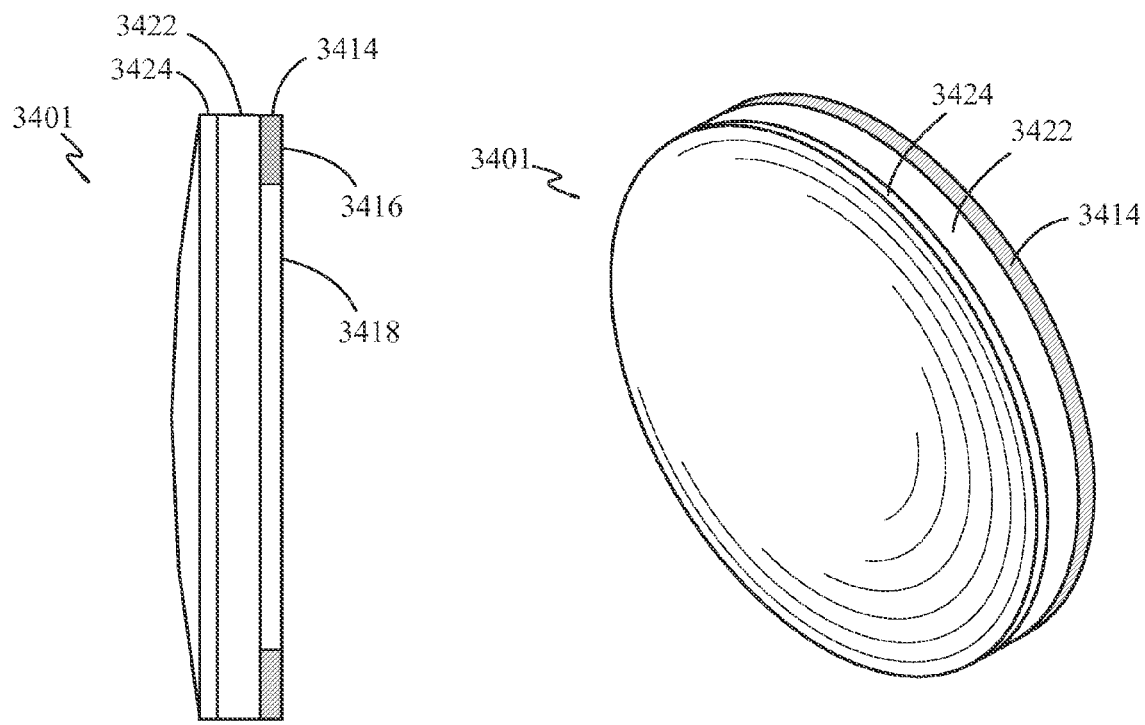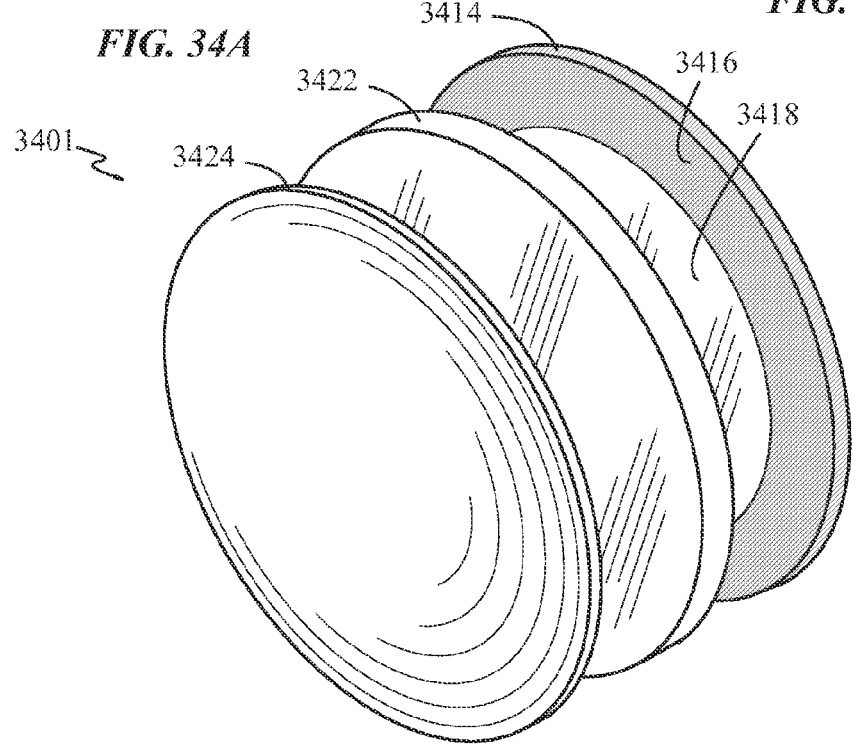
FIG. 34A
FIG. 34B
FIG. 34C

CAMERA LENS SYSTEM

CROSS REFERENCE TO RELATED APPLICATIONS

This application claims the benefit pursuant to 35 U.S.C. 119(e) of U.S. Provisional Application No. 62/113,970, filed Feb. 9, 2015, which application is specifically incorporated herein, in its entirety, by reference.

BACKGROUND

Field

Embodiments of the invention relate to the field of lenses including a nonspherical surface; and more specifically, to lenses having six components.

Background

The advent of small mobile multipurpose devices such as smartphones, tablet or pad devices and laptop computers has resulted in a need for high resolution small form factor cameras for integration in the devices. However, due to limitations of conventional camera technology, conventional small cameras used in such devices tend to capture images at lower resolutions and/or with lower image quality than can be achieved with larger high quality cameras. Achieving higher resolution with small package size cameras generally requires use of photosensor with small pixel size and a high quality compact imaging lens system. Advances in technology have achieved reduction of the pixel size in photosensor. However, as photosensor become more compact and powerful, demand for compact imaging lens system with improved imaging quality performance has increased.

SUMMARY

Embodiments of the present disclosure may provide camera lens system designs with a large field of view (FOV) and a large aperture (low F-number) that can capture high resolution images at low background light levels for integration into electronic devices. Embodiments of the present disclosure also may provide a camera lens system design that can incorporate devices to vary the lens system focal ratio and allow adjustment of the depth of field (DOF) or exposure level of the image sensor array.

In some embodiments, an optical imaging lens assembly may be provided with six lens components. The first, fourth, and fifth lens components may have positive refractive power. The sixth lens component may have negative refractive power. One of the second or third lens components may have positive refractive power and the other have negative refractive power. The lens assembly may satisfy the relation $|f/f_5|+|f/f_6|<1.4$, wherein f is a focal length of the optical imaging lens assembly, $f_5$ is a focal length of the fifth lens component, $f_6$ is a focal length of the sixth lens component. The lens assembly may satisfy the further relation $0.8<|f/f_5|+|f/f_6|$. The first lens component may include a wafer lens having a lens element molded on one or both surfaces of a planar substrate or two wafer lenses having a lens element molded on one surface of each of two planar substrates. The wafer lens may include an electrochromic surface having variable light transmittance in response to an applied electrical voltage.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements:

FIG. 34A shows a side elevation of a wafer lens component.

FIG. 34B shows a pictorial view of the wafer lens component shown in FIG. 34A.

FIG. 34C shows an exploded pictorial view of the wafer lens component shown in FIG. 34A.

DETAILED DESCRIPTION

Figure 1:
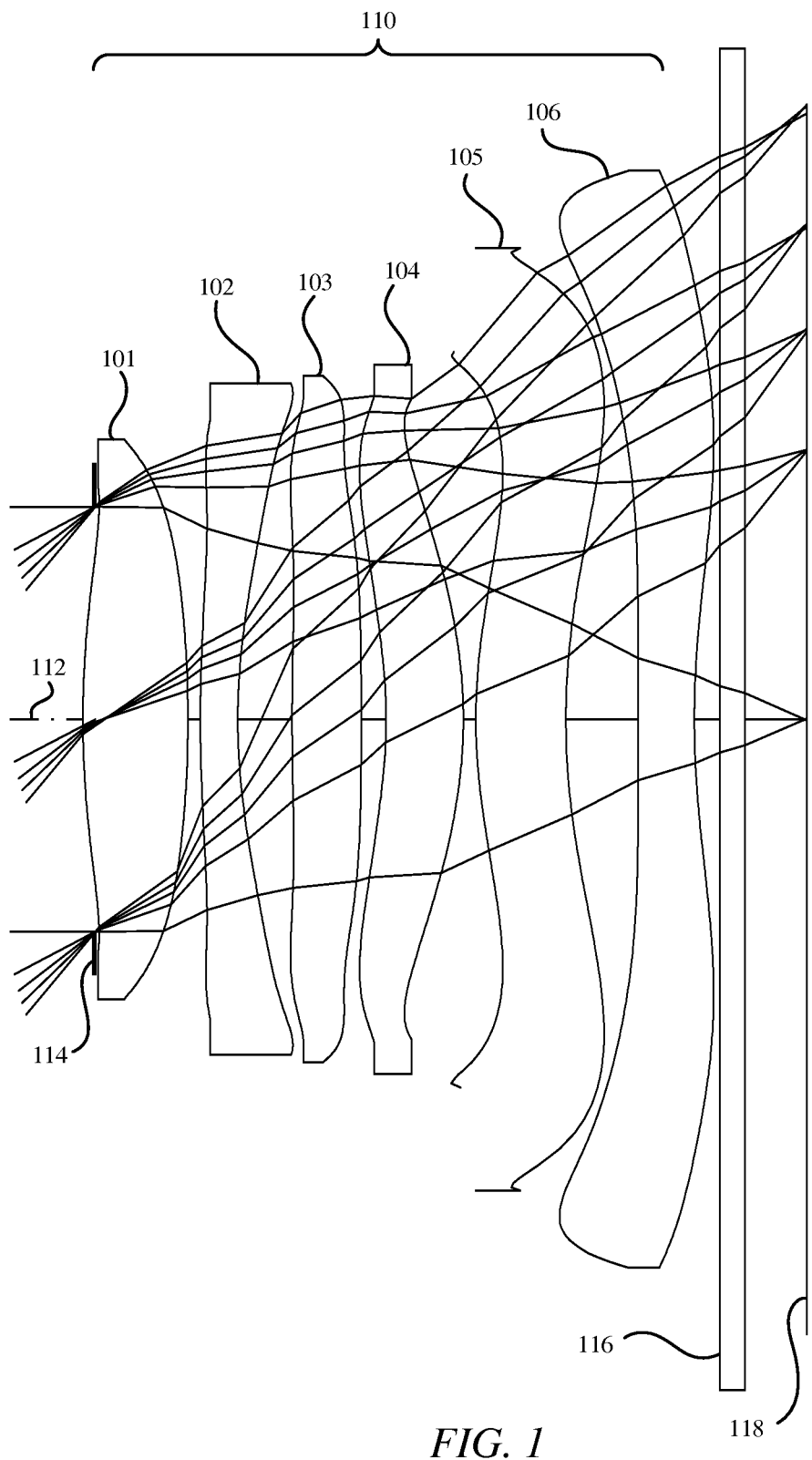
FIG. 1 is a cross-sectional illustration of an example embodiment of a lens system that includes six refractive lens elements.

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The term "element" as applied to a lens designates any single transparent mass of refractive material having two opposed refracting surfaces, which surfaces are disposed transversely of the optical axis of the lens and spaced therealong.

The term "component" as applied to a lens designates either (1) a single transparent mass of refractive material having two opposed refracting surfaces, i.e. an element, or (2) a grouped plurality of such masses arranged in series along the optical axis of the lens with their adjacent refracting surfaces either in full overall contact or in spaced parallel relation with the spacing being of such small magnitude that it does not enter into the lens computations.

The term "convex" as applied to a lens surface indicates that the lens surface is convex where the surface intersects the optical axis. The term "concave" as applied to a lens surface indicates that the lens surface is concave where the surface intersects the optical axis.

Embodiments of small form factor camera including a photosensor and a compact lens system with a large field of view (FOV) and a large aperture (low F-number) are described. Various embodiments of a compact lens system including six lens components with refractive power, including lens systems having wafer lens components, are described. These embodiments of compact lens systems may be used in the camera and provide a larger image with a lower F-number (larger aperture) than has been realized in conventional compact cameras. The camera may be implemented in a small package size while still capturing sharp, high resolution images, making embodiments of the camera suitable for use in small and/or mobile multipurpose devices such as cell phones, smartphones, pad or tablet computing devices, laptop, netbook, notebook, subnotebook, ultrabook computers, surveillance devices, and so on. However, aspects of the camera (e.g., the lens system and photosensor) may be scaled up or down to provide cameras with larger or smaller package sizes. In addition, embodiments of the camera system may be implemented as stand-alone digital cameras. In addition to still (single frame capture) camera applications, embodiments of the camera system may be adapted for use in video camera applications.

Embodiments of the compact lens systems are described for potential application to cameras having a ⅓ inch (6.15 mm diagonal) sensor. Example embodiments of lens systems may have about a 4.1 mm EFL (effective focal length), F/1.8 aperture size, and 77.6-degree diagonal field of view (DFOV) (6.6-mm image circle diameter). Several example embodiments of compact low F-number lens systems are described, including embodiments with a wafer lens component that includes an electrochromic aperture mechanism and five additional refracting lens components and example embodiments with six refracting lens components.

Figure 4:
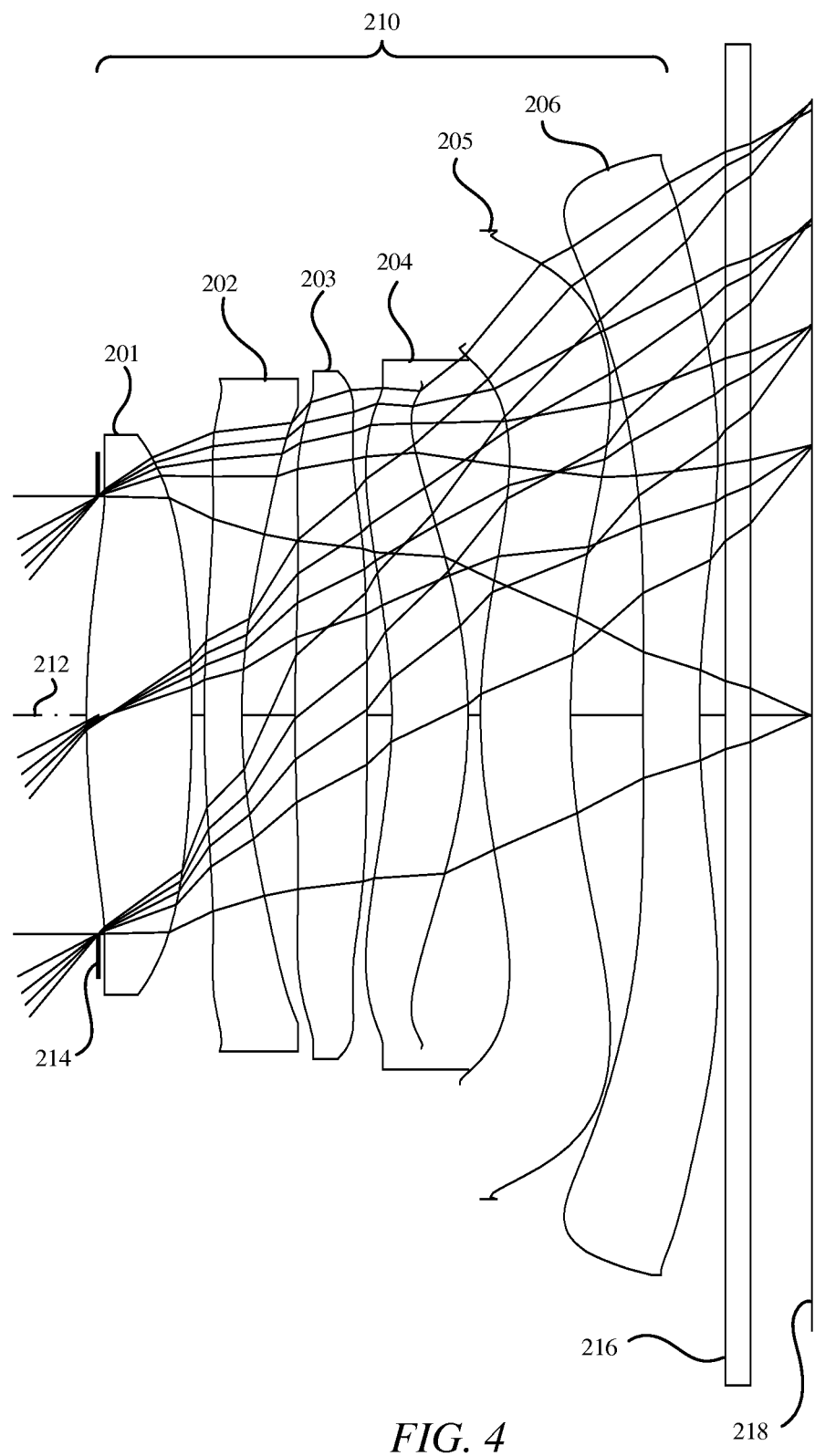
FIG. 4 is a cross-sectional illustration of another example embodiment of a lens system that includes six refractive lens elements.
Figure 19:
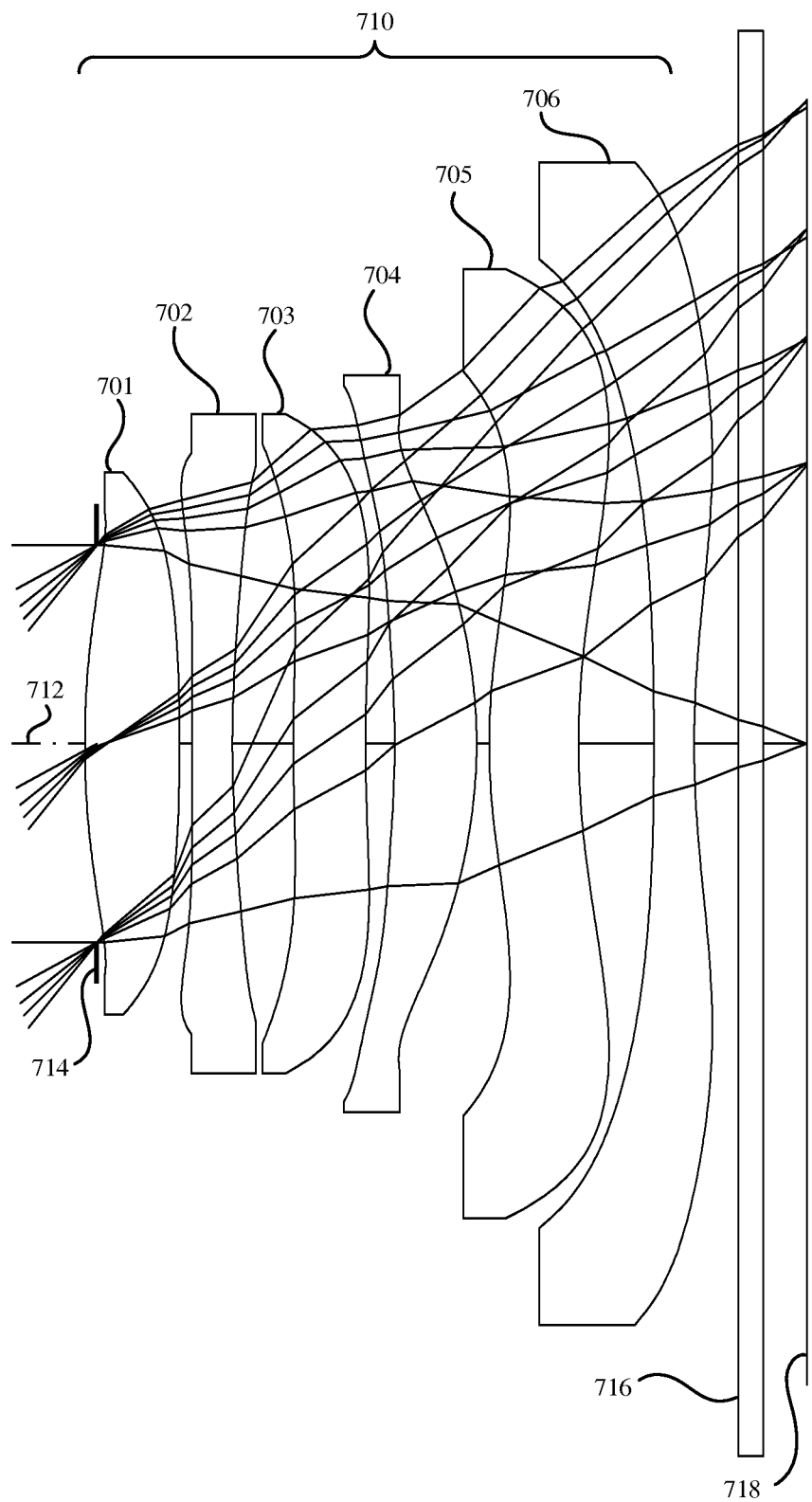
FIG. 19 is a cross-sectional illustration of another example embodiment of a lens system that includes six refractive lens elements.
Figure 22:
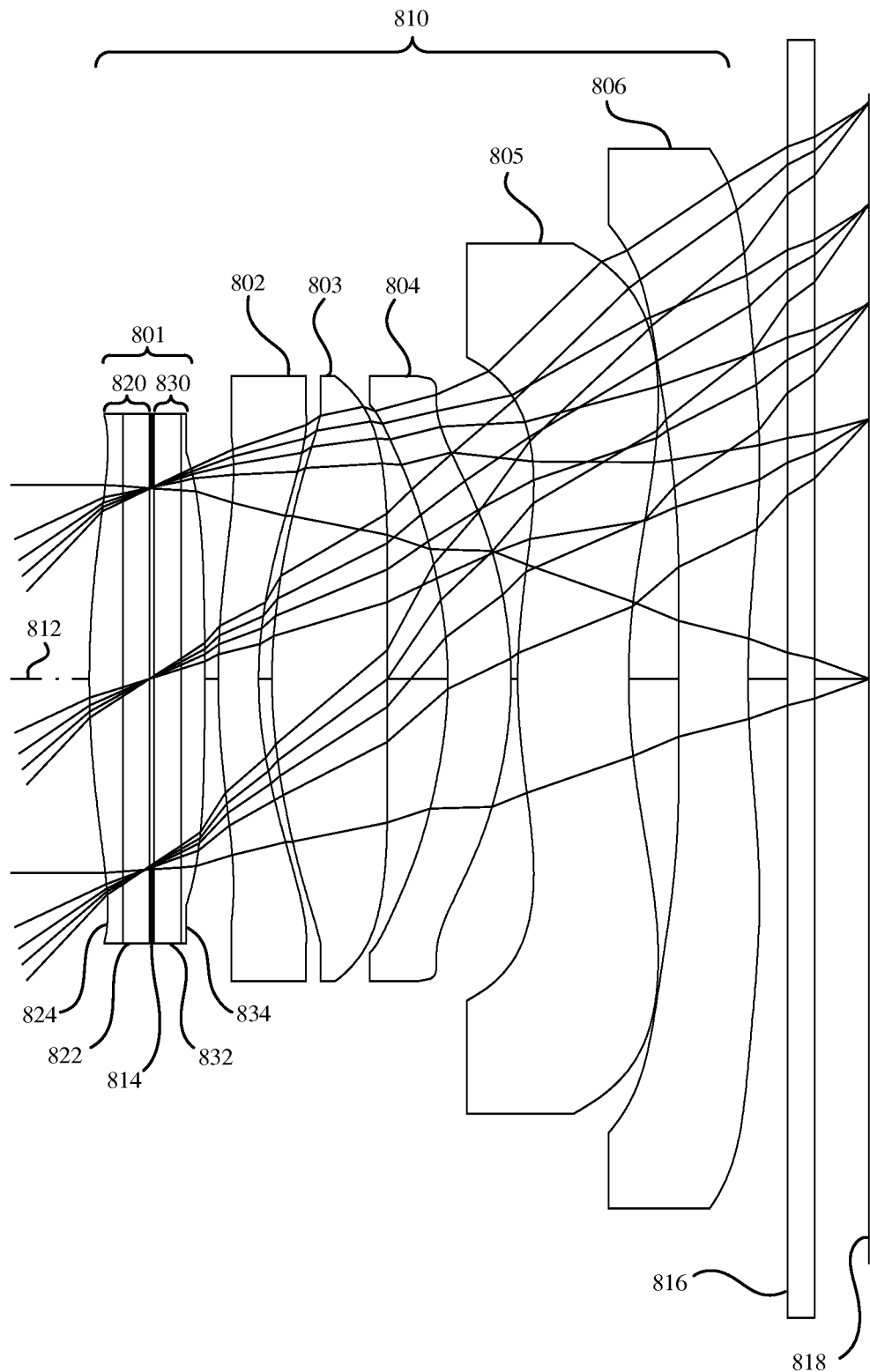
FIG. 22 is a cross-sectional illustration of another example embodiment of a lens system that includes two wafer lens components and five refractive lens elements.
Figure 25:
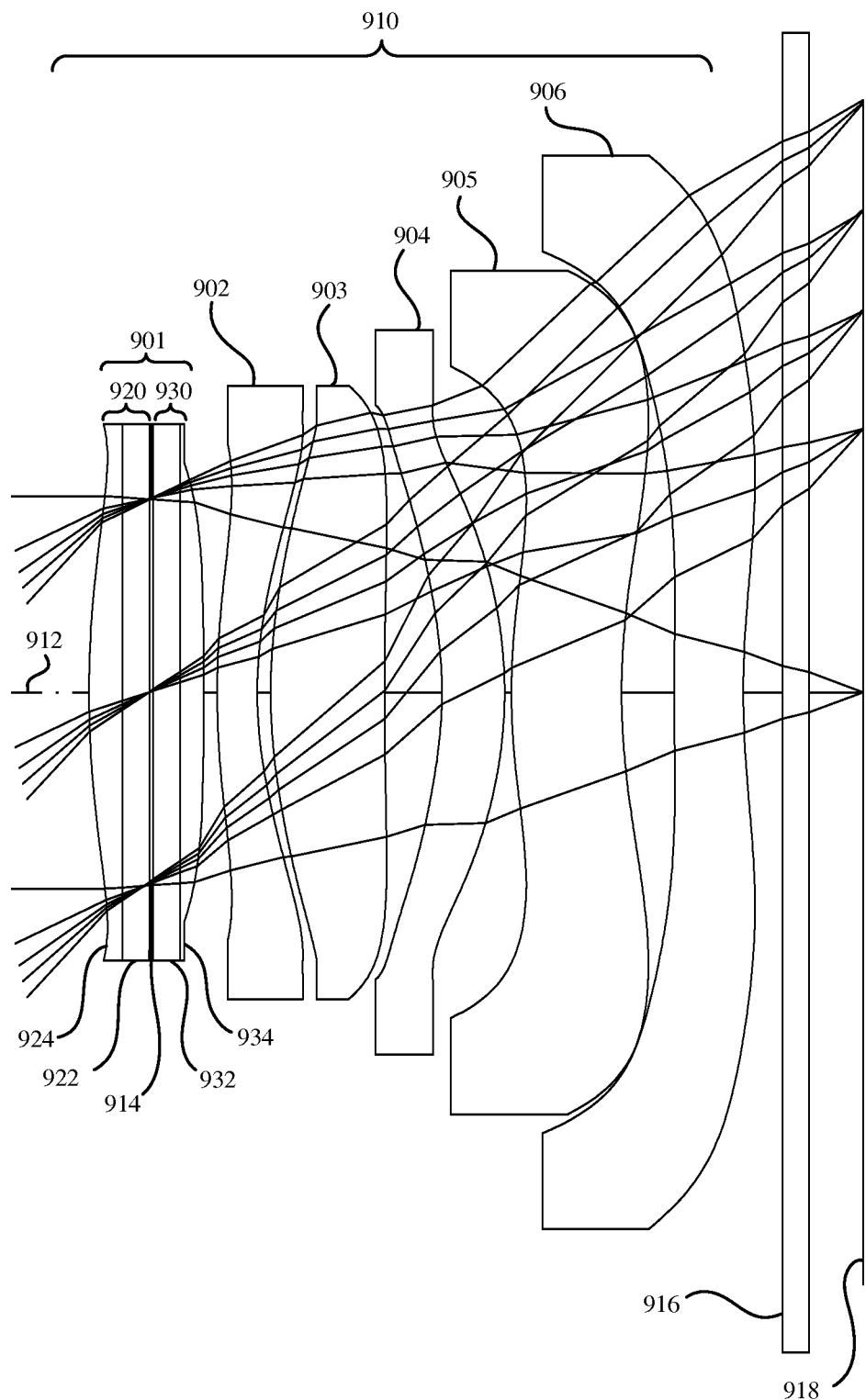
FIG. 25 is a cross-sectional illustration of another example embodiment of a lens system that includes two wafer lens components and five refractive lens elements.

FIGS. 1, 4, and 19 show various example embodiments that include six refracting lens components. FIGS. 7, 10, 13, 16, 28, and 31 show various example embodiments that include a wafer lens component, with front and/or rear layers of polymeric materials, and five additional refracting lens components. FIGS. 22 and 25 show various example embodiments that include a wafer lens component, which includes two wafer lens components, and five additional refracting lens elements. These examples are not intended to be limiting, and variations on the various parameters given for the lens system are possible while still achieving similar results.

The refractive lens components in the various embodiments may be composed of plastic materials. In at least some embodiments, the refractive lens elements may be composed of injection molded plastic material. However, other transparent optical materials may be used. Also note that, in a given embodiment, different ones of the lens elements may be composed of materials with different optical characteristics, for example different Abbe numbers and/or different refractive indices. The wafer lens components in the embodiments may be composed of a single or multiple layer laminate of polymeric or plastic materials on a planar substrate, which may be a planar glass substrate.

The camera may also include a frontal aperture stop (AS) located in front of (i.e., on the object side of) a first lens component. While FIGS. 1, 4, 7, 13, and 19 show frontal aperture stop located at or near the front vertex of the lens system, location of the aperture stop may be closer to or farther away from the vertex of the lens component. Further, in some embodiments, the aperture stop may be located elsewhere in the lens system as shown in FIGS. 22 and 25. For example, the aperture stop may be located at the planar surface of the wafer lens component as shown in FIGS. 10, 16, 22, 25, 28, and 31.

The camera may also, but not necessarily, include an infrared (IR) filter located between a last lens component of the lens system and the photosensor. The IR filter may, for example, be composed of a glass material. However, other materials may be used. Note that the IR filter does not affect the effective focal length of the lens system. Further note that the camera may also include other component than those illustrated and described herein.

In the camera, the lens system forms an image at an image plane (IP) at or near the surface of the photosensor. The image size for a distant object is directly proportional to the effective focal length (f) of a lens system. The total track length (TTL) of the lens system is the distance on the optical axis (AX) between the front vertex at the object side surface of the first (object side) lens component and the image plane. For lens system having a large FOV and a low F-number, the TTL is normally greater than the effective focal length.

In at least some embodiments, the lens system may be configured such that the effective focal length f of the lens system is at or about 4.1 millimeters (mm), the F-number (focal ratio, or F-number) is at or about 1.8, the field of view (FOV) is at or about 77.6 degrees (although narrower or wider FOVs may be achieved), and the total track (TTL) is within the range of about 4.5 mm to about 7 mm. More generally, the lens system may be configured to satisfy the relation TTL/f>1.0.

In some example embodiments described herein, the lens system may be configured such that the effective focal length f of the lens system is 4.1 mm at reference wavelength 555 nm and the F-number is 1.8. The lens system may, for example, be configured with focal length f of 4.1 mm and F-number of 1.8 to satisfy specified optical, imaging, and/or packaging constraints for particular camera system applications. Note that the F-number, also referred to as the focal ratio or F-number is defined by f/D, where D is the diameter of the entrance pupil, i.e., the effective aperture. As an example, at f=4.1 mm, an F-number of 1.8 is achieved with an effective aperture diameter of 2.28 mm. The example embodiment may also be configured with a field of view (FOV) at or about 77.6 degrees, a half FOV at or about 38.8 degrees. Total track length (TTL) of the example embodiments vary from about 5.8 mm to about 6.0 mm. The ratio of TTL/f varies within the range of about 1.4 mm to about 1.5 mm for the example embodiments.

However, note that the focal length f, F-number, and/or other parameters may be scaled or adjusted to meet various specifications of optical, imaging, and/or packaging constraints for other camera system applications. Constraints for a camera system that may be specified as requirements for particular camera system applications and/or that may be varied for different camera system applications include but are not limited to the focal length f, effective aperture, F-number, field of view (FOV), imaging performance requirements, and packaging volume or size constraints.

In some embodiments, the lens system may be equipped with an adjustable iris (entrance) pupil or aperture stop. Using an adjustable aperture stop, the F-number (focal ratio) may be dynamically varied within a range. For example, if the lens is well corrected at f/1.8, at a given focal length f and FOV, then the focal ratio may be varied within the range of 1.8 to 6 (or higher) by adjusting the aperture stop, assuming that the aperture stop can be adjusted to the desired F-number setting. In some embodiments, the lens system may be used at faster focal ratios (F-number<1.8) by adjusting the aperture stop with degraded image quality performance at the same FOV (e.g. 77.6 degrees), or with reasonably good performance at a smaller FOV.

In some embodiments, the lens system may also be equipped with a focusing mechanism for focusing an object scene at infinity (object scene distance from camera>20 meters) to near object distance (<50 mm). For example, in some embodiments, the lens system as described herein may be equipped with adjustable focus mechanism wherein the lens system and/or photosensor at the image plane may be moved for focusing an object scene at distances ranging from greater than 20 meters to less than 50 mm.

While ranges of values may be given herein as examples of adjustable cameras and lens systems in which one or more optical parameters may be dynamically varied (e.g., using adjustable aperture stop and/or adjustable focus), embodiments of camera systems that include fixed (non-adjustable) lens systems in which values for optical and other parameters are within these ranges may be implemented.

Referring first to embodiments as illustrated in FIGS. 1, 4, and 19, a compact lens system 110, 210, 710 suitable for use in a camera may include six lens components. The six lens components 101-106 in the lens system 110 of FIG. 1, the six lens components 201-206 in the lens system 210 of FIG. 4, and the six lens components 701-706 in the lens system 710 of FIG. 19 each have a refractive power and form a lens system having a focal length of f. The six lens components of each of the lens systems 110, 210, 710 are arranged along an optical axis (AX) 112, 212, 712 from an object side to an image side as follows:

- a first lens component 101, 201, 701 having a positive refractive power, a focal length $f_1$, and a convex object side surface;
- a second lens component 102, 202, 702 having a negative refractive power and a focal length $f_2$;
- a third lens component 103, 203, 703 having a positive refractive power and a focal length $f_3$;
- a fourth lens component 104, 204, 704 having a positive refractive power and a focal length $f_4$;
- a fifth lens component 105, 205, 705 having a positive refractive power and a focal length $f_5$; and
- a sixth lens component 106, 206, 706 having a negative refractive power and a focal length $f_6$.

In addition, at least one surface, the object side or the image side, of each of the six lens components is aspheric. In some embodiments both the object side surface and the image side surface of one or more of the six lens components is aspheric.

The lens systems 110, 210, 710 form an image on or near the surface of an image sensor 118, 218, 718. A cover material 116, 216, 716, such as a cover glass or an infrared cut filter, may be placed between the lens systems 110, 210, 710 and the image sensor 118, 218, 718. A frontal aperture stop (AS) 114, 214, 714 may be located on the object side of the first lens component 101, 201, 701.

Embodiments of a camera lens system as described herein and illustrated in FIGS. 1, 4, and 19 may be configured such that the dioptric power distribution of the six lens components satisfy the following conditions:

$$0.8<|f_1/f|<1.5;$$

$$1.0<|f_2/f|<2.0;$$

$$1.0<|f_3/f|<30.0;$$

$$1.0<|f_4/f|<7.0;$$

$$1.0<|f_5/f|<4.0;$$

$$0.8<|f_6/f|<2.0;$$

where f is the effective focal length of the lens system.

The lens systems 110, 210, 710 are configured such that the ratio (TTL/f) satisfies the relation:

$$1.0<TTL/f<1.5.$$

In at least some embodiments of lens systems 110, 210, and 710, the lens components with positive dioptric powers may be composed of a material (e.g., a plastic material) having an Abbe number of $V_1$. The second, and sixth lens components with negative dioptric powers may be composed of a material (e.g., plastic material) having an Abbe number of $V_2$. The Abbe numbers of the lens materials for the lens components may satisfy the condition:

$$30<V_1-V_2<35.$$

Referring now to embodiments as illustrated in FIGS. 7, 10, 13, and 16, a compact lens system 310, 410, 510, 610 suitable for use in a camera may include six lens components. The six lens components 301-306 in the lens system 310 of FIG. 7, the six lens components 401-406 in the lens system 410 of FIG. 10, the six lens components 501-506 in the lens system 510 of FIG. 13, and the six lens components 601-606 in the lens system 610 of FIG. 16 each have a refractive power and form a lens system having a focal length of f.

Figure 16:
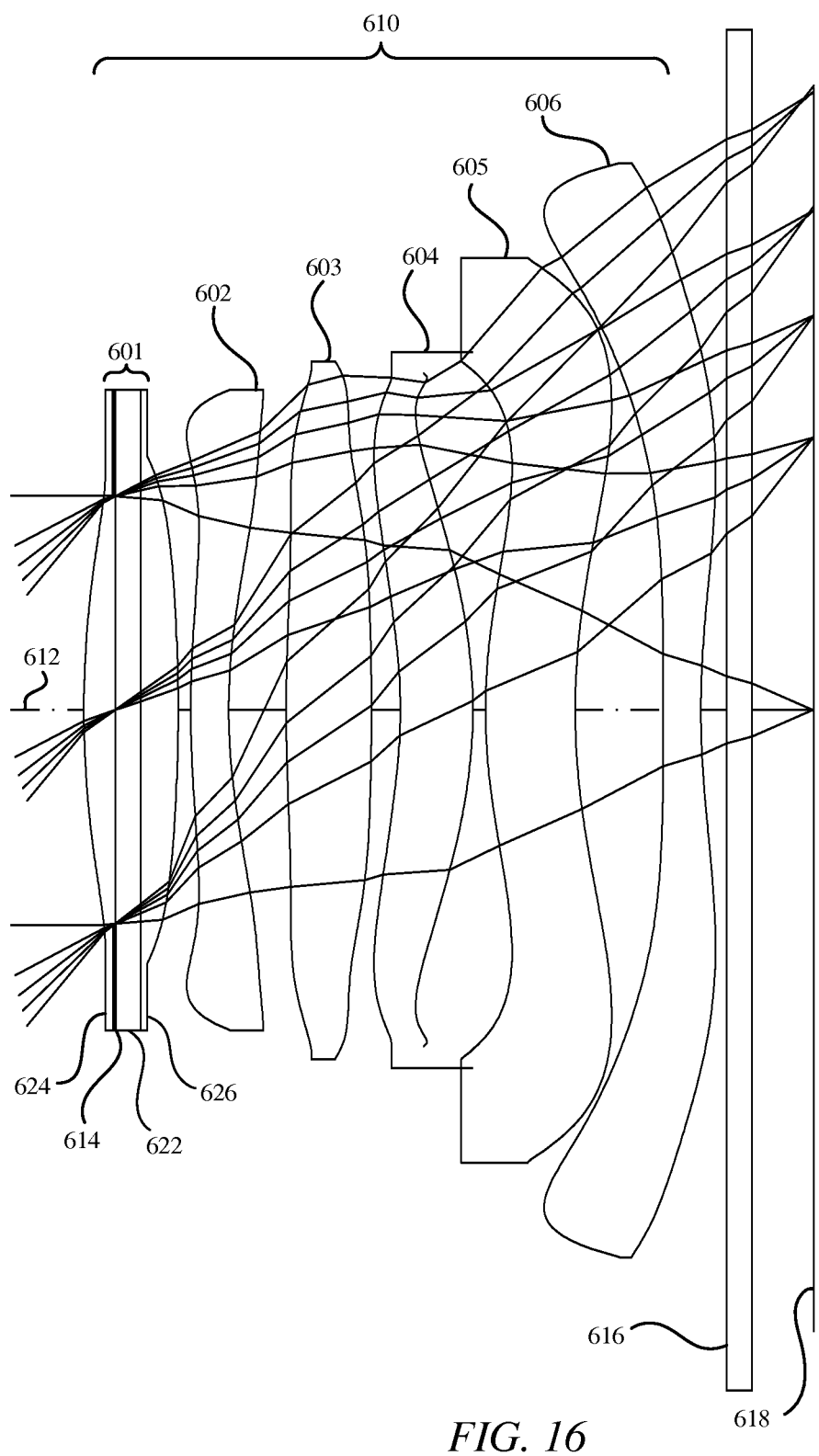
FIG. 16 is a cross-sectional illustration of another example embodiment of a lens system that includes a wafer lens component and five refractive lens elements.

The first lens component 301, 401, 501, 601 of the embodiments illustrated in FIGS. 7, 10, 13, and 16 is in the form of a wafer lens component in which a laminate layer of polymeric or plastic materials is formed on a planar substrate, which may be a planar glass substrate. The remaining five lens components, 302-306 in the lens system 310 of FIG. 7, 402-406 in the lens system 410 of FIG. 10, 502-506 in the lens system 510 of FIG. 13, and 602-606 in the lens system 610 of FIG. 16, are shown as lens elements formed of a single transparent mass of refractive material. In other embodiments, not shown, one or more of the remaining five lens components may be a grouped plurality of such masses arranged in series, such as an additional wafer lens component. The six lens components of each of the lens systems 310, 410, 510, 610 are arranged along an optical axis (AX) 312, 412, 512, 612 from an object side to an image side as follows:

- a first lens component 301, 401, 501, 601 in the form of a wafer lens component, having a positive refractive power, a focal length $f_1$, and a convex object side surface;
- a second lens component 302, 402, 502, 602 having a negative refractive power and a focal length $f_2$;
- a third lens component 303, 403, 503, 603 having a positive refractive power and a focal length $f_3$;
- a fourth lens component 304, 404, 504, 604 having a positive refractive power and a focal length $f_4$;
- a fifth lens component 305, 405, 505, 605 having a positive refractive power and a focal length $f_5$; and
- a sixth lens component 306, 406, 506, 606 having a negative refractive power and a focal length $f_6$.

In addition, at least one surface, the object side or the image side, of each of the six lens components is aspheric. In some embodiments both the object side surface and the image side surface of one or more of the six lens components is aspheric.

The lens systems 310, 410, 510, 610 form an image on or near the surface of an image sensor 318, 418, 518, 618. A cover material 316, 416, 516, 616, such as a cover glass or an infrared cut filter, may be placed between the lens systems 310, 410, 510, 610 and the image sensor 318, 418, 518, 618. A frontal aperture stop (AS) 314, 514, may be located on the object side of the first lens component 301, 501.

Embodiments of a camera lens system as described herein and illustrated in FIGS. 7, 10, 13, and 16 may be configured such that the dioptric power distribution of the six lens components satisfy the following conditions:

$0.8 < |f_1/f| < 1.5;$ $1.0 < |f_2/f| < 2.0;$ $1.0 < |f_3/f| < 30.0;$ $1.0 < |f_4/f| < 7.0;$ $1.0 < |f_5/f| < 4.0;$ $0.8 < |f_6/f| < 2.0;$ where f is the effective focal length of the lens system.

The lens systems 310, 410, 510, 610 are configured such that the ratio (TTL/f) satisfies the relation:

$1.0 < TTL/f < 2.0.$

In at least some embodiments of lens systems 310, 410, 510, 610 illustrated in FIGS. 7, 10, 13, and 16, the lens components with positive dioptric powers may be composed of a material (e.g., a plastic material) having an Abbe number of $V_1$. The second, and sixth lens components with negative dioptric powers may be composed of a material (e.g., plastic material) having an Abbe number of $V_2$. The Abbe numbers of the lens materials for the lens components may satisfy the condition, $30 < V_1 - V_2 < 35.$ In at least some embodiments of the lens systems 310, 410, 510, 610 illustrated in FIGS. 7, 10, 13, and 16, the first lens component 301, 401, 501, 601 with positive dioptric power and focal length $f_1$ may be composed of a wafer lens.

Figure 7:
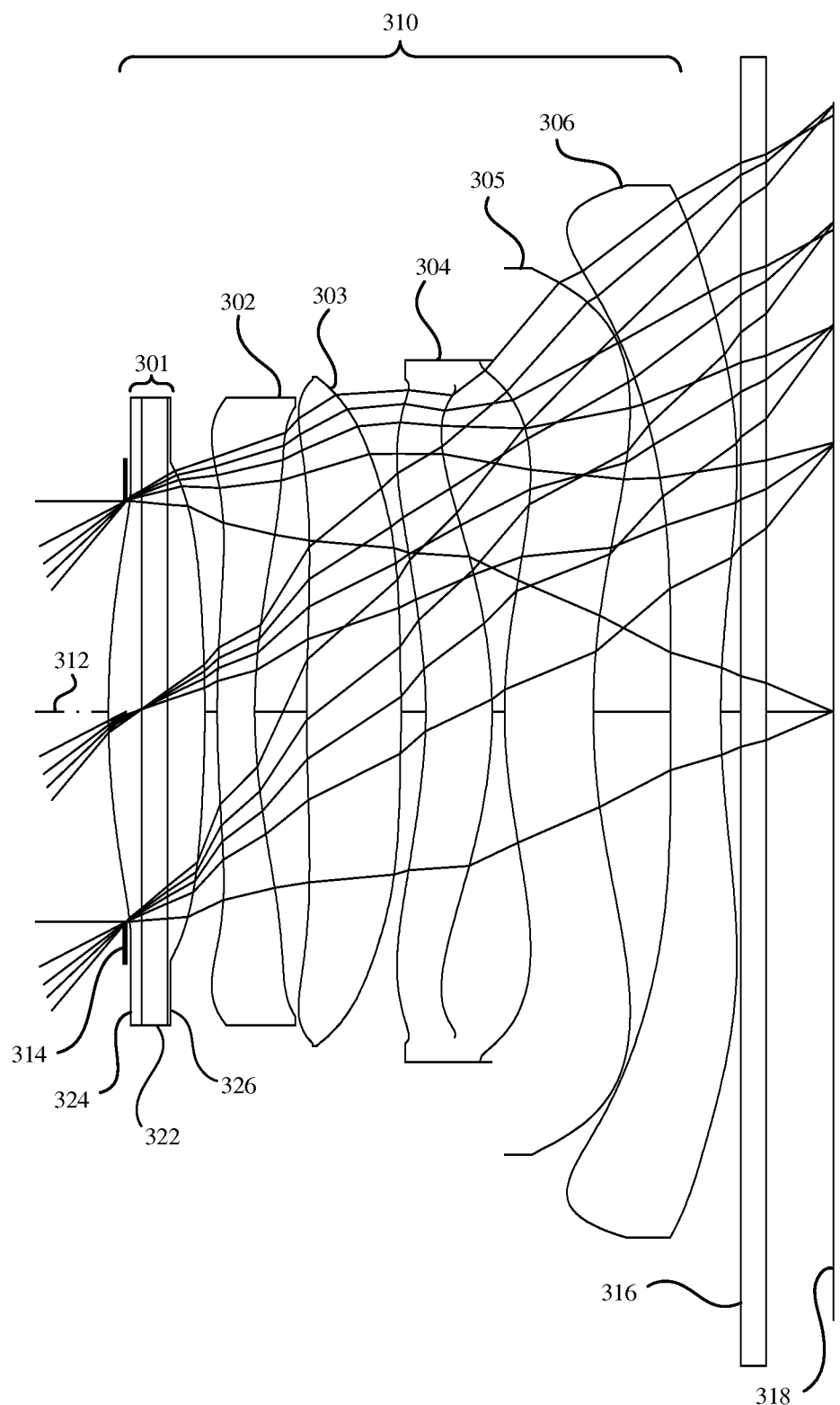
FIG. 7 is a cross-sectional illustration of another example embodiment of a lens system that includes a wafer lens component and five refractive lens elements.

Referring to the lens systems 310 illustrated in FIG. 7, the wafer lens 301 may include a planar substrate 322 and single layer laminates 324, 326 of polymeric or plastic material on each side of the planar substrate, which may be a planar glass substrate. The laminate layers 324, 326 of polymeric or plastic material may be formed using known manufacturing methods such as casting, molding, or microlithographic processes on the planar substrate 322. If polymeric material is used it may be a ultra-violet (UV) light curable polymeric. The laminate layers 324, 326 are formed with a shape that provides the refractive power for the wafer lens component 301.

The wafer lens component 301 may include an electrochromic layer that provides a variable light transmittance in response to an applied electrical voltage. The electrochromic layer may supplement the function of the aperture stop 314 or, in other embodiments, serve the function of a variable aperture stop without using an aperture stop. The electrochromic layer may be located either on the object planar side or the image planar side of the planar substrate 322. The electrochromic layer may be composed of transparent film layer of electrically conductive organic or inorganic material, such as metallic oxides and conductive polymers.

The wafer lens component is comprised as a unit of the combination of a polymeric laminate layer and a planar substrate. Thus the refractive power of the wafer lens component is provided by the laminate layer or layers and the planar substrate or substrates. The laminate layer and the planar substrate will generally have different characteristics such as the indices of refraction and Abbe numbers. These composite optical materials contribute to the refractive power of the wafer lens component and these composite material refractive indices are considered in the computation of the refractive power of the wafer lens or wafer lens group. Therefore, the wafer lens component differs optically from a lens element of the same geometry that is formed of a single transparent mass of refractive material and the planar substrate, which may be a planar glass substrate, of the wafer lens does enter into the lens computations.

Figure 10:
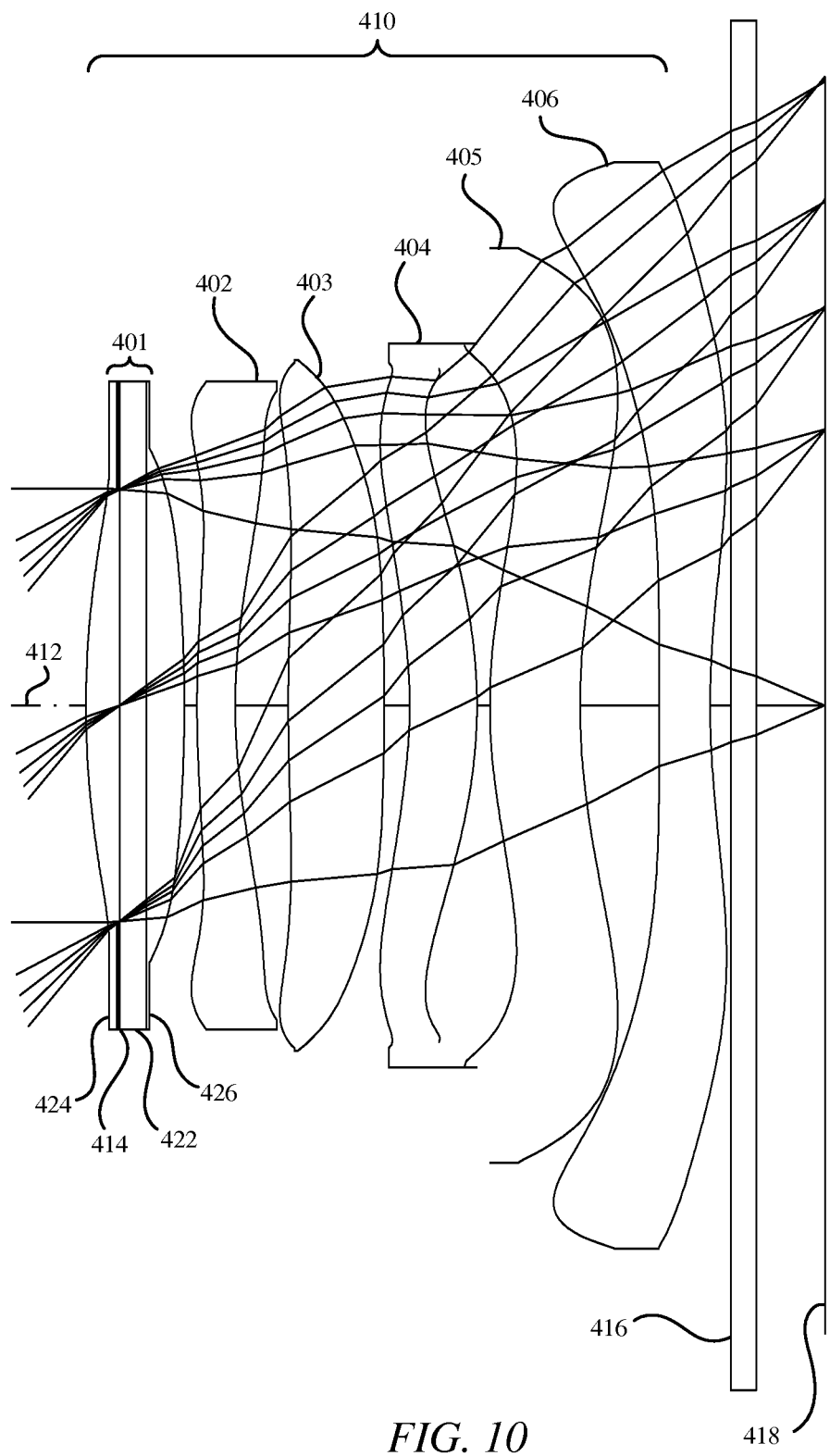
FIG. 10 is a cross-sectional illustration of another example embodiment of a lens system that includes a wafer lens component and five refractive lens elements.
Figure 13:
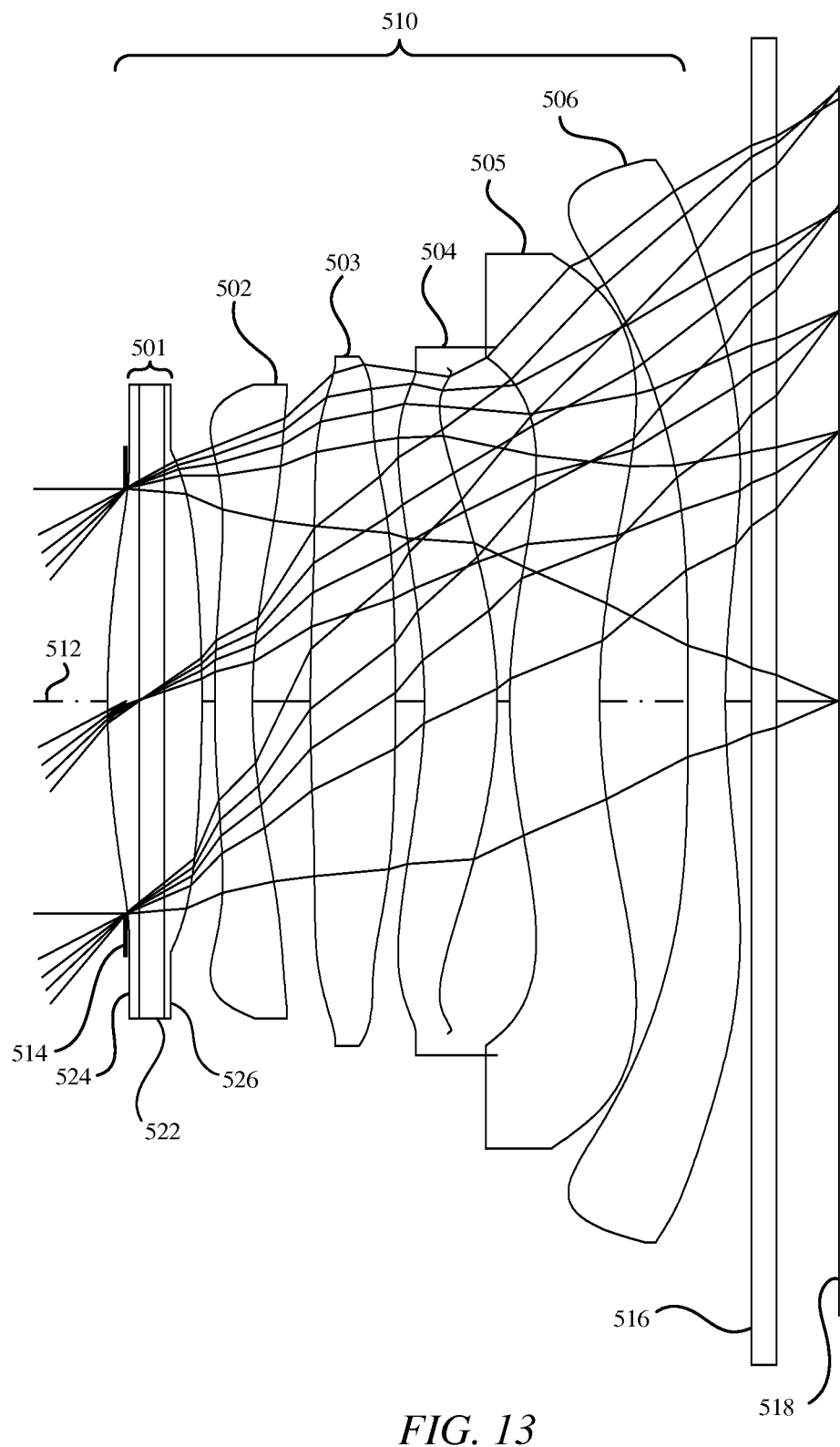
FIG. 13 is a cross-sectional illustration of another example embodiment of a lens system that includes a wafer lens component and five refractive lens elements.

The lens systems 410, 510, 610 illustrated in FIGS. 10, 13, and 16 show structures for the wafer lens components 401, 501, 601 that are similar to the structure for the wafer lens component 301 that is illustrated in FIG. 7. In FIGS. 10, 13, and 16, features similar to those in FIG. 7 have the same last two digits in the reference numerals.

Referring now to embodiments as illustrated in FIGS. 22 and 25, a compact lens system 810, 910 suitable for use in a camera may include six lens components. The six lens components 801-806 in the lens system 810 of FIG. 22 and the six lens components 901-906 in the lens system 910 of FIG. 25 each have a refractive power and form a lens system having a focal length of f.

The first lens component 801, 901 of the embodiments illustrated in FIGS. 22 and 25 is in the form of a wafer lens component in which laminate layers of polymeric or plastic materials are formed on planar substrates, which may be planar glass substrates. The remaining five lens components, 802-806 in the lens system 810 of FIG. 22 and 902-906 in the lens system 910 of FIG. 25, are shown as lens elements formed of a single transparent mass of refractive material. In other embodiments, not shown, one or more of the remaining five lens components may be a grouped plurality of such masses arranged in series, such as an additional wafer lens component. The six lens components of each of the lens systems 810, 910 are arranged along an optical axis (AX) 812, 912 from an object side to an image side as follows:

a first lens component 801, 901 in the form of a wafer lens component, having a positive refractive power, a focal length $f_1$, and a convex object side surface;

a second lens component 802, 902 having a negative refractive power and a focal length $f_2$;

a third lens component 803, 903 having a positive refractive power and a focal length $f_3$;

a fourth lens component 804, 904 having a positive refractive power and a focal length $f_4$;

a fifth lens component 805, 905 having a positive refractive power and a focal length $f_5$; and a sixth lens component 806, 906 having a negative refractive power and a focal length $f_6$.

In addition, at least one surface, the object side or the image side, of each of the six lens components is aspheric. In some embodiments both the object side surface and the image side surface of one or more of the six lens components is aspheric.

The lens systems 810, 910 forms an image on or near the surface of an image sensor 818, 918. A cover material 816, 916, such as a cover glass or an infrared cut filter, may be placed between the lens systems 810, 910 and the image sensor 818, 918.

Embodiments of a camera lens system as described herein and illustrated in FIGS. 22 and 25 may be configured such that the dioptric power distribution of the six lens components satisfy the following conditions:

$$0.8<|f_1/f|<1.5;$$

$$1.0<|f_2/f|<2.0;$$

$$0.8<|f_3/f|<1.5;$$

$$1.0<|f_4/f|<30.0;$$

$$1.0<|f_5/f|<5.0;$$

$$0.8<|f_6/f|<2.0;$$

where f is the effective focal length of the lens system.

The lens systems 810, 910 are configured such that the ratio (TTL/f) satisfies the relation:

$$1.0<TTL/f<2.0.$$

In at least some embodiments of lens systems 810, 910 illustrated in FIGS. 22 and 25, the lens components with positive dioptric powers may be composed of a material (e.g., a plastic material) having an Abbe number of $V_1$. The second, and sixth lens components with negative dioptric powers may be composed of a material (e.g., plastic material) having an Abbe number of $V_2$. The Abbe numbers of the lens materials for the lens components may satisfy the condition, $$30<V_1-V_2<35.$$

In at least some embodiments of the lens systems 810, and 910 illustrated in FIGS. 22 and 25, the wafer lens component 801, 901 with positive dioptric power and focal length $f_1$ may comprise two wafer lenses 820, 830, 920, 930.

Referring to the lens systems 810 illustrated in FIG. 22, the wafer lenses 820, 830 may each include a planar substrate 822, 832, which may be a planar glass substrate. A laminate layer 824, 834 of polymeric or plastic material may be formed on one surface of the planar substrate 822, 832 using known manufacturing methods such as casting, molding, or microlithographic process. If polymeric material is used it may be a UV curable polymeric. The laminate layer 824, 834 is formed with a shape that provides the refractive power for the wafer lens. The two wafer lenses 820, 830 may be arranged so that the first laminate layer 824 faces the object side and the second laminate layer 824 faces the image side. The plano surfaces of the two planar substrates 822, 832 may face one another either in full overall contact or in spaced parallel relation with the spacing being of such small magnitude that it does not enter into the lens computations.

The wafer lens component is comprised as a unit of the combination of a polymeric laminate layer and a planar substrate, which may be a planar glass substrate. Thus the refractive power of the wafer lens component is provided by the laminate layer or layers and the planar substrate or substrates. The laminate layer and the planar substrate will generally have different characteristics such as the indices of refraction and Abbe numbers. These composite optical materials contribute to the refractive power of the wafer lens component and these composite material refractive indices are considered in the computation of the refractive power of the wafer lens or wafer lens group. Therefore, the wafer lens component differs optically from a lens element of the same geometry that is formed of a single transparent mass of refractive material and the planar substrate of the wafer lens does enter into the lens computations.

The wafer lens component 801 may include an electrochromic layer 814 that provides a variable light transmittance in response to an applied electrical voltage. The electrochromic layer 814 may serve the function of a variable aperture stop. The electrochromic layer 814 may be located in between the image side planar surface of the first wafer lens substrate 822 and the object side planar surface of the second wafer lens substrate 832. The electrochromic layer 814 may be composed of transparent film layer of electrically conductive organic or inorganic material, such as metallic oxides and conductive polymers.

The lens system 910 illustrated in FIG. 25 shows a structure for the wafer lens component 901 that is similar to the structure for the wafer lens component 801 that is illustrated in FIG. 22. In FIG. 25, features similar to those in FIG. 22 have the same last two digits in the reference numerals.

Figure 28:
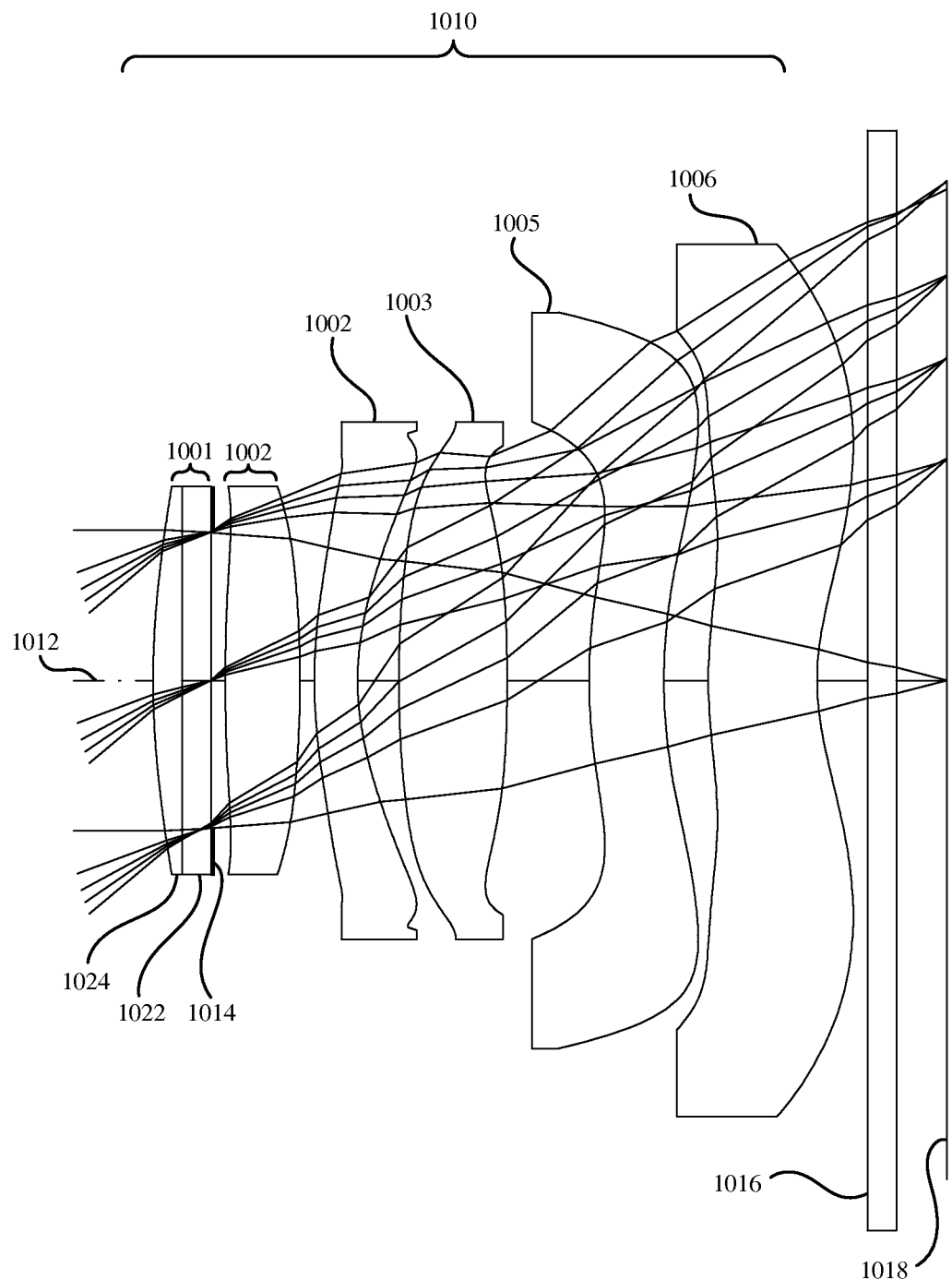
FIG. 28 is a cross-sectional illustration of another example embodiment of a lens system that includes a wafer lens component and five refractive lens elements.
Figure 31:
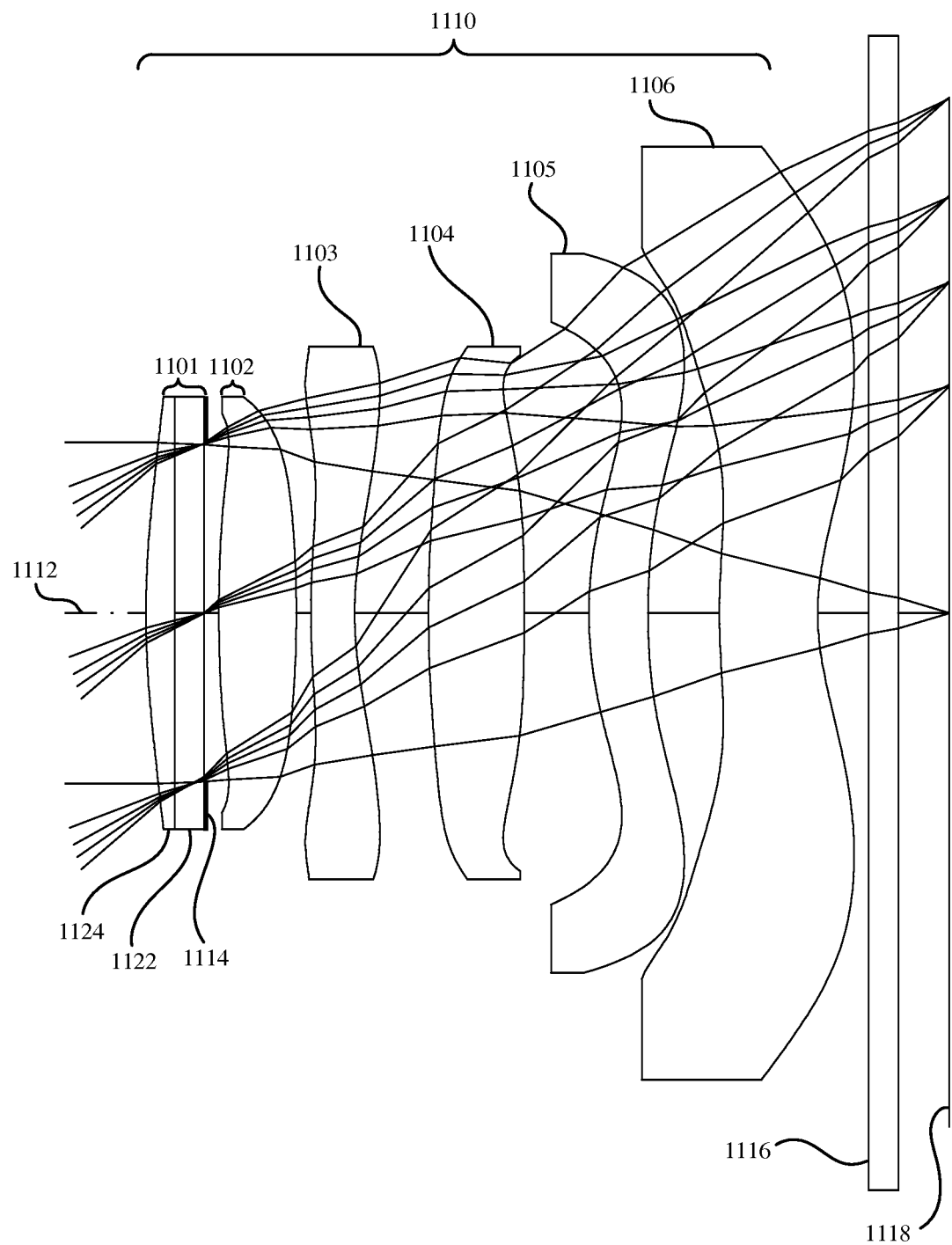
FIG. 31 is a cross-sectional illustration of another example embodiment of a lens system that includes a wafer lens component and five refractive lens elements.

Referring now to embodiments as illustrated in FIGS. 28 and 31, a compact lens system 1010, 1110 suitable for use in a camera may include six lens components. The six lens components the six lens components 1001-1006 in the lens system 1010 of FIG. 28 and the six lens components 1101-1106 in the lens system 1110 of FIG. 31 each have a refractive power and form a lens system having a focal length of f.

The first lens component 1001, 1101 of the embodiments illustrated in FIGS. 28 and 31 is in the form of a wafer lens component in which a laminate layer of polymeric or plastic materials is formed on a planar substrate, which may be a planar glass substrate. The remaining five lens components, 1002-1006 in the lens system 1010 of FIG. 28, and 1102-1106 in the lens system 1110 of FIG. 31, are shown as lens elements formed of a single transparent mass of refractive material. In other embodiments, not shown, one or more of the remaining five lens components may be a grouped plurality of such masses arranged in series, such as an additional wafer lens component. The six lens components of each of the lens systems 1010, 1110 are arranged along an optical axis (AX) 1012, 1112 from an object side to an image side as follows:

a first lens component 1001, 1101 in the form of a wafer lens component, having a positive refractive power, a focal length $f_1$, and a convex object side surface;

a second lens component 1002, 1102 having a positive refractive power and a focal length $f_2$;

a third lens component 1003, 1103 having a negative refractive power and a focal length $f_3$;

a fourth lens component 1004, 1104 having a positive refractive power and a focal length $f_4$;

a fifth lens component 1005, 1105 having a positive refractive power and a focal length $f_5$; and a sixth lens component 1006, 1106 having a negative refractive power and a focal length $f_6$.

In addition, at least one surface, the object side or the image side, of each of the six lens components is aspheric. In some embodiments both the object side surface and the image side surface of one or more of the six lens components is aspheric.

The lens systems 1010, 1110 form an image on or near the surface of an image sensor 1018, 1118. A cover material 1016, 1116, such as a cover glass or an infrared cut filter, may be placed between the lens systems 1010, 1110 and the image sensor 1018, 1118. An aperture stop (AS) 1014, 1114 is located on the image side of the planar substrate 1022, 1122 of the first lens component 1001, 1101.

Embodiments of a camera lens system as described herein and illustrated in FIGS. 28 and 31 may be configured such that the dioptric power distribution of the six lens components satisfy the following conditions:

$$2.1 < |f_1/f| < 2.2;$$

$$1.6 < |f_2/f| < 1.7;$$

$$1.3 < |f_3/f| < 1.5;$$

$$1.5 < |f_4/f| < 2.3;$$

$$2.0 < |f_5/f| < 26.0;$$

$$1.0 < |f_6/f| < 1.9;$$

where f is the effective focal length of the lens system.

The lens systems 1010, 1110 are configured such that the ratio (TTL/f) satisfies the relation:

$$1.0 < TTL/f < 2.0.$$

The first lens component 1001, 1101 is a wafer lens that may include a planar substrate 1022, 1122 and a single layer laminate 1024, 1124 of polymeric or plastic material on the object side of the planar substrate, which may be a planar glass substrate. The laminate layer 1024, 1124 of polymeric or plastic material may be formed using known manufacturing methods such as casting, molding, or microlithographic processes on the planar substrate 1022, 1122. If polymeric material is used it may be a UV curable polymeric. The laminate layer 1024, 1124 is formed with a shape that provides the refractive power for the wafer lens component 1001, 1101.

The wafer lens component 1001, 1101 may include an electrochromic layer 1014, 1114 that provides a variable light transmittance in response to an applied electrical voltage. The electrochromic layer may serve the function of a variable aperture stop. The electrochromic layer may be composed of transparent film layer of electrically conductive organic or inorganic material, such as metallic oxides and conductive polymers.

The wafer lens component is comprised as a unit of the combination of a polymeric laminate layer and a planar substrate. Thus the refractive power of the wafer lens component is provided by the laminate layer or layers and the planar substrate or substrates. The laminate layer and the planar substrate will generally have different characteristics such as the indices of refraction and Abbe numbers. These composite optical materials contribute to the refractive power of the wafer lens component and these composite material refractive indices are considered in the computation of the refractive power of the wafer lens or wafer lens group. Therefore, the wafer lens component differs optically from a lens element of the same geometry that is formed of a single transparent mass of refractive material and the planar substrate, which may be a planar glass substrate, of the wafer lens does enter into the lens computations.

The lens systems described herein may include an object side lens component in the form of a wafer lens component. The wafer lens component is comprised as a unit of the combination of one or more planar substrates and one or more laminate refractive layers. Thus the refractive power of the wafer lens element or group is provided by the laminate layer or layers and the planar substrate or substrates. The laminate layer and the planar substrate will generally have different characteristics such as the indices of refraction and Abbe numbers. These composite optical materials contribute to the refractive power of the wafer lens component and these composite material refractive indices are considered in the computation of the refractive power of the wafer lens component. Therefore, the wafer lens component differs optically from a lens element of the same geometry that is formed of a single transparent mass of refractive material and the planar substrate of the wafer lens does enter into the lens computations.

The wafer lens component of the lens systems described herein includes a plano surface on the planar substrate that is located along the optical axis at the appropriate position for an aperture stop or other form of light control. The aperture stop or light control may be in the form of a thin film applied to the plano surface of the planar substrate. For example, the aperture stop may be located at the planar surface 414, 614, 814, 914, 1014, 1114 of the wafer lens component 401, 601, 801, 901, 1001, 1101 as shown in FIGS. 10, 16, 22, 25, 28, and 31.

FIG. 34A shows a side elevation of a wafer lens component 3401. FIG. 34B shows a pictorial view of the wafer lens component 3401. FIG. 34C shows an exploded pictorial view of the wafer lens component 3401. The wafer lens component 3401 has a planar substrate 3422 with a refractive element 3424 molded on a first plano surface of the planar substrate and a light.controlling element 3414 applied to the opposite plano surface of the planar substrate. This arrangement of the wafer lens component 3401 is similar to the wafer lens component of the embodiments shown in FIGS. 28 and 31. While the light.controlling element 3414 is illustrated as having a substantial thickness for clarity, in some embodiments the light.controlling element may be a thin film that is much thinner than what is suggested by the figures.

The light.controlling element 3414 may be in the form of an aperture stop that includes an opaque material which defines a transparent opening, such as a circular opening, centered on the optical axis. In another embodiment the light.controlling element may be in the form of a neutral density filter that reduces the intensity of light uniformly over the entire surface, In yet another embodiment the light.controlling element may be in the form of an apodized aperture that reduces the intensity of light by a smoothly increasing amount as the distance from the optical axis increases, as suggested by FIG. 38. An apodized aperture may provide a smoothly increasing attenuation of transmitted light from a central transparent opening with substantially no attenuation to a fully opaque outer edge that fully attenuates transmitted light. In other embodiments, an apodized aperture may provide a smoothly increasing attenuation of transmitted light that begins with a substantial attenuation and/or end before fully attenuating the light. For example, an apodized aperture may include a transparent circular opening centered on the optical axis joined to an opaque outer ring by an apodized ring. The apodized ring may provide a smoothly increasing attenuation of transmitted light that begins at the outer edge of the transparent circular opening with a substantial attenuation of perhaps 20% and ends at the inner edge of the opaque outer ring with less than full attenuation of perhaps 80%.

The light.controlling element 3414 may be provide a variable light transmittance. In some embodiments, the light.controlling element may be a thin film layer of conductive organic or inorganic material applied to the planar substrate 3422 to provide an electrochromic lens component having variable light transmittance in response to an applied electrical voltage. In one embodiment, the electrochromic lens component provides a variable neutral density filter.

Figure 35:
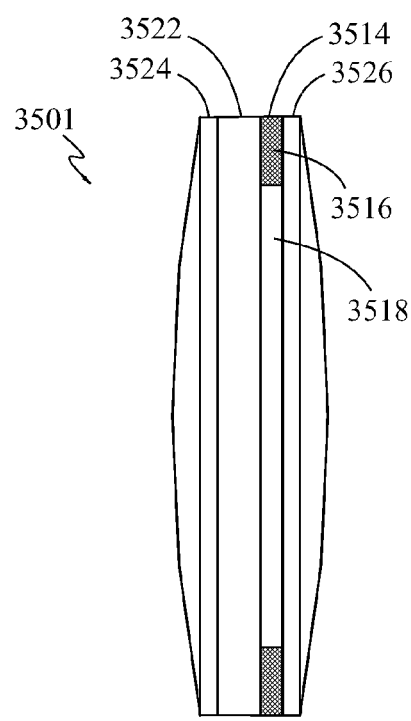
FIG. 35 shows a side elevation of another wafer lens component.

FIG. 35 shows a side elevation of another wafer lens component 3501. The wafer lens component 3501 has a planar substrate 3522 with a first refractive element 3524 molded on a first plano surface of the planar substrate and a light.controlling element 3514 applied to the opposite plano surface of the planar substrate. A second refractive element 3526 is molded on the light.controlling element 3514 on the side of the light.controlling element opposite from side applied to the plano surface of the planar substrate. This arrangement of the wafer lens component 3501 is similar to the wafer lens component of the embodiments shown in FIGS. 10 and 16. The light.controlling element 3514 may be of any of the forms previously described in connection with FIGS. 34A-34C.

Figure 36:
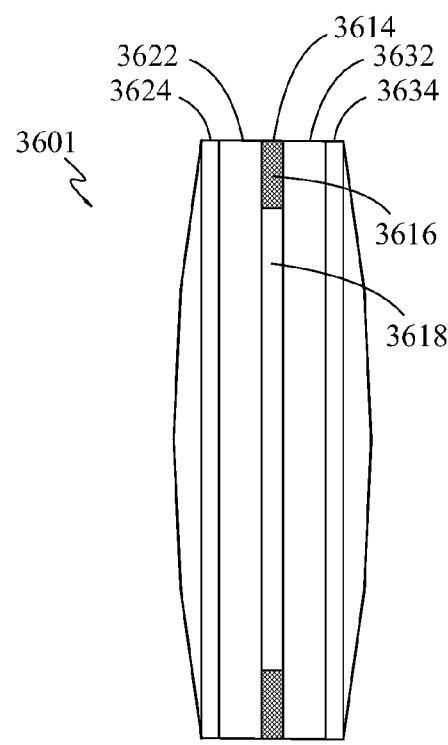
FIG. 36 shows a side elevation of yet another wafer lens component.

FIG. 36 shows a side elevation of yet another wafer lens component 3601. The wafer lens component 3601 has a first planar substrate 3622 with a first refractive element 3624 molded on a first plano surface of the first planar substrate. The wafer lens component 3601 further has a second planar substrate 3632 with a second refractive element 3634 molded on a second plano surface of the second planar substrate. The first refractive element 3624 and the second refractive element 3634 are arranged to form the two outside elements of the wafer lens component 3601. A light.controlling element 3614 is placed between the first planar substrate 3622 and the second planar substrate 3632 to be supported by the plano surfaces of the planar substrates opposite the plano surfaces on which the refractive elements 3624, 3634 are molded. This arrangement of the wafer lens component 3601 is similar to the wafer lens component of the embodiments shown in FIGS. 22 and 25. The light.controlling element 3614 may be of any of the forms previously described in connection with FIGS. 34A-34C.

Figure 37:
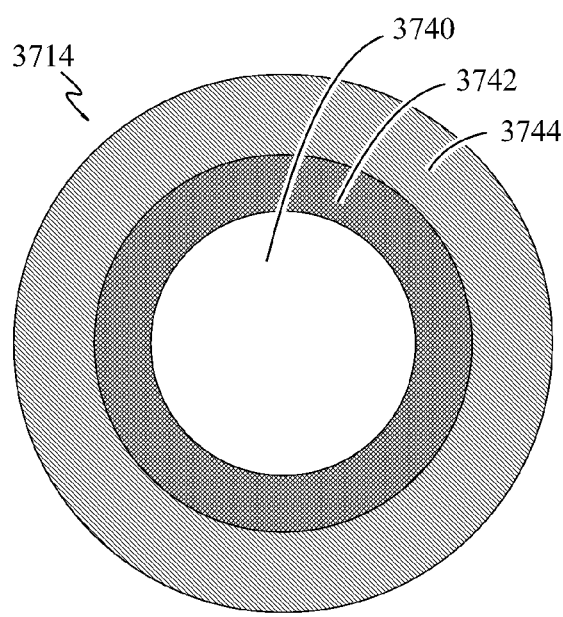
FIG. 37 shows a plan view of an electrochromic lens component that provides a variable aperture stop.

FIG. 37 shows a plan view of an electrochromic lens component 3714 that provides a variable aperture stop. The embodiment illustrated includes a transparent circular opening 3740 centered on the optical axis. The transparent circular opening 3740 is surrounded by two concentric annular rings 3742, 3744. The concentric annular rings may be electrochromic films that are adjustable between being substantially transparent to being substantially opaque to provide a solid state equivalent of a mechanical aperture stop.

Figure 38:
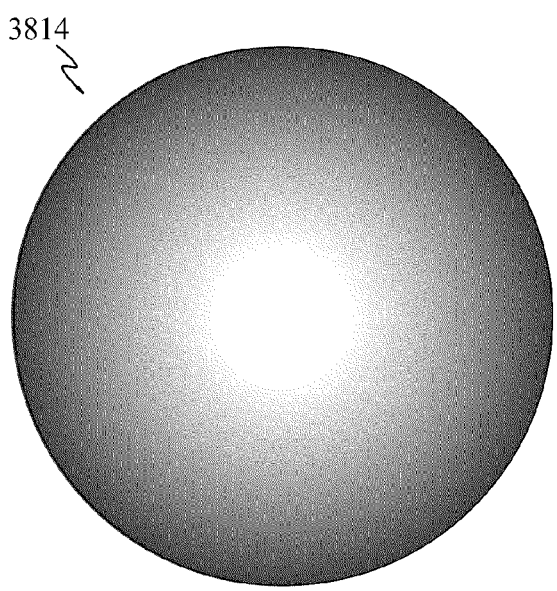
FIG. 38 shows a plan view of an apodized aperture.

In another embodiment an electrochromic lens component may provide an apodized aperture of the type illustrated in FIG. 38 with a variable intensity profile distribution across the aperture opening for the light energy transmitted through the optical system.

FIGS. 39-47 illustrate embodiments of electrochromic lens components that may be used to provide a light control for some embodiments of the lens system described herein.

Figure 39:
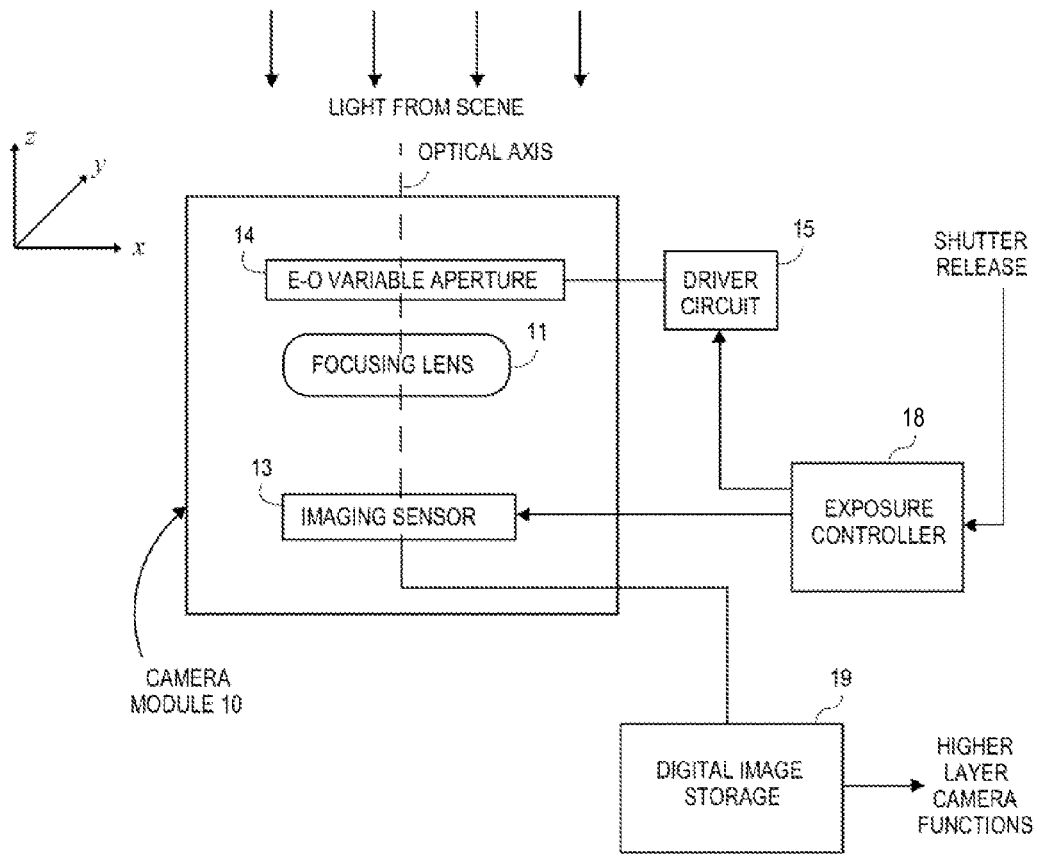
FIG. 39 is a block diagram of camera-related elements including a camera module and associated electronics circuitry.

FIG. 39 is a block diagram of the camera module 10 together with electronic circuit elements that are needed to implement the camera function. Note that there may be additional functions that are implemented in the consumer electronics device as is known to those of ordinary skill in the art but that are not described here in the interest of conciseness, e.g. communication network interfaces, display screens, touch screens, keyboards, and audio transducers. The camera module 10 has an imaging sensor 13 that is part of an optical system, which also includes a focusing lens 11 and an electro-optically (E-O) variable aperture 14. These optical components are aligned to an optical axis as shown. Note however, that while in this particular example all of the optical components are in a straight line, in other embodiments there may be a mirror or other optical deflector that allows one or more of the components to be positioned off of a straight line. Nevertheless, those components may still be considered "aligned with the optical axis." What is shown in FIG. 39 is a particularly efficient mechanism (in terms of packaging) that can fit within the tight confines of a low z-height device such as a smart phone, a tablet computer, or a laptop computer, where, in particular, all of the optical interfaces are positioned substantially parallel to a front or rear face of the external housing of the device. In other words, each optical component lies flat within an x-y plane with its height given in the z-direction shown.

The imaging sensor 13 may be any conventional solid-state imaging sensor such as a complementary metal oxide semiconductor (CMOS) sensor chip, which presents an interface to an exposure controller 18 to receive certain parameters for determining an exposure for taking a picture. The sensor parameters may include pixel integration time, which may be set by the exposure controller 18 in accordance with any suitable exposure control algorithm that considers various input variables (e.g., level of scene illumination and the availability of a flash or strobe illumination). The exposure controller 18 may automatically perform the algorithm to determine an appropriate exposure setting, and then signal the imaging sensor to update its parameters in response to a manual shutter release command (e.g., in response to a mechanical or virtual shutter button being actuated by a user of the device). The exposure controller 18 may be implemented as a programmed processor or as a completely hardwired logic state machine together with stored parameter options. Once a digital image has been captured by the imaging sensor 13 under the chosen exposure setting, it may be transferred to a digital image storage 19 (e.g., solid state volatile or non-volatile memory), prior to being further processed or analyzed by higher layer camera functions that yield for example a still picture file (e.g., in a JPEG format) or a video file (e.g., in a digital movie format).

Also included in the camera module 10 is a focusing lens 11 which may include one or more lens components that serve to focus light from the scene onto the imaging sensor 13 (thereby producing an optical image on an active pixel array portion of the imaging sensor 13). The focusing lens 11 may be one of the lens systems described herein. The focusing lens 11 may be part of either a fixed focus optical subsystem, or a variable focus subsystem that implements an autofocus mechanism. In the case of an auto focus mechanism, additional control parameters relating to lens position can be set by the exposure controller 18 for each exposure to be taken, as is apparent to those of ordinary skill in the art.

The camera module 10 also has the E-O variable aperture 14, which for the purposes of the block diagram is shown as being positioned in front of the focusing lens 11 on the optical path. When used with embodiments of the lens system described herein, the E-O variable aperture 14 will be located within the focusing lens 11. The aperture 14 effectively implements a pupil whose width or size is electrically variable. The aperture 14 may be positioned at any suitable aperture location along the optical axis in front of the imaging sensor 13. When the aperture 14 has been electrically controlled into a small or narrow pupil, highly collimated rays are admitted by it, which results in a sharp focus at an image plane of the optical system. On the other hand, when the aperture 14 is configured into a large or wide pupil, un-collimated rays are admitted resulting in an optical image that is sharp around what the focusing lens 11 is focusing on, and may be blurred otherwise. The aperture 14 thus determines how collimated the admitted rays of light from the scene are, that ultimately come to a focus in an image plane. The aperture 14 also determines the amount of incident light or how many incoming rays are admitted, and thus how much light reaches the imaging sensor, where of course the narrower the aperture the darker the digital image that is captured by the sensor 13 (for a given integration time). Control of the effective pupil size of the aperture 14 is achieved using an electronic driver circuit 15, which may receive a control signal or command from the exposure controller 18 that may represent the desired size of the effective pupil. The driver circuit 15 translates this input command into a drive voltage that is applied to the input transparent conductors of the aperture 14, as described below.

Figure 40:
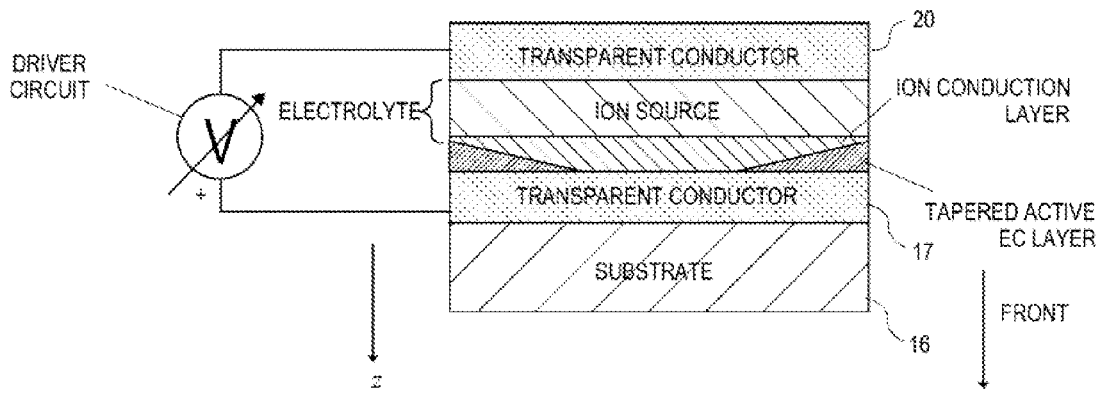
FIG. 40 is a cutaway view of an E-O variable aperture in accordance with an embodiment of the invention.

Turning now to FIG. 40, a cutaway view of the aperture 14 in accordance with an embodiment of the invention is shown. As can be seen, the aperture 14 has a stack that includes a front transparent conductor medium 17 which in this example is connected to the "+" terminal of the driver circuit, an electrolyte medium, an active EC medium, and a rear transparent conductor medium 20 (connected to the complimentary terminal of the driver circuit). In one embodiment, the elements of the stack are formed to be in contact with one another as they are depicted in the figure, i.e. the electrolyte medium is formed as a layer whose surface is in contact with the rear transparent conductor layer 20, and whose opposite surface is in contact with the active EC medium, e.g. an active EC layer, while a surface of the latter is in contact with the front transparent conductor layer 17.

In one embodiment, the electrolyte medium consists of an ion source medium that is adjacent to the rear transparent conductor 20 and is in contact with an ion conduction medium, which in turn is adjacent to the active EC layer. Here, an ion source layer is formed that is not in contact with the active EC layer, but rather is in contact with the ion conduction layer, the latter being in contact with the active EC layer. In other words, the ion conduction layer is entirely sandwiched between the ion source layer and the active EC layer. This arrangement may also be found in other embodiments of the aperture 14, for instance as they are depicted in the cut away views of FIGS. 41-43.

The ion source layer stores suitable ions, for example, lithium ions, that will be used for activating the EC layer when a sufficient charge field, that may be generally vertically directed in the context of the figures here, has been generated between the transparent conductor layers 17, 20. In addition, the ion source layer should be sufficiently clear or transparent to allow light rays from the scene to pass through (in a generally vertical direction in the context of the figures here). The ion source layer may also be referred to as a counter electrode layer.

The ion conduction layer allows for high mobility of the ions that have been produced by the ion source when entering the active EC layer.

The transparent conductor layers 17, 20 in the front and rear are formed on a plano surface of a substrate 16 as shown in FIG. 40. The stack-up of layers, shown in all of the figures here as starting with the transparent conductor layer 17, may be formed on upon another. The substrate is an element of a wafer lens as previously described. The substrate may be made of glass, polycarbonate, or other suitable material or composition that is transparent enough for use in an optical system of a consumer electronics camera and that can be used to support the formation of the transparent conductor layers 17, 20 and one or two refractive components.

A transparent conductor may be, for example, a layer of indium tin oxide (ITO) or other transparent conductive material that is formed as a relatively thin layer. The transparent conductor provides a conductive path for charge from the driver circuit to be applied to the ion source while at the same time allowing the free passage of light rays from the scene. In this case, the front transparent conductor layer 17 is formed on a rear face of the front substrate 16. Note that the references here to "front" and "rear" are only to make it easier to describe the structure of the aperture 14 and are not intended to be otherwise limiting. For example, in one embodiment, the incident light enters that stack up through the front substrate 16 that is at the bottom of the stack shown in FIG. 40; the aperture 14 may also work where the incident light from the scene enters the aperture in the reverse direction, e.g. through a rear substrate.

Still referring to FIG. 40, in this embodiment, the active EC layer is tapered at its edge as shown, forming a gradual ring rather than having an abrupt or step-like edge. The ring-shape is apparent as viewed from above (not shown). In other words, while the EC layer spreads substantially perpendicular to an optical axis of the camera module 10 (see FIG. 39) it does not have uniform thickness and instead has a tapered thickness that drops to essentially zero within an empty inner region of the EC layer as shown in FIG. 40. In this case, this empty inner region is substantially aligned with or centered with the optical axis. The downward tapering of the EC layer makes way for the material of the ion conduction layer to fill that gap, resulting in a substantially frusto-conical shape for the ion conduction layer as seen in FIG. 40. The tapered active EC layer thus presents a minimum pupil width for the aperture 14, being in this case co-extensive with the bottom of the tapered active EC layer.

In operation, the aperture 14 presents effectively a wide pupil so long as there is insufficient current through the outer region of the EC medium, which can be achieved when essentially zero voltage is being applied by the driver circuit to the front and rear transparent conductors. When the driver increases the voltage, ions are forced to travel from the electrolyte medium through the tapered active EC layer, which darkens that outer region of the EC layer. Here it should be noted that the darkness of the EC layer depends on the thickness at that point, in addition to the strength of the current at that point. Thus, the darkness change in the tapered EC layer is gradual in that the darkness increases as one moves outward, away from the center optical axis, for a given fixed voltage. The shape of the taper at the edge of the EC layer may be tuned in order to tune the diffraction qualities of the optical system. This may help create a sharper image on the imaging sensor 13 (see FIG. 39) than an E-O aperture that has an abrupt edge within the active EC layer. For example, tuning the edge of the EC layer may help reduce color aliasing artifacts by reducing spatial frequency response at very high frequencies, and increasing low spatial frequency response (sharpness).

Although not shown in the drawings, a top view of the aperture 14 reveals that the inner region which may be centrally aligned with the optical axis may be formed into any suitable shape, although it is expected that a circular shape may produce improved results in that it matches the naturally circular shape of a lens component of the focusing lens 11. Also, while there are several references here to a "ring" or "ring-like" shape, this does not mean that the external boundary of that shape is necessarily also circular, but rather that the shape is merely annular in that there is an essentially empty inner region surrounded by a non-empty outer region.

The overall process of activation and deactivation of the EC layer is reversible, so that the outer region of the active EC layer can transition from a substantially clear (transparent) state into a colored or dark state (in response to sufficient current being produced through it) and back (when the activation voltage is removed).

In one embodiment, in its clear state (e.g., at zero drive voltage), the aperture 14 has at least 95 percent transmission of light in a visible band of interest (for consumer electronics digital photography); when the effective pupil diameter is then decreased by three "aperture stop" steps (where each step reduces the diameter by a factor of square root of 2, or about 1.414, hence a halving of the effective area of the pupil), the aperture 14 should still exhibit at least 75 percent light transmission.

Figure 44:
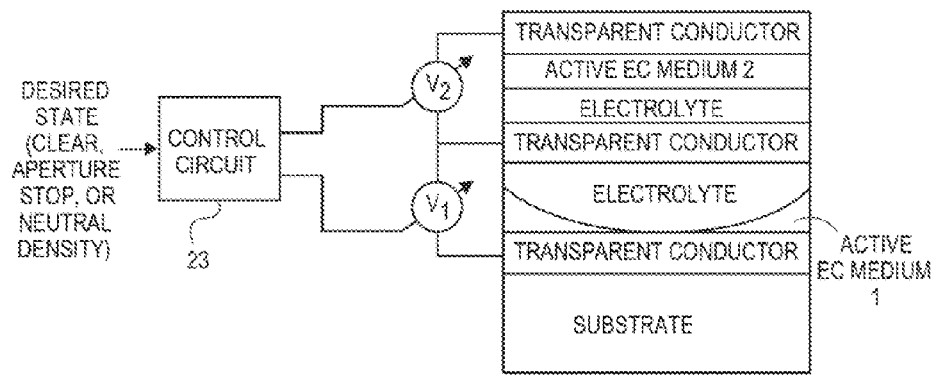
FIG. 44 is a cutaway view of a camera E-O aperture structure that can have at least three states, including a neutral density filter state.
Figure 45:
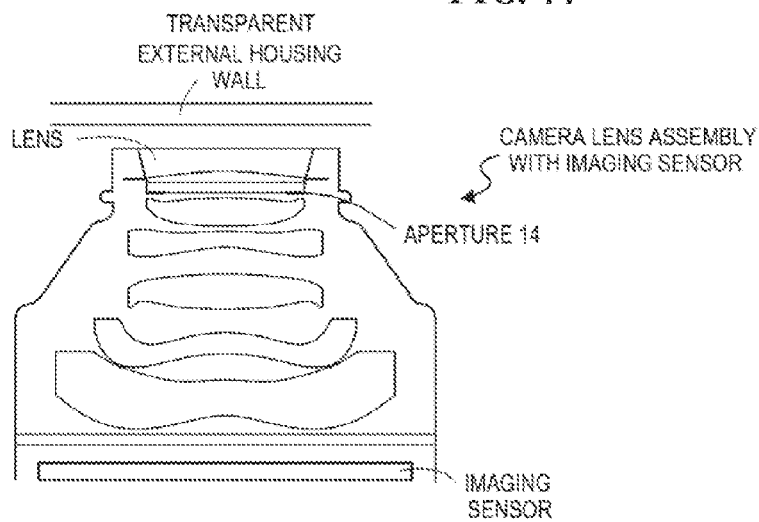
FIG. 45 shows two locations, in the optical system of a camera module integrated in a consumer electronics device, in which the E-O aperture may be placed.

In one embodiment, referring now to FIG. 44, a stack-up according to FIG. 40 having active EC medium 1 is combined with another stack-up having EC medium 2. This enables the structure as a whole (shown in FIG. 44) to be controlled or switched into three states, namely a clear state, a dark aperture stop (or stopped down) state, and a neutral density state in which the aperture as a whole exhibits substantially homogeneous reduction in intensity of light from the scene (across all visible colors or wavelengths of interest). A control circuit 23 translates the input request into suitable driver voltage settings of variable voltage sources V1 and V2 which in turn cause the active EC media 1, 2, respectively, to exhibit the proper opacity.

Figure 41:
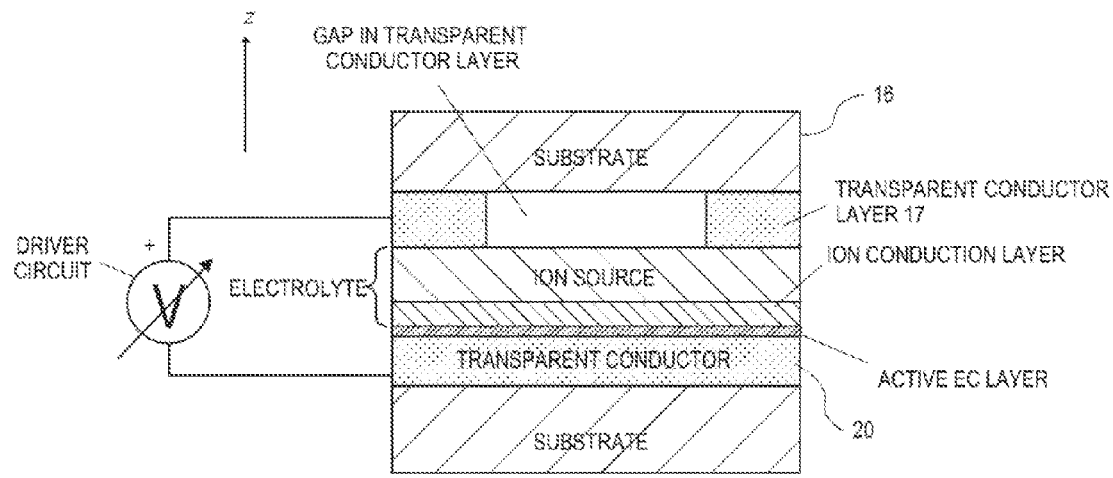
FIG. 41 is a cutaway view of an E-O variable aperture in accordance with another embodiment.

Turning now to FIG. 41, a cut away view of another embodiment of the invention is shown, where in this case the aperture stack is formed such that its front transparent conductor medium or layer 17 is a patterned layer. In particular, as shown in FIG. 41, the front transparent conductor layer 17 has a gap or hole formed in it (e.g., through chemical or mechanical etching) that is substantially aligned with or centered with the optical axis. This gap results in insufficient current being generated through the portion of the active EC layer that lies directly under the gap, to activate that portion of the EC medium. In other words, a ring-like current is generated through the active EC layer (when the activation voltage is applied by the driver circuit). This ensures that the inner region of the aperture stack remains essentially clear, forming a minimum effective pupil width, substantially coextensive with the gap in the transparent conductor layer 17, at a high activation voltage, and yields a progressively larger pupil width as the activation voltage is reduced. In this embodiment, the EC medium consists of an active EC layer that is substantially perpendicular to the optical axis but that also has essentially uniform thickness as shown. The voltage applied by the driver circuit may be modulated or changed continuously from a low or minimum level such as zero volts, which yields a low opacity in the outer region of the EC layer, to a high voltage that yields a high opacity in the outer region of the EC layer.

Figure 42:
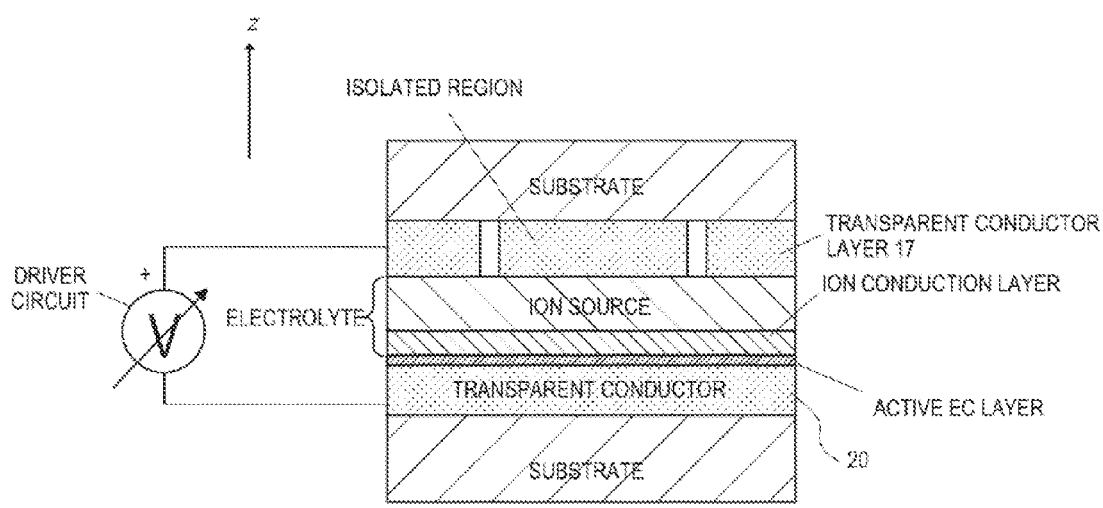
FIG. 42 is a cutaway view of yet another embodiment.

Referring now to FIG. 42, this cut away view illustrates an embodiment where the front transparent conductor layer medium 17 of the aperture stack contains an inner transparent conductor plug region, also referred to as an isolated region, i.e. electrically isolated from an outer region of the front transparent conductor medium 17. This isolated region may be essentially centered or aligned with the optical axis. It may remain electrically floating or it may alternatively be tied to a different voltage than the outer region of the front transparent conductor medium 17, while the latter is being driven to an activation voltage by the driver circuit. This mechanism again produces a ring-like current through an outer region of the active EC layer, thereby maintaining very low opacity in the inner region of the active EC layer. Thus, similar to the embodiments described above, at a high drive voltage, the outer region of the active EC layer (which is subjected to the ring-like current) reaches high opacity, while its inner region is subjected to essentially no or very low current and thus remains at low opacity.

It should be noted that a further advantage of the embodiment of FIG. 42 over that of FIG. 41 may be that the difference in optical property between the inner region of the optical path through the aperture 14 (centered or aligned with the optical axis), and the outer region of the optical path (which is subjected to greater opacity by the active EC layer) is reduced, when the drive voltage is minimum and the pupil size is at its widest. In other words, light rays from the scene that pass through the inner region of the aperture 14 will be subjected to essentially the same optical characteristics as the light rays that travel through the outer region (assuming that the effect of the physical gap shown between the isolated region and the outer region of the front transparent conductor layer 17 in FIG. 42 can be ignored). This might not be the case with the embodiment of FIG. 40 (because of the tapered active EC layer) and with the embodiment of FIG. 41 (because of the substantial gap in the transparent conductor layer 17).

Figure 43:
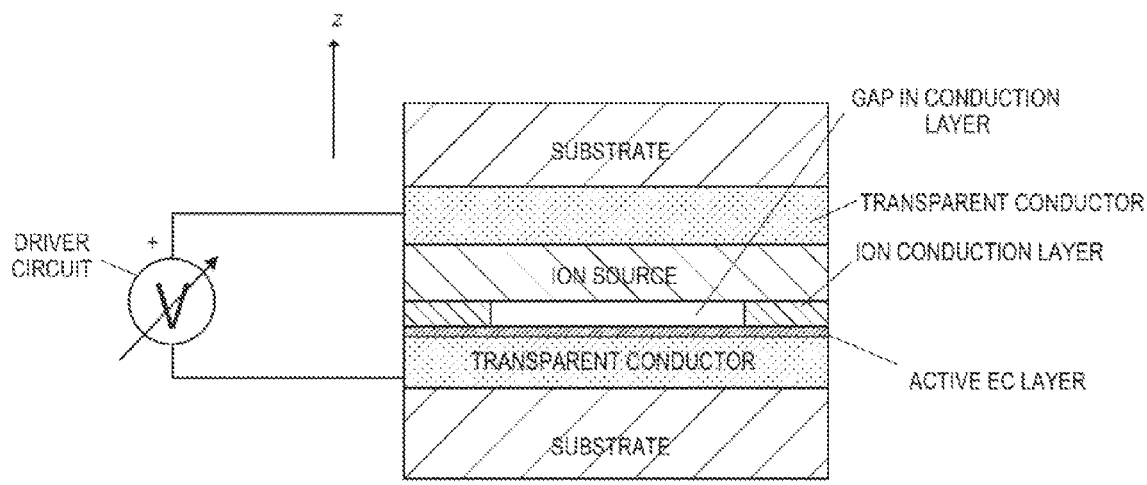
FIG. 43 is a cutaway view of a further embodiment of the E-O variable aperture.

Turning now to FIG. 43, in yet another embodiment of the aperture stack, the ion conduction medium or layer becomes a patterned layer as shown, by forming a gap or hole in what may be an otherwise uniformly thick ion conduction layer. The hole may be substantially aligned or centered with the optical axis as shown. This means that when the activation voltage is applied by the driver circuit, not enough ions from the ion source layer will be traveling through the (empty) inner region of the ion conduction layer, and thus should not impact the inner region of the active EC layer that lies directly underneath the hole. Thus, there should be no substantial darkening of the inner region of the active EC layer. Once again, a minimum effective pupil width is achieved in this case, using a different mechanism than those described in FIGS. 40-42. Once again, a ring-like current is generated through the EC layer (when the activation voltage is applied by the driver circuit) in order to reduce the width of the aperture. The minimum width or area of the aperture may correspond to essentially the size of the hole in the ion conduction layer.

Figure 46:
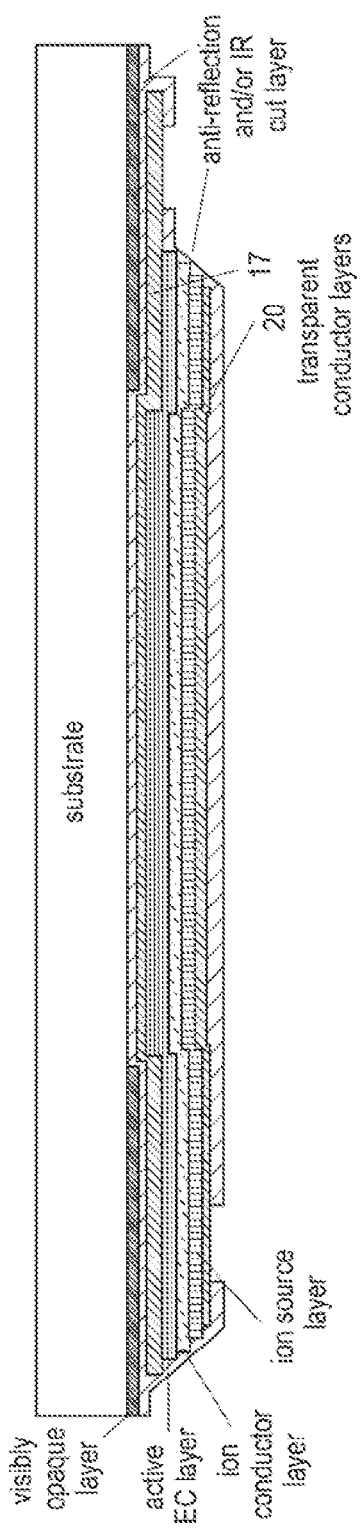
FIG. 46 is a cut-away view of an electro-optic aperture.

Turning now to FIG. 46, a section view of an electro-optic aperture is shown in accordance with another embodiment of the invention. A stack of the aperture here is similar to the embodiment of FIG. 40 in that there is a substrate on which a transparent conductor medium or layer 17 has been formed. As suggested above, the substrate may be made of any suitable material such as sapphire or glass or other sufficiently transparent material on which the stack of the electro-optic aperture and a refractive element may be formed. In contact with the transparent conductor medium 17 is an active EC layer, an opposite surface of which is in contact with an ion conduction layer. The latter is in contact with an ion source layer. This entire sandwich is bounded by the front and rear transparent conductor layers 17, 20. In the embodiment of FIG. 46, there is also a front anti-reflection and/or infrared (IR) cut layer that has been formed between the front transparent conductor layer 17 and the substrate. In addition, the imaging path through the aperture has been defined, in this case, by the addition of a visibly opaque layer having an inner opening. The visibly opaque layer in this example has been applied directly to the substrate, and is formed between the substrate and the adjacent anti-reflection and/or IR cut layer. Note also that openings are formed in the front anti-reflection and/or IR cut layer and a rear anti-reflection layer, so as to allow electrical contacts (not shown) to directly connect with the front and rear transparent conductor layers 17, 20, in order to apply the electro-optic aperture's activation voltage. In this case, the front and rear anti-reflection and/or IR cut layers entirely envelop or cover the aperture stack, except for the regions needed to make electrical contact (as shown).

Figure 47:
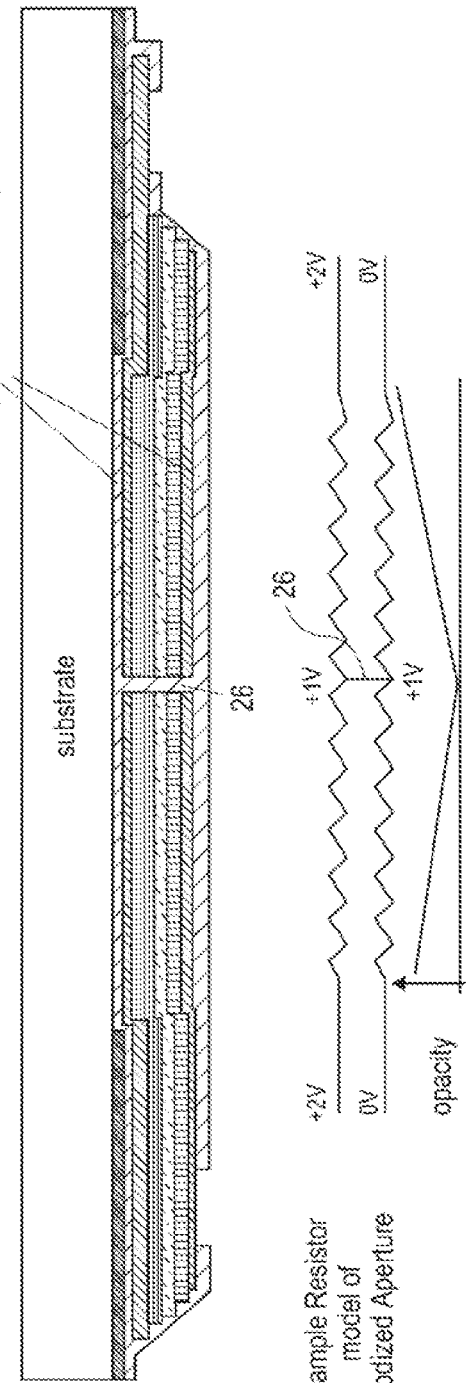
FIG. 47 is a cut-away view of an embodiment of the invention in which a conductive section has been added to directly connect the transparent conductor layers, within the imaging path.

Turning now to FIG. 47, another embodiment of the invention is shown in which the stack of FIG. 46 has been modified by the addition of a conductive section 26. This is described in FIG. 47 as being a small electrical short that is located approximately at the center of the imaging path, directly connecting the two transparent conductor layers 17, 20. In one embodiment, this conductive section or short 26 is relatively small, for example, on the order of about 10 micrometers thick or wide. The conductive section may be formed somewhat similar to how a via is formed in a microelectronic manufacturing process between different metal layers of an integrated circuit. Note that the conductive section 26 may be made of the same material as the front and rear transparent conductor mediums 17, 20.

FIG. 47 also shows an example resistor circuit model of such an "apodized" aperture, in which an activation voltage of in this case 2 Volts is being applied to the two transparent conductor layers 17, 20. The conductive section 26 by virtue of being located at the center of the imaging path will have the midpoint voltage of about +1 Volt. Note, however, that the potential across the active EC medium will vary from essentially zero volts at the center (due to the presence of the conductive section 26) and progressively greater towards the periphery of the imaging path, here up to 2 Volts at the periphery. This means that the EC medium is least opaque at the center, and progressively more opaque moving outward to the periphery. It can also be seen that if the conductive section 26 is made thicker or larger, the smallest or minimum pupil size of the aperture may also be larger, because the region of the EC layer across which there is zero voltage is larger.

Although FIG. 47 shows the conductive section 26 as being oriented at about 90° relative to the front and rear transparent conductor layers 17, 20, and is located closer to a center rather than a periphery of a cross-section of the imaging path, an alternative may be to locate and orient or shape the conductive section 26 differently. In addition, there may be more than one such discrete conductive section or short that directly connects the transparent conductor layers 17, 20.

Figure 48:
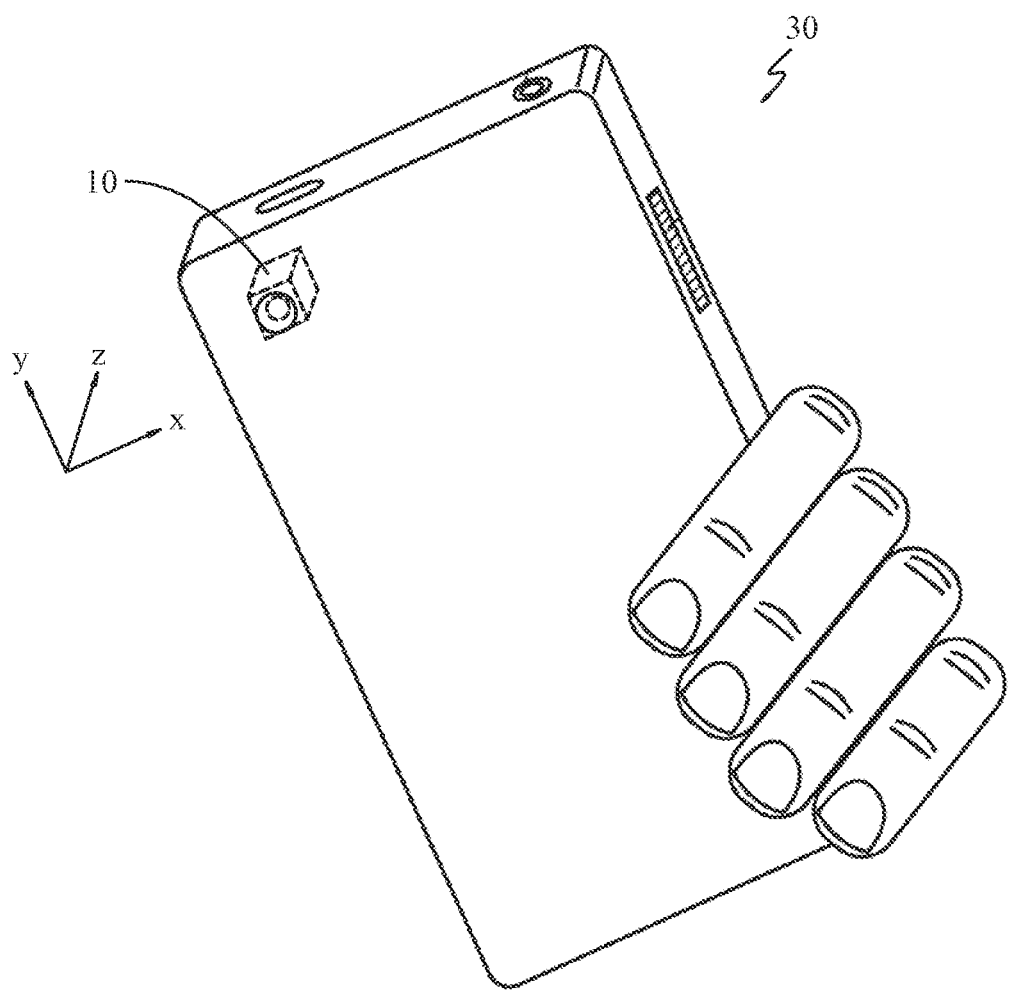
FIG. 48 is a perspective view of a portable wireless communications device in which a camera module is integrated.

Referring now to FIG. 48, a perspective view of a portable wireless communications device 30 in which a camera module 10 using a lens system in accordance with an embodiment of the invention is integrated. The device in this case may be a smart phone or a tablet computer, which is a handheld device in the sense of being intended for use while held in a single hand of the user. Of course, the camera module 10 may alternatively be integrated in other types of portable wireless devices, such as laptop or notebook computers, and it may also be integrated within non-portable devices such as desktop personal computers, television monitors, or any other electronic device that has a particularly short profile in the Z-axis (Z-height). In the case of the smart phone or tablet computer, the device has an outer housing in which is integrated a cellular network wireless communications circuit that enables the device to function as a mobile telephony terminal or end station. The portable wireless communications device may have an outer housing whose Z-height is in the range of 8 mm-13 mm, thereby being particularly fitting to receive therein a camera module that has a Z-height within the range of 6 mm-9 mm.

The following descriptions provide further details of the exemplary embodiments illustrated in FIGS. 1 through 27 of a compact lens system having a low F-number that may be used in a small form factor camera.

FIG. 1 is a cross-sectional illustration of an example embodiment of a compact lens system 110. The lens system 110 includes six lens components 101-106 with refractive power. The parts of the lens system 110 are arranged along an optical axis AX of the lens system from an object side to an image side (from left to right in the drawing) as follows:

a first lens component $L_1$ 101 with positive refractive power having a convex object side surface and focal length $f_1$;

an aperture stop AS 114;

a second lens component $L_2$ 102 with negative refractive power having a convex object side surface and focal length $f_2$;

a third lens component $L_3$ 103 with positive refractive power and focal length $f_3$;

a fourth lens component $L_4$ 104 with positive refractive power and focal length $f_4$;

a fifth lens component $L_5$ 105 with positive refractive power and focal length $f_5$; and a sixth lens component $L_6$ 106 with negative refractive power and focal length $f_6$.

The lens system 110 forms an image at the surface of a photosensor 118. In some embodiments, an infrared (IR) filter 116 may be located between the sixth lens component $L_6$ 106 and the photosensor 118.

The effective focal length of the lens system 110 is given by f. The total track length (TTL) of the compact lens system 110 is the distance along the optical axis between the object side surface of the first component $L_1$ and the image plane. The lens system 110 is configured such that the ratio (TTL/f) of the lens system 110 satisfies the relation:

$$1.0 < TTL/f < 2.0$$

An aperture stop AS 114, which may be located at the front surface of lens component $L_1$ 101, determines the entrance pupil of the lens system 110. The lens system 110 focal ratio or f-number is defined as the lens system 110 effective focal length f divided by the entrance pupil diameter. The IR filter 118 may act to block infrared radiation that could damage or adversely affect the photosensor, and may be configured so as to have no effect on f.

Tables 1A and 1B provide example values for various optical and physical parameters of an example embodiment of the lens system 110 as illustrated in FIG. 1. Tables 1A and 1B may be referred to as providing an optical prescription for the lens system 110. The optical prescription in Tables 1A and 1B describes an example embodiment of a compact lens system 110 as illustrated in FIG. 1 that includes six lens components with refractive power and effective focal length f.

Referring to Tables 1A and 1B, embodiments of lens system 110 cover applications in the visible region of the spectrum from 470 nanometers (nm) to 650 nm with a reference wavelength at 555 nm. The optical prescription in Tables 1A and 1B provides high image quality at f/1.8 over 470 nm to 650 nm spectrum, for an effective focal length f of 4.1 millimeters (mm), covering 77.6 degrees field of view (FOV) (38.8 degrees half FOV). The lens system 110, illustrated in FIG. 1 and with optical prescription as shown in Tables 1A and 1B, has total track length TTL of 5.802 mm and ratio (TTL/f) of 1.4151.

The six lens components $L_1$, $L_2$, $L_3$, $L_4$, $L_5$, and $L_6$ of lens system 110 may be composed of plastic materials with refractive indices and Abbe numbers as listed in Table 1A. As shown in Table 1A, in at least some embodiments of lens system 110, three types of plastic materials may be used for the lens components. Lens component $L_1$ may be composed of plastic material with an Abbe number of 56.3, and $L_3$, $L_4$, and $L_5$ may be composed of the same plastic material with an Abbe number $V_1$ of 55.9, and lens components $L_2$ and $L_6$, may be composed of another plastic material with an Abbe number $V_2$ of 22.4. The application of these plastic materials for the lens components in lens system 110 enables lens system 110 to be optimized and corrected for chromatic aberrations over the visible region.

The lens component materials may be chosen and the refractive power distribution of the lens components may be calculated to satisfy the effective focal length f and correction of the field curvature or Petzval sum. The monochromatic and chromatic variations of optical aberrations may be reduced by adjusting the radii of curvature and aspheric coefficients or geometrical shapes of the lens components and axial separations as illustrated in Table 1B to produce well corrected and balanced minimal residual aberrations.

Figure 2:
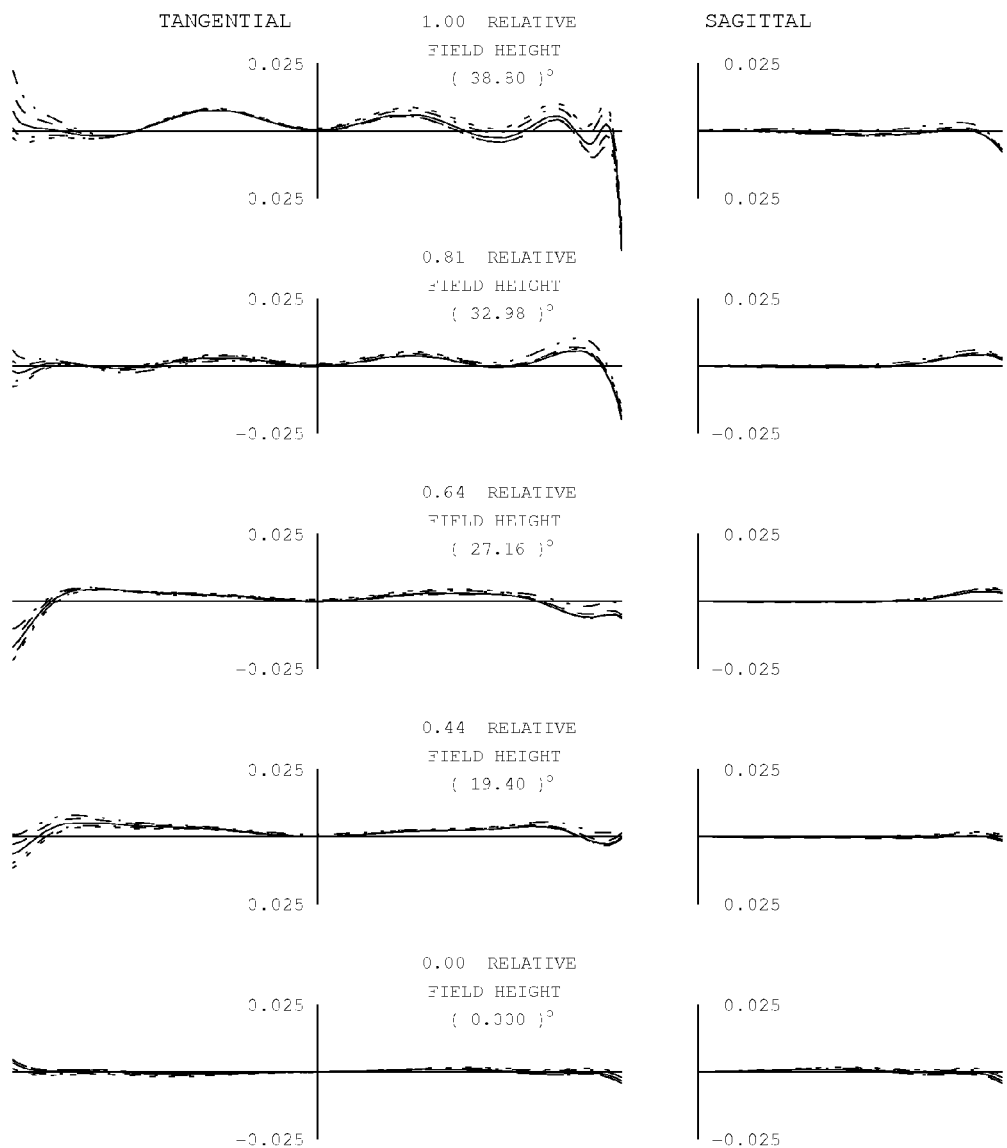
FIG. 2 shows the polychromatic ray aberration curves over the half field of view and over the visible spectral band ranging 470 nm to 650 nm for the lens system illustrated in FIG. 1.

FIG. 2 shows the polychromatic ray aberration curves over the half field of view (HFOV=38.8 degrees) over the visible spectral band ranging from 470 nm to 650 nm for a lens system 110 as illustrated in FIG. 1 and described in Tables 1A and 1B.

Figure 3:
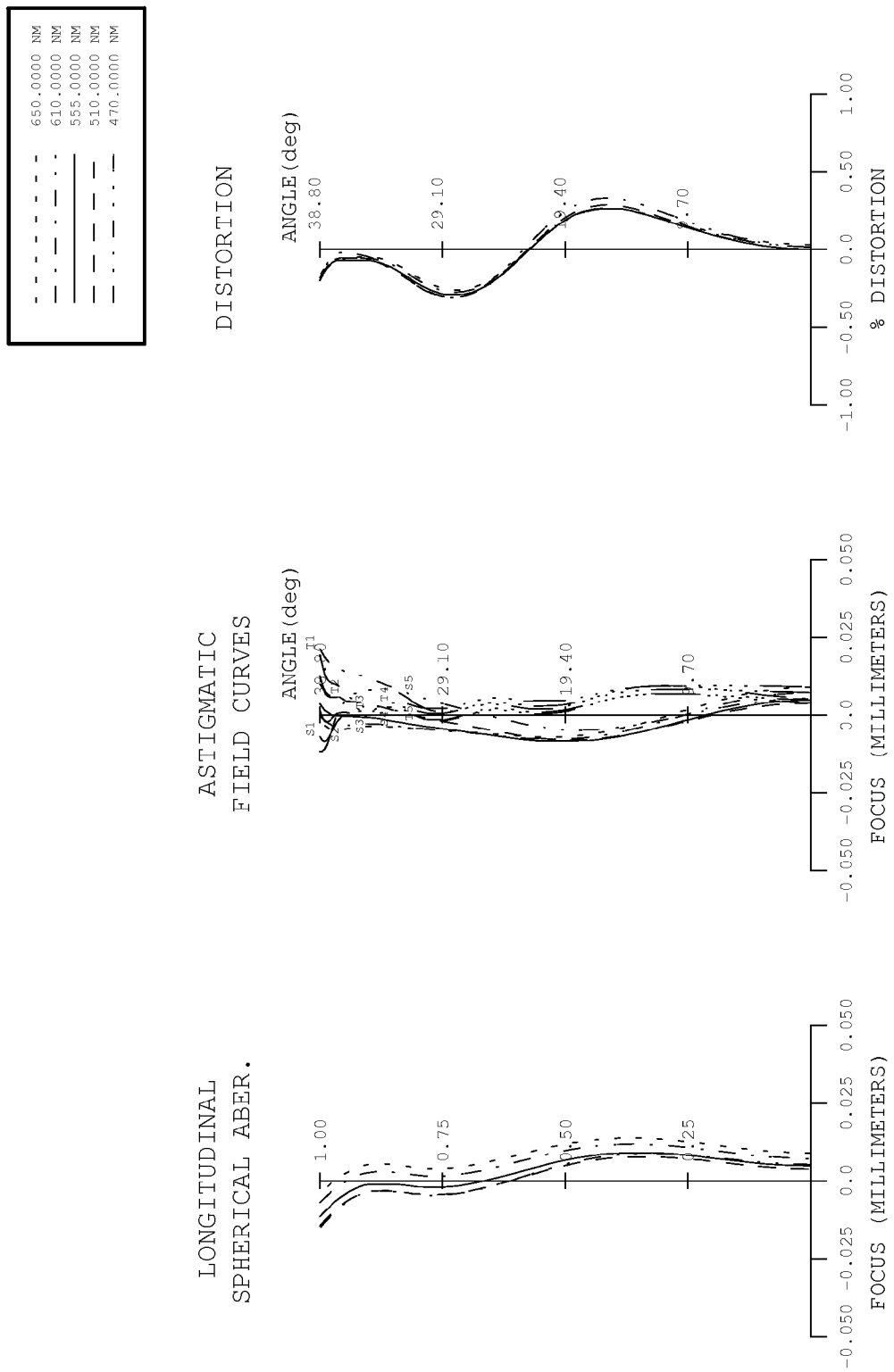
FIG. 3 shows the polychromatic curves of spherical aberration, astigmatism, and distortion over the visible band ranging 470 nm to 650 nm for the lens system illustrated in FIG. 1.

FIG. 3 shows the polychromatic curves for the chromatic variations of spherical aberration, astigmatic field curves, and distortion for the lens system 110 as illustrated in FIG. 1 and described in Tables 1A and 1B.

The second lens component $L_2$ 102 of the lens system 110 has negative refractive power or negative focal length $f_2$ and a convex object side surface. In addition, lens component $L_2$ of lens system 110 is negative meniscus in shape and has positive vertex radii of curvature $R_3$ and $R_4$, where $R_3 > R_4$, and $R_3/R_4$ is about 2.371.

In the example embodiment of the lens system 110 as described by the optical prescription in Tables 1A and 1B, the refractive powers of the lens components are distributed such that the ratios of the focal lengths of the lens component relative to the system focal length f are as follows:

$|f_1/f|=0.908$, $|f_2/f|=1.430$, $|f_3/f|=2.384$, $|f_4/f|=5.962$, $|f_5/f|=2.765$, and $|f_6/f|=1.180$.

The lens components have vertex radii of curvature that satisfy the following relations:

$L_1\ R_1/R_2=-0.808$, $L_2\ R_3/R_4=2.371$, $L_3\ R_5/R_6=-0.392$, $L_4\ R_7/R_8=1.013$, $L_5\ R_9/R_{10}=0.782$, and $L_6\ R_{11}/R_{12}=110.099$.

The aspheric coefficients for the surfaces of the lens components in lens system 110 in the example embodiment are listed in Table 1B. Configuring lens system 110 according to the arrangement of the power distribution of the lens components, and adjusting the radii of curvature and aspheric coefficient as shown in Tables 1A and 1B, the total track length (TTL), of the lens system 110 may be reduced (e.g., to 5.802 mm as shown in Table 1A). Aberration of the system may effectively be corrected to obtain optical performance of high image quality resolution in a small form factor WFOV, f/1.80 lens system 110.

FIG. 4 is a cross-sectional illustration of an example embodiment of a compact lens system 210. The lens system 210 includes six lens components 201-206 with refractive power. The lens system 210 may be viewed as a variation of the lens system 110 of FIG. 1 and components of the two systems 110, 210 may be similar. However, in lens system 210, the system F-number or focal ratio is f/1.75.

Tables 2A and 2B provide example values for various optical and physical parameters of an example embodiment of a lens system 210 as illustrated in FIG. 4. Tables 2A and 2B may be referred to as providing an optical prescription for a lens system 210. The optical prescription in Tables 2A and 2B describe an example embodiment of a lens system as illustrated in FIG. 4 that includes six lens components with refractive power and effective focal length f.

The optical prescription in Tables 2A and 2B is for lens system 210 with an effective focal length f of 4.1 mm at 555 nm wavelength, a focal ratio of f/1.75, with 77.6 degrees FOV, TTL of 5.801 mm, and with TTL/f equal to 1.4148. Lens system 210 is a compact imaging system designed for visible spectrum covering 470 nm to 650 nm.

The lens components $L_1$, $L_2$, $L_3$, $L_4$, $L_5$, and $L_6$ 201-206 of the lens system 210 may be composed of plastic materials with refractive indices and Abbe numbers as listed in Table 2A. In this example embodiment of a lens system 210, the choice of lens materials is as listed in Table 1A. Referring to the lens system 210, the lens component $L_1$, $L_3$, $L_4$, and $L_5$ 201, 203-205 may be composed of a plastic material having an Abbe number of $V_1=55.9$. The lens components $L_2$ 202 and $L_6$ 206 may be composed of a plastic material with Abbe number $V_2=22.4$.

The lens system 210 as specified in Tables 2A and 2B is configured to correct optical aberrations as described above for the lens system 110 specified by the optical prescription in Tables 1A and 1B.

Figure 5:
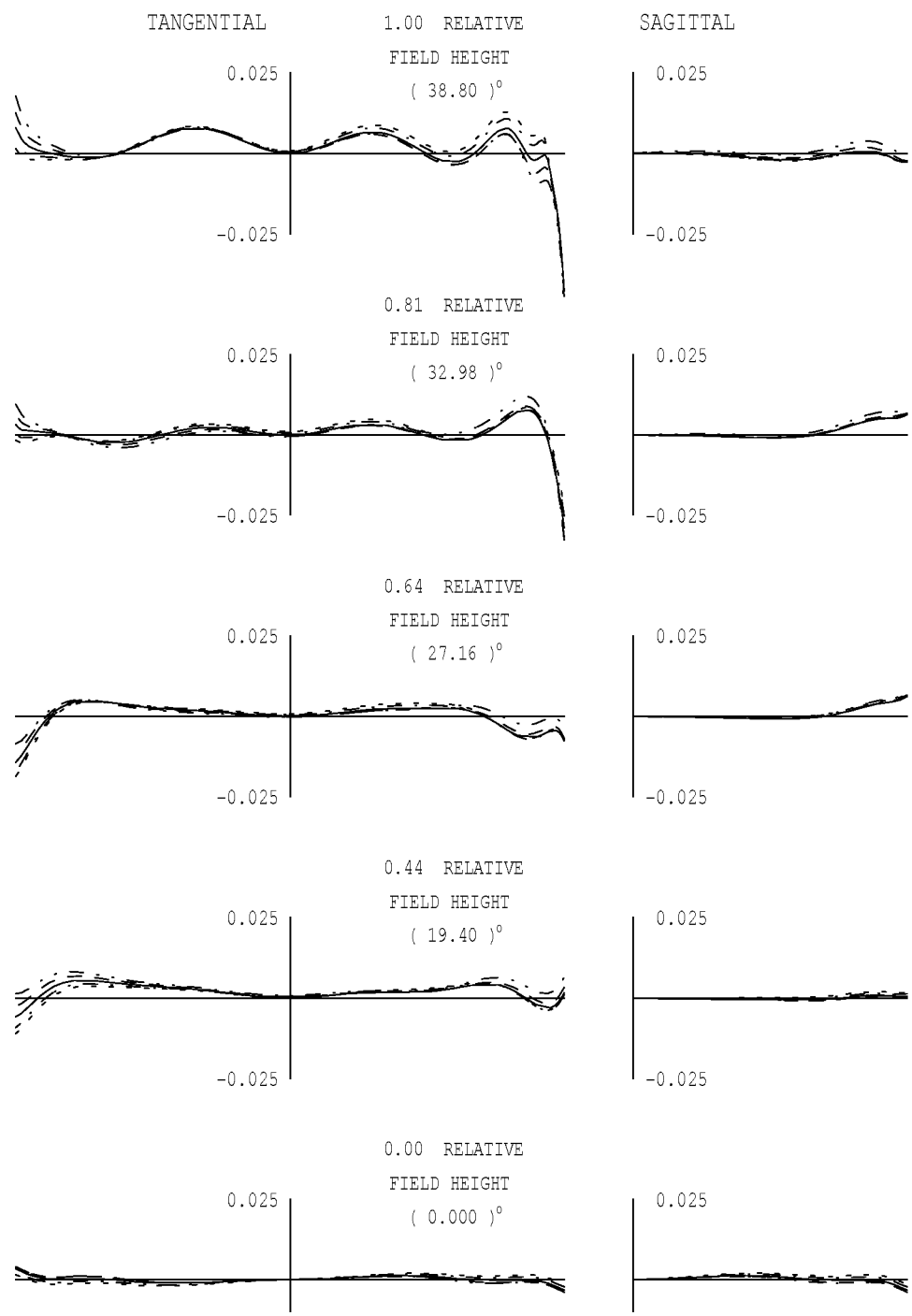
FIG. 5 shows the polychromatic ray aberration curves over the half field of view and over the visible spectral band ranging 470 nm to 650 nm for the lens system illustrated in FIG. 4.

FIG. 5 shows the polychromatic ray aberration curves over the half field of view (HFOV=38.8 degrees) for an object located at infinity (object distance>20 meters) for object point on-axis (at 0 degree) to an off-axis field point at 38.8 degrees, and over the visible band ranging from 470 nm to 650 nm for a compact lens system 210 as illustrated in FIG. 4 and described in Tables 2A and 2B.

Figure 6:
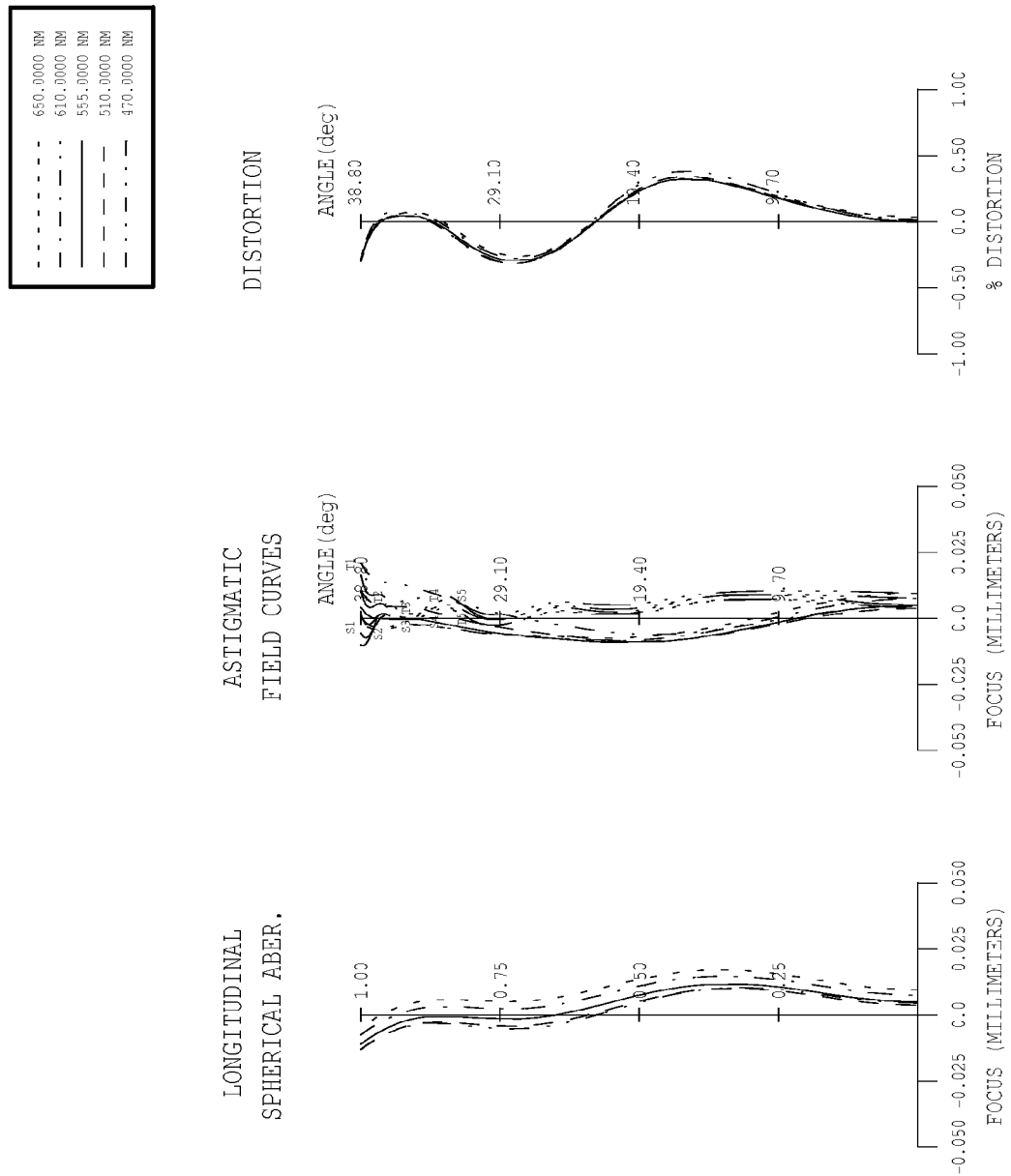
FIG. 6 shows the polychromatic curves of spherical aberration, astigmatism, and distortion over the visible band ranging 470 nm to 650 nm for the lens system illustrated in FIG. 4.

FIG. 6 shows the polychromatic curves for the chromatic variations of spherical aberration, astigmatic field curves, and distortion for the lens system 210 as illustrated in FIG. 4 and described in Tables 2A and 2B.

In the example embodiment of the lens system 210 as described by the optical prescription in Tables 2A and 2B, the refractive powers of the lens components are distributed such that the ratios of the focal lengths of the lens component relative to the system focal length f are as follows:

$$|f_1/f|=0.935,$$

$$|f_2/f|=1.432,$$

$$|f_3/f|=2.260,$$

$$|f_4/f|=6.210,$$

$$|f_5/f|=2.692, \text{ and}$$

$$|f_6/f|=1.212.$$

The lens components have vertex radii of curvature that satisfy the following relations:

$$L_1 \, R_1/R_2=-0.701,$$

$$L_2 \, R_3/R_4=2.252,$$

$$L_3 \, R_5/R_6=-0.145,$$

$$L_4 \, R_7/R_8=1.011,$$

$$L_5 \, R_9/R_{10}=0.768, \text{ and}$$

$$L_6 \, R_{11}/R_{12}=22.807.$$

The aspheric coefficients for the surfaces of the lens components in the lens system 210 in the example embodiment are listed in Table 2B. Configuring lens system 210 according to the arrangement of the power distribution of the lens components, and adjusting the radii of curvature and aspheric coefficient as shown in Tables 2A and 2B, the total track length (TTL), of the lens system 210 may be reduced (e.g., to 5.801 mm as shown in Table 2A). Aberration of the system may effectively be corrected to obtain optical performance of high image quality resolution, for an object scene at infinity in a small form factor f/1.75 lens system 210.

FIG. 7 is a cross-sectional illustration of an example embodiment of a compact lens system 310. The lens system 310 includes a wafer lens component $L_1$ 301 with refractive power and five lens components 302-306 with refractive power. The parts of the lens system 310 are arranged along an optical axis AX of the lens system from an object side to an image side (from left to right in the drawing) as follows:

an aperture stop AS 314, a first wafer lens component $L_1$ 301 with positive refractive power having a convex object side surface and focal length $f_1$, a second lens component $L_2$ 302 with negative refractive power and focal length $f_2$, a third lens component $L_3$ 303 with positive refractive power and focal length $f_3$, a fourth lens component $L_4$ 304 with positive refractive power having a convex image side surface and focal length $f_4$, a fifth lens component $L_5$ 305 with positive refractive power and focal length $f_5$, and a sixth lens component $L_6$ 306 with negative refractive power.

The lens system 310 forms an image at the surface of a photosensor 318. In some embodiments, an infrared (IR) filter 316 may be located between the sixth lens component $L_6$ 306 and the photosensor 318.

The effective focal length of the lens system 310 is given by f. The total track length (TTL) of the compact lens system 310 is the distance along the optical axes AX between the object side surface of the first component $L_1$ and the image plane. Referring to FIG. 7, the TTL is the axial distance between the front vertex of the object side surface of $L_1$ and the image plane. The lens system 310 is configured such that the ratio (TTL/f) of the lens system 310 satisfies the relation:

$$1.0<TTL/f<2.0.$$

An aperture stop AS 314, which may be located at the front surface of lens component $L_1$ 301, determines the entrance pupil of the lens system 310. The lens system 310 focal ratio or f-number is defined as the lens system 310 effective focal length f divided by the entrance pupil diameter. The IR filter 318 may act to block infrared radiation that could damage or adversely affect the photosensor, and may be configured so as to have no effect on f.

Tables 3A and 3B provide example values of various optical and physical parameters of an example embodiment of a lens system 310 as illustrated in FIG. 7. Tables 3A and 3B may be referred to as providing an optical prescription for a lens system 310. The optical prescription in Tables 3A and 3B is for a lens system 310 with an effective focal length f of 4.1 mm at 555 nm wavelength, a focal ratio of f/1.8, with 77.6 degrees FOV, TTL of 5.80 mm, and with TTL/f equal to 1.4146. Lens system 310 is a compact imaging system designed for visible spectrum covering 470 nm to 650 nm.

The wafer lens component $L_1$ 301 may be composed of a planar substrate 322 and layer laminates 324, 326 of UV curable polymeric or plastic materials (listed in Table 3B) formed using known manufacturing methods such as casting, molding, or microlithographic process on the planar substrate, which may be a planar glass substrate. The remaining five lens components $L_2$, $L_3$, $L_4$, $L_5$, and $L_6$ 302-306 of the lens system 310 may be composed of plastic materials with refractive indices and Abbe numbers as listed in Table 3A. In this example embodiment of a lens system 310, the choice of lens materials for the refractive lens components are the same as in the optical prescription for the lens system 110 as listed in Table 1A. Referring to the lens system 310 as specified in Tables 3A and 3B, the lens component $L_3$, $L_4$, and $L_5$ 303-305 may be composed of a plastic material having an Abbe number of $V_1=55.9$. The lens components $L_2$ 302 and $L_6$ 306 may be composed of a plastic material with Abbe number $V_2=22.4$.

The lens system 310 as specified in Tables 3A and 3B is configured to correct optical aberrations as described above for the lens system 110 specified by the optical prescription in Tables 1A and 1B.

Figure 8:
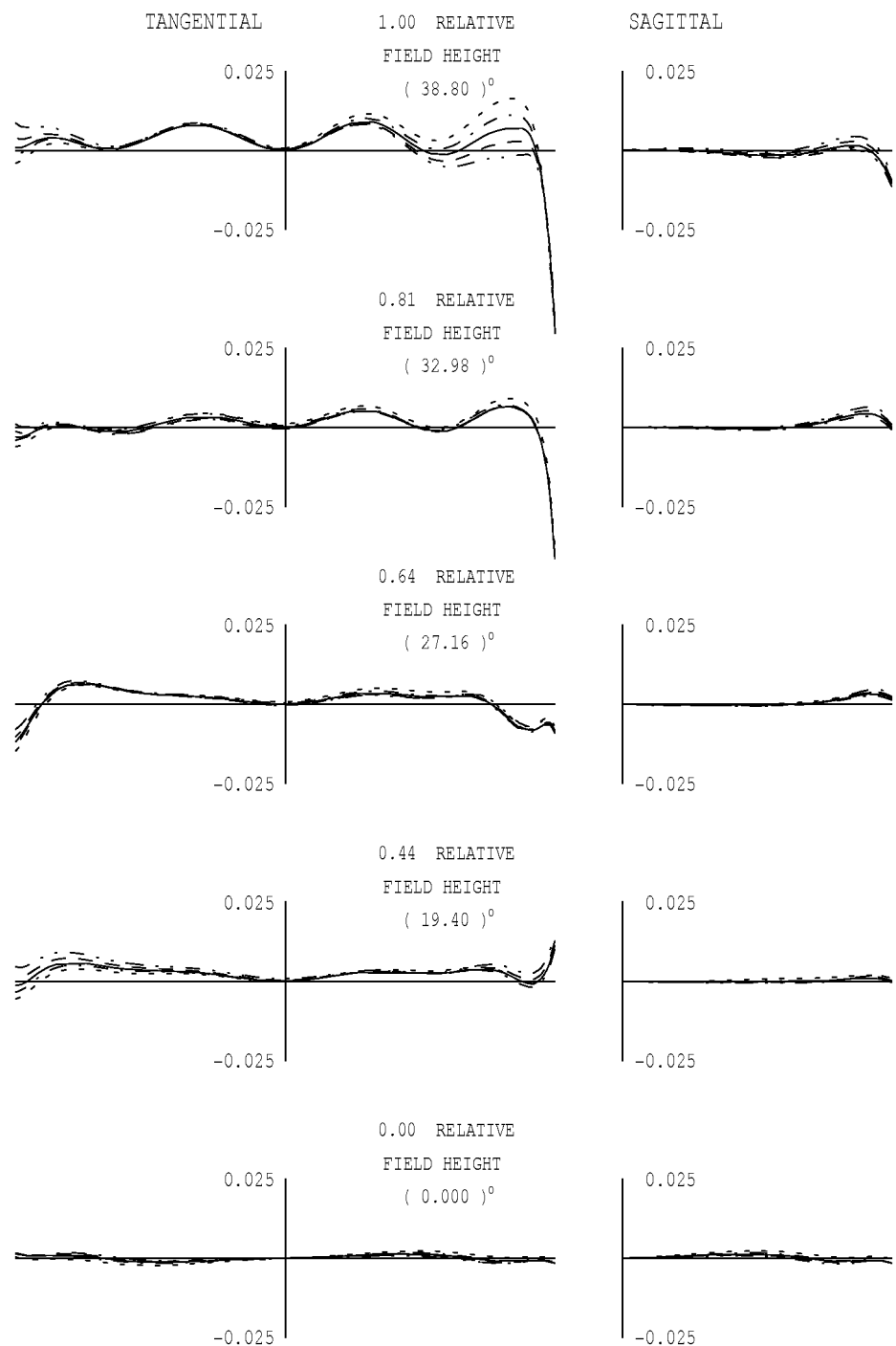
FIG. 8 shows the polychromatic ray aberration curves over the half field of view and over the visible spectral band ranging 470 nm to 650 nm for the lens system illustrated in FIG. 7.

FIG. 8 shows the polychromatic ray aberration curves over the half field of view (HFOV=38.8 degrees) for an object point on-axis (at 0 degree) to an off-axis field point at 38.8 degrees, and over the visible band ranging from 470 nm to 650 nm for a compact lens system 310 as illustrated in FIG. 7 and described in Tables 3A and 3B.

Figure 9:
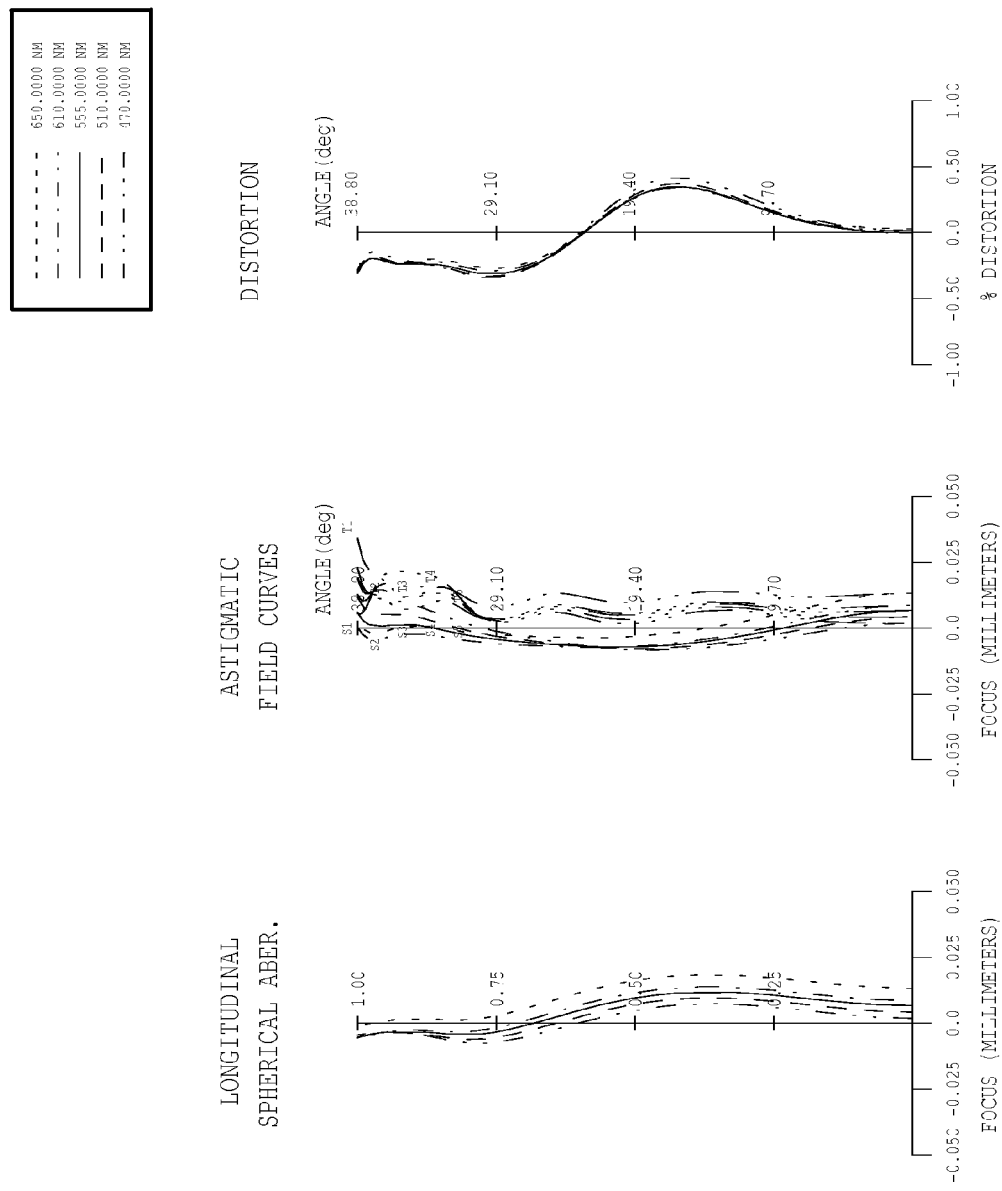
FIG. 9 shows the polychromatic curves of spherical aberration, astigmatism, and distortion over the visible band ranging 470 nm to 650 nm for the lens system illustrated in FIG. 7.

FIG. 9 shows the polychromatic curves for the chromatic variations of spherical aberration, astigmatic field curves, and distortion for the lens system 310 as illustrated in FIG. 7 and described in Tables 3A and 3B. Note that the plots illustrated in FIGS. 8 and 9 show well corrected aberrations of the lens system 310 in FIG. 7.

In the example embodiment of the lens system 310 as described by the optical prescription in Tables 3A and 3B, the refractive powers of the lens components are distributed such that the ratios of the focal lengths of the lens component relative to the system focal length f are as follows:

$|f_1/f|=1.030$, $|f_2/f|=1.564$, $|f_3/f|=1.976$, $|f_4/f|=6.439$, $|f_5/f|=2.576$, and $|f_6/f|=1.111$.

The lens components have vertex radii of curvature that satisfy the following relations:

$L_1 R_1/R_2=-0.544$, $L_2 R_3/R_4=2.052$, $L_3 R_5/R_6=-0.611$, $L_4 R_7/R_8=1.021$, $L_5 R_9/R_{10}=0.771$, and $L_6 R_{11}/R_{12}=-47.688$.

The aspheric coefficients for the surfaces of the lens components in lens system 310 in the example embodiment are listed in Table 3B. Configuring lens system 310 according to the arrangement of the power distribution of the lens components, and adjusting the radii of curvature and aspheric coefficient as shown in Tables 3A and 3B, the total track length (TTL), of the lens system 310 may be reduced (e.g., to 5.800 mm as shown in Table 3A). Aberration of the system may effectively be corrected to obtain optical performance of high image quality resolution, for object scene at infinity in a small form factor f/1.80 lens system 310.

FIG. 10 is a cross-sectional illustration of an example embodiment of a low F-number (f/1.80) lens system 410. The lens system 410 includes a wafer lens component $L_1$ 401 and five additional lens components 402-406 with refractive power. The parts of the lens system 410 are arranged along an optical axis AX of the lens system from an object side to an image side (from left to right in the drawing) as follows:

a first wafer lens component $L_1$ 401 with positive refractive power having a convex object side surface and focal length $f_1$, an aperture stop AS 414 applied to the object side plano surface of the substrate 422 of the first wafer lens component 401, a second lens component $L_2$ 402 with negative refractive power and focal length $f_2$, a third lens component $L_3$ 403 with positive refractive power and focal length $f_3$, a fourth lens component $L_4$ 404 with positive refractive power having a convex image side surface and focal length $f_4$, a fifth lens component $L_5$ 405 with positive refractive power and focal length $f_5$, and a sixth lens component $L_6$ 406 with negative refractive power.

The lens system 410 forms an image at the surface of a photosensor 418. In some embodiments, an infrared (IR) filter 416 may be located between the sixth lens component $L_6$ 406 and the photosensor 418. The lens system 410 may be viewed as a variation of the lens system 310 of FIG. 7 and the components of the two systems 410 and 310 may be similar. However, in the lens system 410 of FIG. 10, the aperture stop is located at the first planar surface of the substrate 422 of the wafer lens component $L_1$ 401. The wafer lens component 401 comprises a planar substrate 422, which may be a planar glass substrate, with a first layer laminate 424 and a second layer laminate 426 of polymeric or plastic materials formed on the planar surfaces of the planar substrate.

An aperture stop (AS) 414 is applied to the object side plano surface of the planar substrate 422. The aperture stop 414 may be a fixed aperture stop in the form of a material applied to the planar substrate 422 to provide a transparent opening, such as a circular opening, centered on the optical axis. In another embodiment, a thin film layer 414 of conductive organic or inorganic material may be deposited on the planar substrate 422 to provide an aperture stop in the form of an electrochromic lens component having variable light transmittance in response to an applied electrical voltage. The electrochromic lens component 414 may provide a central transparent opening that can be adjusted by an applied voltage that provides a variable intensity profile distribution across the aperture opening for the light energy transmitted through the optical system.

Tables 4A and 4B provide example values of various optical and physical parameters of an example embodiment of the lens system 410 as illustrated in FIG. 10. The lens system 410 may be equipped with an electrochromic layer for dynamically varying the light transmittance of the lens in response to an applied electrical voltage.

Tables 4A and 4B may be referred to as providing an optical prescription for a lens system 410. The optical prescription in Tables 4A and 4B is for lens system 410 with an effective focal length f of 4.10 mm at 555 nm wavelength, a focal ratio of f/1.8, with 77.6 degrees FOV, TTL of 5.800 mm, and with TTL/f equal to 1.4146. Lens system 410 is a compact imaging system designed for visible spectrum covering 470 nm to 650 nm.

The wafer lens component $L_1$ 401 may be composed of a planar substrate 422 and layer laminates 424, 426 of UV curable polymeric or plastic materials (with refractive indices and Abbe numbers listed in Table 4A) formed using known manufacturing methods such as casting, molding, or microlithographic process on the planar substrate. The remaining five lens components $L_2$, $L_3$, $L_4$, $L_5$, and $L_6$ 402-406 of the lens system 410 may be composed of plastic materials with refractive indices and Abbe numbers as listed in Table 4A. In this example embodiment of a lens system 410, the choice of lens materials for the refractive lens components are the same as in the optical prescription for the lens system 310 as listed in Table 3A. Referring to the lens system 410 as specified in Tables 4A and 4B, the lens component $L_3$, $L_4$, and $L_5$ 403-405 may be composed of a plastic material having an Abbe number of $V_1$=55.9. The lens components $L_2$ 402 and $L_6$ 406 may be composed of a plastic material with Abbe number $V_2$=22.4.

The lens system 410 as specified in Tables 4A and 4B is configured to correct optical aberrations as described above for the lens system 110 specified by the optical prescription in Tables 1A and 1B.

Figure 11:
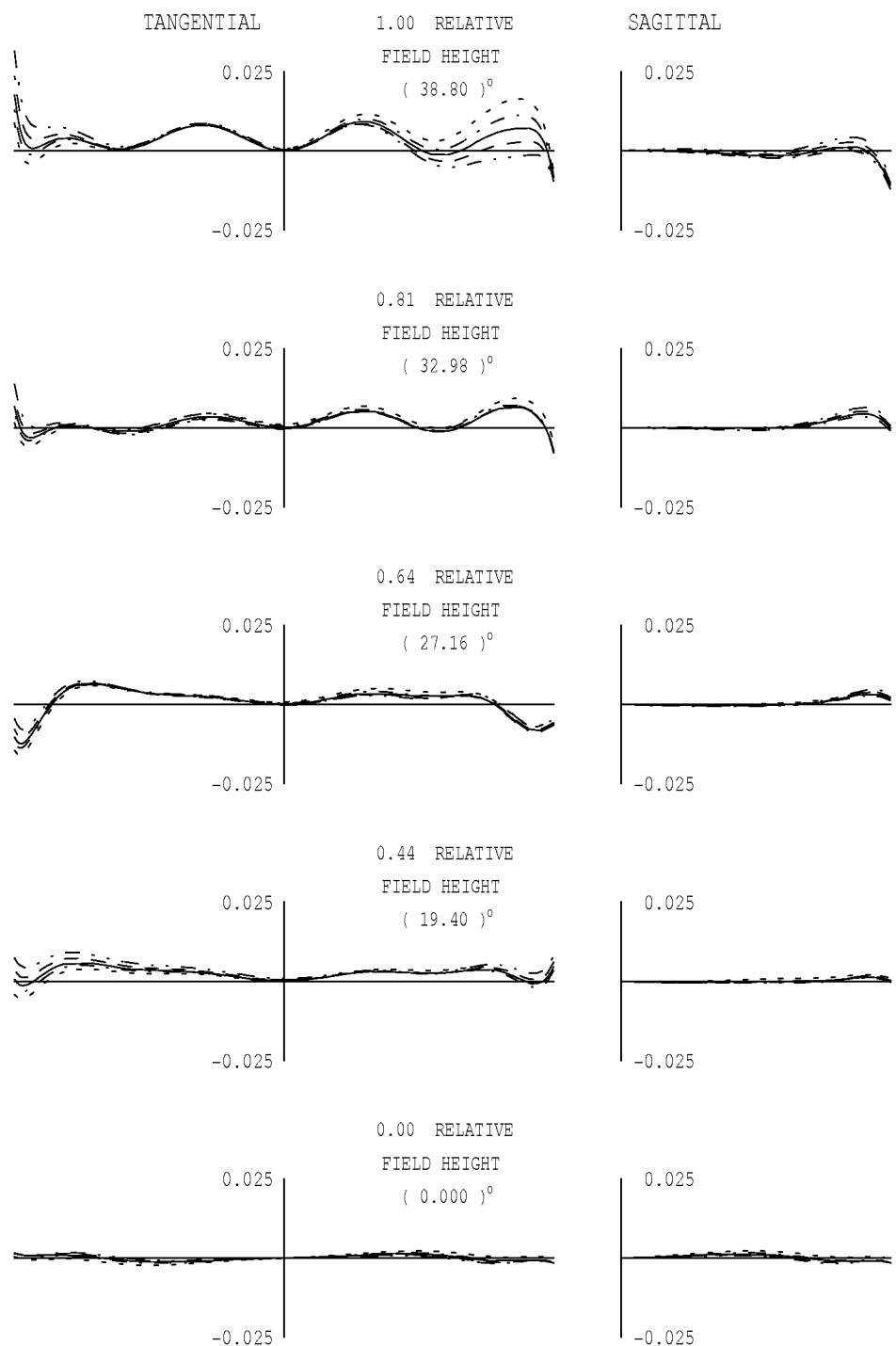
FIG. 11 shows the polychromatic ray aberration curves over the half field of view and over the visible spectral band ranging 470 nm to 650 nm for the lens system illustrated in FIG. 10.

FIG. 11 shows the polychromatic ray aberration curves over the half field of view (HFOV=38.8 degrees) for an object point on-axis (at 0 degree) to an off-axis field point at 38.8 degrees, and over the visible band ranging from 470 nm to 650 nm for a compact lens system 410 as illustrated in FIG. 10 and described in Tables 4A and 4B.

Figure 12:
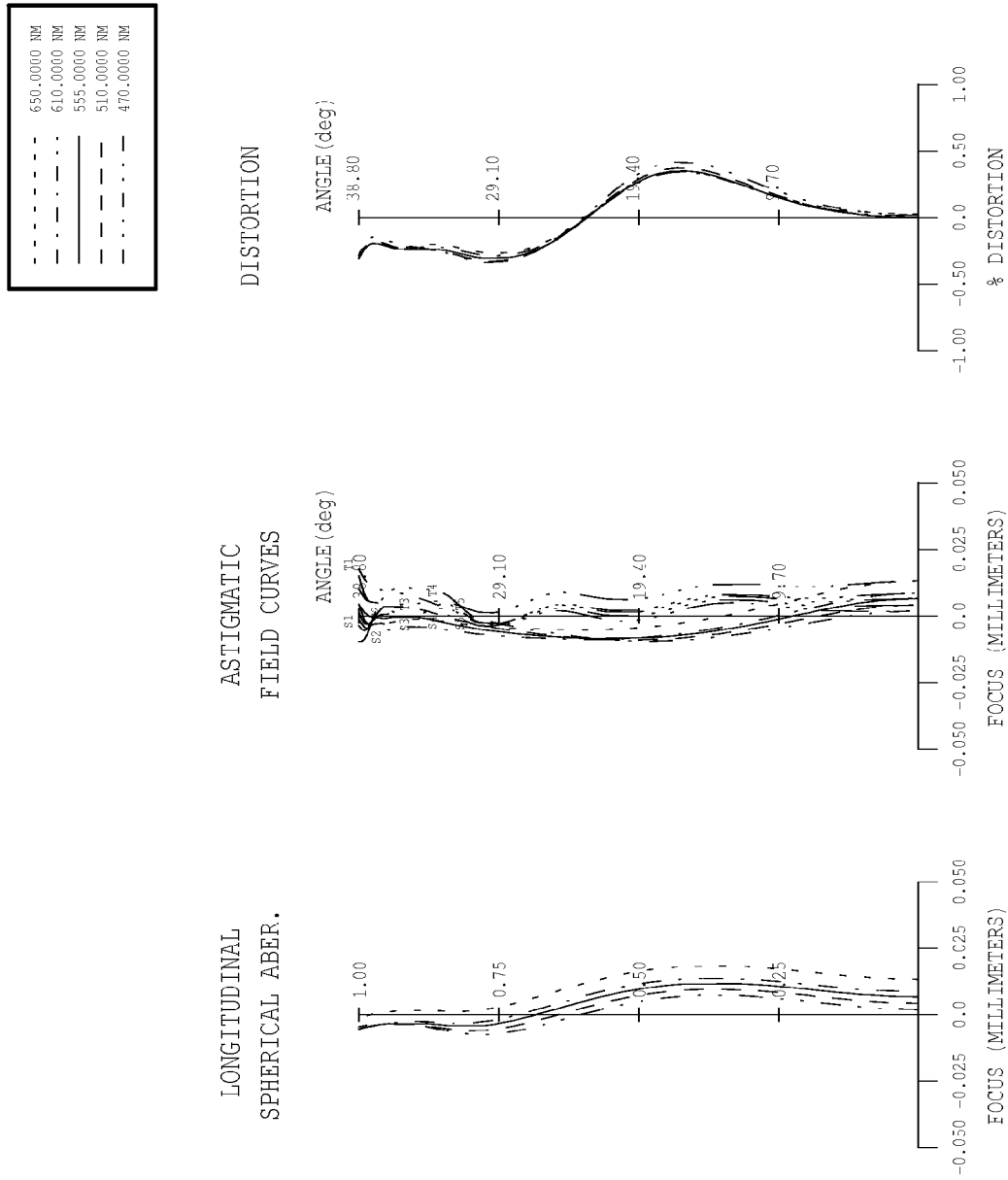
FIG. 12 shows the polychromatic curves of spherical aberration, astigmatism, and distortion over the visible band ranging 470 nm to 650 nm for the lens system illustrated in FIG. 10.

FIG. 12 shows the polychromatic curves for the chromatic variations of spherical aberration, astigmatic field curves, and distortion for the lens system 410 as illustrated in FIG. 10 and described in Tables 4A and 4B. Note that the plots illustrated in FIGS. 11 and 12 illustrate corrected aberrations of the lens system in FIG. 10.

In the example embodiment of the lens system 410 as described by the optical prescription in Tables 4A and 4B, the refractive powers of the lens components are distributed such that the ratios of the focal lengths of the lens component relative to the system focal length f are as follows:

$|f_1/f|=1.030,$ $|f_2/f|=1.564,$ $|f_3/f|=1.976,$ $|f_4/f|=6.439,$ $|f_5/f|=2.576,$ and $|f_6/f|=1.111.$ The lens components have vertex radii of curvature that satisfy the following relations:

$L_1\ R_1/R_2=-0.544,$ $L_2\ R_3/R_4=2.052,$ $L_3\ R_5/R_6=-0.611,$ $L_4\ R_7/R_8=1.021,$ $L_5\ R_9/R_{10}=0.771,$ and $L_6\ R_{11}/R_{12}=-47.688.$ The aspheric coefficients for the surfaces of the lens components in lens system 410 in the example embodiment are listed in Table 4B. Configuring lens system 410 according to the arrangement of the power distribution of the lens components, and adjusting the radii of curvature and aspheric coefficient as shown in Tables 4A and 4B, the total track length (TTL), of the lens system 410 may be reduced (e.g., to 5.800 mm as shown in Table 4A). Aberration of the system may effectively be corrected to obtain optical performance of high image quality resolution, for object scene at infinity in a small form factor f/1.80 lens system 410.

FIG. 13 is a cross-sectional illustration of an example embodiment of a low F-number (f/1.80) lens system 510. The lens system 510 includes a wafer lens component $L_1$ 501 with refractive power and five lens components (502-506) with refractive power. The parts of the lens system 310 are arranged along an optical axis AX of the lens system from an object side to an image side (from left to right in the drawing) as follows:

an aperture stop AS 514,
a first wafer lens component $L_1$ 501 with positive refractive power having a convex object side surface and focal length $f_1$,
a second lens component $L_2$ 502 with negative refractive power and focal length $f_2$,
a third lens component $L_3$ 503 with positive refractive power and focal length $f_3$,
a fourth lens component $L_4$ 504 with positive refractive power having a convex image side surface and focal length $f_4$,
a fifth lens component $L_5$ 505 with positive refractive power and focal length $f_5$, and
a sixth lens component $L_6$ 506 with negative refractive power.

The lens system 510 forms an image at the surface of a photosensor 518. In some embodiments, an infrared (IR) filter 516 may be located between the sixth lens component $L_6$ 506 and the photosensor 518.

This lens system 510 may be viewed as a similar in design configuration to the lens system 310 of FIG. 7. The components of the two systems 310, 510 may be similar. Both lens systems 310, 510 have an aperture stop 314, 514 located on the object side of the wafer lens component $L_1$ 301, 501. The wafer lens components 301, 501 comprise a planar substrate 322, 522, which may be a planar glass substrate, with a first laminate layer 324, 524 and a second laminate layer 326, 526 of polymeric or plastic materials formed on the planar surfaces of the planar substrates 322, 522. The planar substrates 322, 522 are comprised of different materials for the two lens systems 310, 510.

Tables 5A and 5B provide example values of various optical and physical parameters of an example embodiment of a lens system 510 as illustrated in FIG. 13. Tables 5A and 5B may be referred to as providing an optical prescription for a lens system 510. The optical prescription in Tables 5A and 5B is for lens system 510 with an effective focal length f of 4.10 mm at 555 nm wavelength, a focal ratio of f/1.8, with 77.6 degrees FOV, TTL of 5.809 mm, and with TTL/f equal to 1.4168. Lens system 510 is a compact imaging system designed for visible spectrum covering 470 nm to 650 nm.

The wafer lens component $L_1$ 501 may be composed of a planar substrate 522, which may be a planar glass substrate, and layer laminates 524, 526 of polymeric or plastic materials (with refractive indices and Abbe numbers listed in Table 5A) formed using known manufacturing methods such as casting, molding, or microlithographic process on the planar substrate. The remaining five lens components $L_2$, $L_3$, $L_4$, $L_5$, and $L_6$ 502-506 of lens system 510 may be composed of plastic materials with refractive indices and Abbe numbers as listed in Table 5A. In this example embodiment of lens system 510, the choice of lens materials for the refractive lens components are the same as in the optical prescription for the lens system 310 as listed in Table 3A. Referring to the lens system 510, the lens component $L_3$, $L_4$, and $L_5$ 503-505 may be composed of a plastic material having an Abbe number of $V_1$=55.9. The lens components $L_2$ and $L_6$ 502, 506 may be composed of a plastic material with Abbe number $V_2$=22.4.

The lens system 510 as specified in Tables 5A and 5B is configured to correct optical aberrations as described above for the lens system 110 specified by the optical prescription in Tables 1A and 1B.

Figure 14:
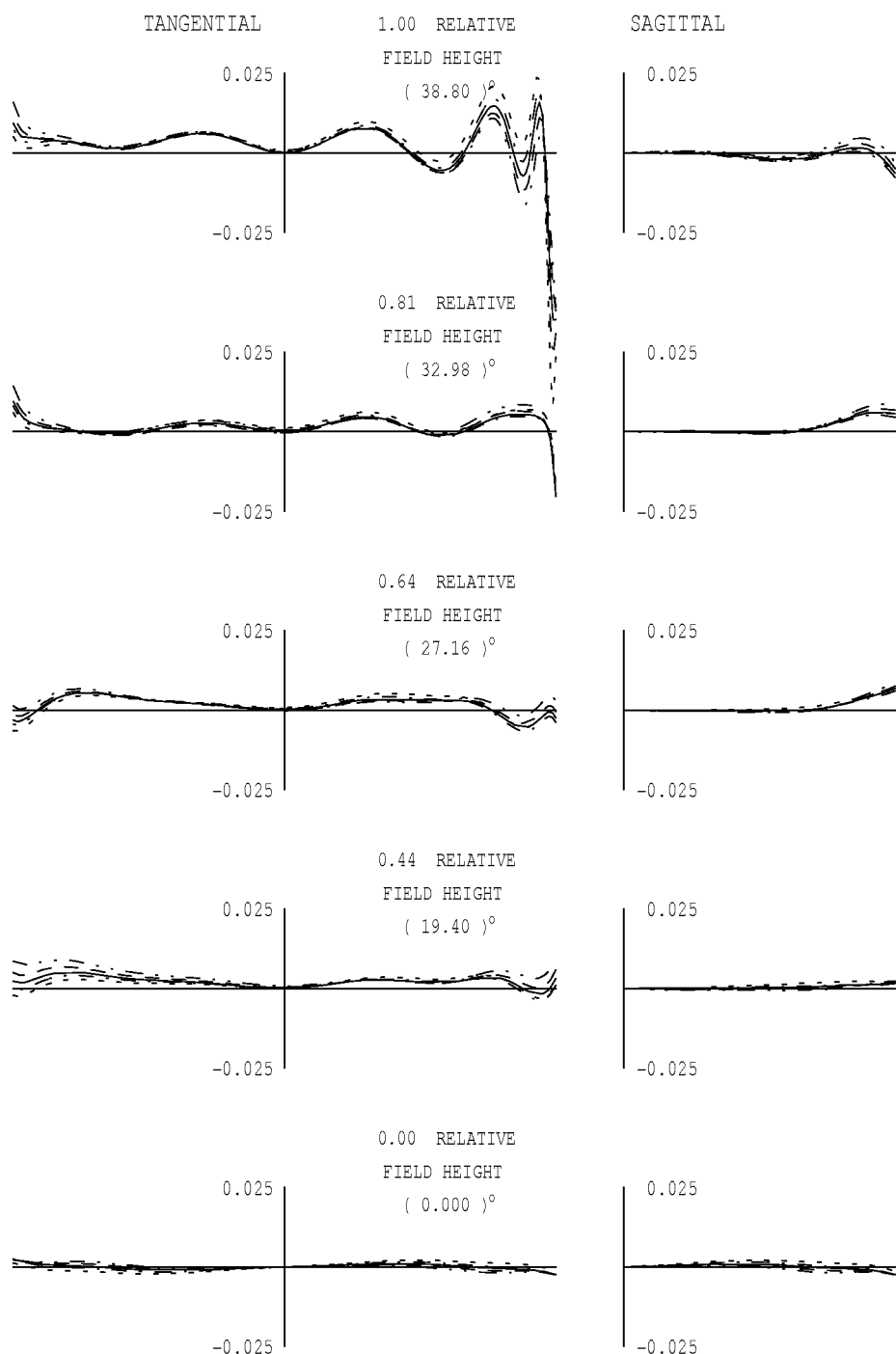
FIG. 14 shows the polychromatic ray aberration curves over the half field of view and over the visible spectral band ranging 470 nm to 650 nm for the lens system illustrated in FIG. 13.

FIG. 14 shows the polychromatic ray aberration curves over the half field of view (HFOV=38.8 degrees) for an object point on-axis (at 0 degree) to an off-axis field point at 38.8 degrees, and over the visible band ranging from 470 nm to 650 nm for a compact lens system 510 as illustrated in FIG. 13 and described in Tables 5A and 5B.

Figure 15:
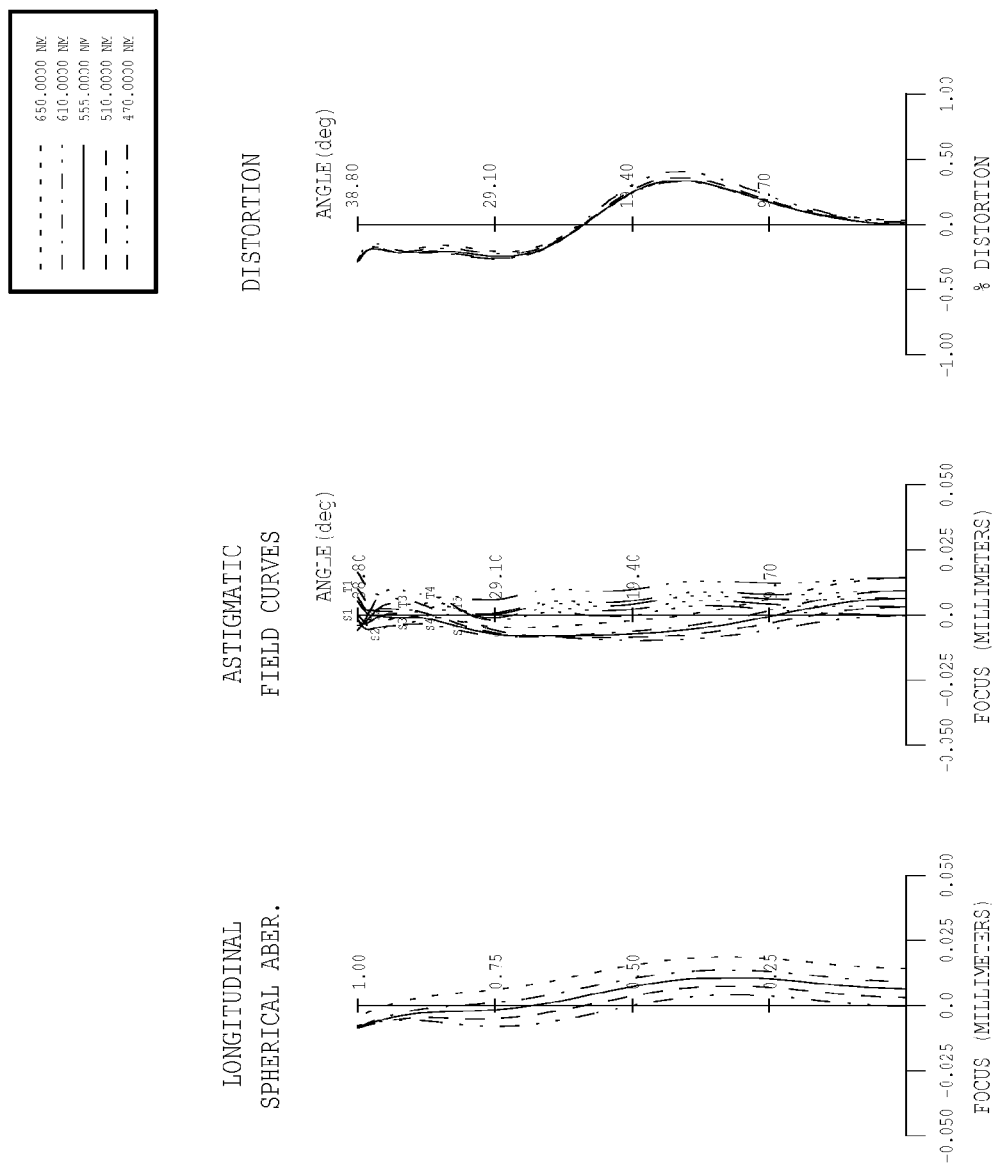
FIG. 15 shows the polychromatic curves of spherical aberration, astigmatism, and distortion over the visible band ranging 470 nm to 650 nm for the lens system illustrated in FIG. 13.

FIG. 15 shows the polychromatic curves for the chromatic variations of spherical aberration, astigmatic field curves, and distortion for the lens system 510 as illustrated in FIG. 13 and described in Tables 5A and 5B. Note that the plots illustrated in FIGS. 14 and 15 illustrate corrected aberrations of the lens system in FIG. 13.

In the example embodiment of the lens system 510 as described by the optical prescription in Tables 5A and 5B, the refractive powers of the lens components are distributed such that the ratios of the focal lengths of the lens component relative to the system focal length f are as follows:

$|f_1/f|=1.082$, $|f_2/f|=1.615$, $|f_3/f|=1.780$, $|f_4/f|=6.351$, $|f_5/f|=2.671$, and $|f_6/f|=1.087$.

The lens components have vertex radii of curvature that satisfy the following relations:

$L_1 R_1/R_2=-0.591$, $L_2 R_3/R_4=1.940$, $L_3 R_5/R_6=-0.566$, $L_4 R_7/R_8=1.014$, $L_5 R_9/R_{10}=0.781$, and $L_6 R_{11}/R_{12}=-20.098$.

The aspheric coefficients for the surfaces of the lens components in lens system 510 in the example embodiment are listed in Table 5B. Configuring lens system 510 according to the arrangement of the power distribution of the lens components, and adjusting the radii of curvature and aspheric coefficient as shown in Tables 5A and 5B, the total track length (TTL), of the lens system 510 may be reduced (e.g., to 5.809 mm as shown in Table 5A). Aberration of the system may effectively be corrected to obtain optical performance of high image quality resolution, for object scene at infinity in a small form factor f/1.80 lens system 510.

FIG. 16 is a cross-sectional illustration of an example embodiment of a low F-number (f/1.80) lens system 610. The lens system 610 includes a wafer lens component $L_1$ 601 and five additional lens components 602-606 with refractive power. The parts of the lens system 610 are arranged along an optical axis AX of the lens system from an object side to an image side (from left to right in the drawing) as follows:

a first wafer lens component $L_1$ 601 with positive refractive power having a convex object side surface and focal length $f_1$, an aperture stop AS 614 applied to the object side plano surface of the substrate 622 of the first wafer lens component 601, a second lens component $L_2$ 602 with negative refractive power and focal length $f_2$, a third lens component $L_3$ 603 with positive refractive power and focal length $f_3$, a fourth lens component $L_4$ 604 with positive refractive power having a convex image side surface and focal length $f_4$, a fifth lens component $L_5$ 605 with positive refractive power and focal length $f_5$, and a sixth lens component $L_6$ 606 with negative refractive power.

The lens system 610 forms an image at the surface of a photosensor 618. In some embodiments, an infrared (IR) filter 616 may be located between the sixth lens component $L_6$ 606 and the photosensor 618.

This lens system 610 may be viewed as similar in design configuration to the lens system 410 of FIG. 10. The components of the two systems 410, 610 may be similar. Both lens systems 410, 610 have an aperture stop located at one of the planar surfaces of the substrate 422, 622 of the wafer lens component $L_1$ 401, 601. The wafer lens components 401, 601 comprise a planar substrate 422, 622, which may be a planar glass substrate, with a first laminate layer 424, 624 and a second laminate layer 426, 626 of polymeric or plastic materials formed on the planar surfaces of the planar substrates 422, 622. The planar substrates 422, 622 are comprised of different materials for the two lens systems 410, 610.

An aperture stop (AS) 614 is applied to the object side plano surface of the planar substrate 622. The aperture stop 614 may be a fixed aperture stop in the form of a material applied to the planar substrate 622 to provide a transparent opening, such as a circular opening, centered on the optical axis. In another embodiment, a transparent thin film layer 614 of conductive organic polymer or inorganic material may be deposited on the planar substrate 622 to provide an aperture stop in the form of an electrochromic layer having variable light transmittance in response to an applied electrical voltage. The electrochromic lens component 614 may provide a central transparent opening that can be adjusted by an applied voltage that provides a variable intensity profile distribution across the aperture opening for the light energy transmitted through the optical system.

Tables 6A and 6B provide example values of various optical and physical parameters of an example embodiment of a lens system 610 as illustrated in FIG. 16. The lens system 610 may be equipped with electrochromic layer for dynamically varying the light transmittance of the lens in response to an applied electrical voltage. Tables 6A and 6B may be referred to as providing an optical prescription for a lens system 610. The optical prescription in Tables 6A and 6B is for lens system 610 with an effective focal length f of 4.10 mm at 555 nm wavelength, a focal ratio of f/1.8, with 77.6 degrees FOV, TTL of 5.809 mm, and with TTL/f equal to 1.4168. Lens system 610 is a compact imaging system designed for visible spectrum covering 470 nm to 650 nm.

The wafer lens component $L_1$ 601 may be composed of a planar substrate 622, which may be a planar glass substrate, and layer laminates 624, 626 of polymeric or plastic materials (with refractive indices and Abbe numbers listed in Table 6A) formed using known manufacturing methods such as casting, molding, or microlithographic process on the planar substrate. The remaining five lens components $L_2$, $L_3$, $L_4$, $L_5$, and $L_6$ 602-606 of lens system 610 may be composed of plastic materials with refractive indices and Abbe numbers as listed in Table 6A. In this example embodiment of a lens system 610, the choice of lens materials for the refractive lens components are the same as in the optical prescription for the lens system 410 as listed in Table 4A. Referring to the lens system 610, the lens component $L_3$, $L_4$, and $L_5$ 603-605 may be composed of a plastic material having an Abbe number of $V_1$=55.9. The lens components $L_2$ and $L_6$ 602, 606 may be composed of a plastic material with Abbe number $V_2$=22.4.

The lens system 610 as specified in Tables 6A and 6B is configured to correct optical aberrations as described above for the lens system 110 specified by the optical prescription in Tables 1A and 1B.

Figure 17:
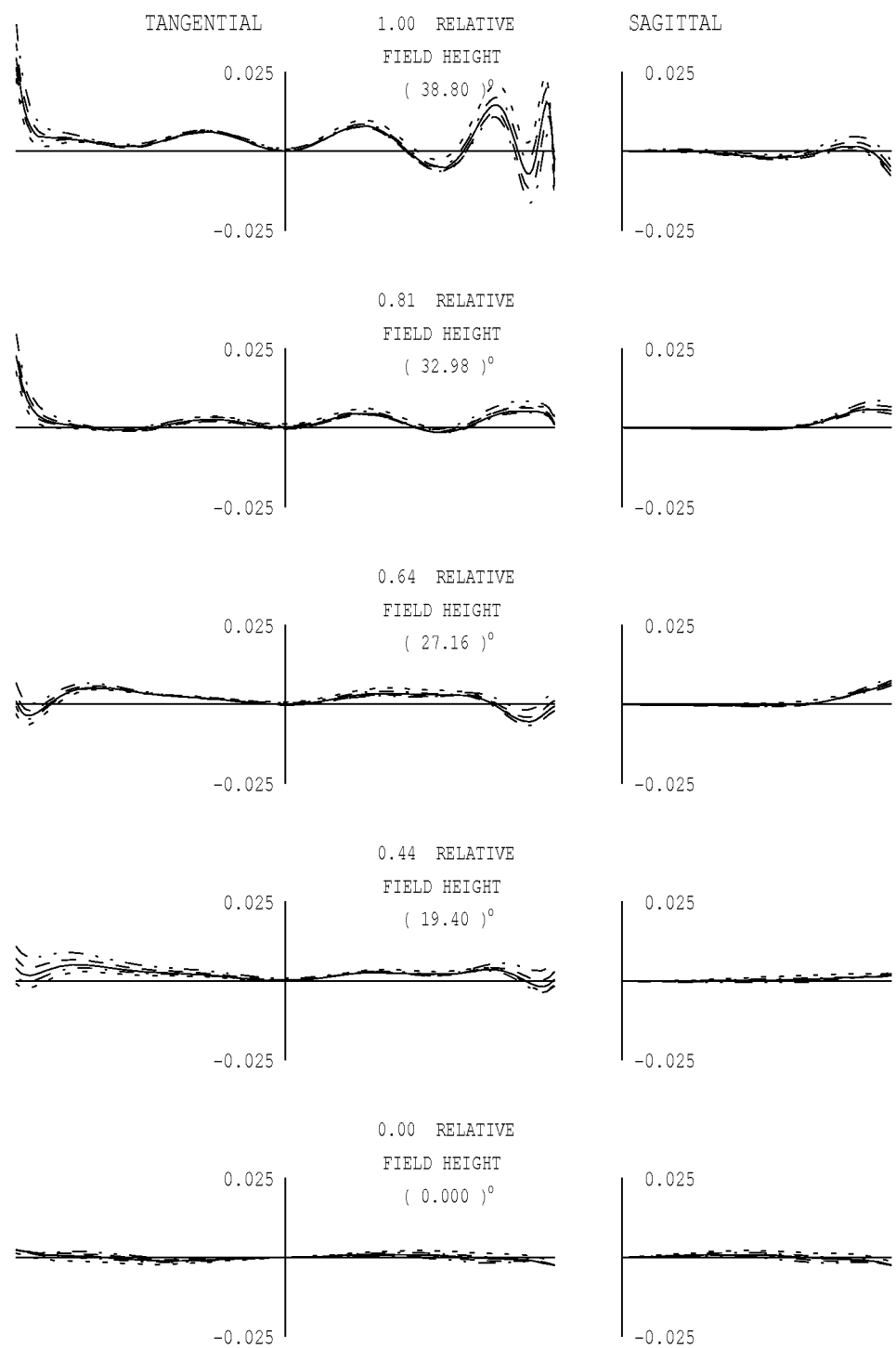
FIG. 17 shows the polychromatic ray aberration curves over the half field of view and over the visible spectral band ranging 470 nm to 650 nm for the lens system illustrated in FIG. 16.

FIG. 17 shows the polychromatic ray aberration curves over the half field of view (HFOV=38.8 degrees) for an object point on-axis (at 0 degree) to an off-axis field point at 38.8 degrees, and over the visible band ranging from 470 nm to 650 nm for a compact lens system 610 as illustrated in FIG. 16 and described in Tables 6A and 6B.

Figure 18:
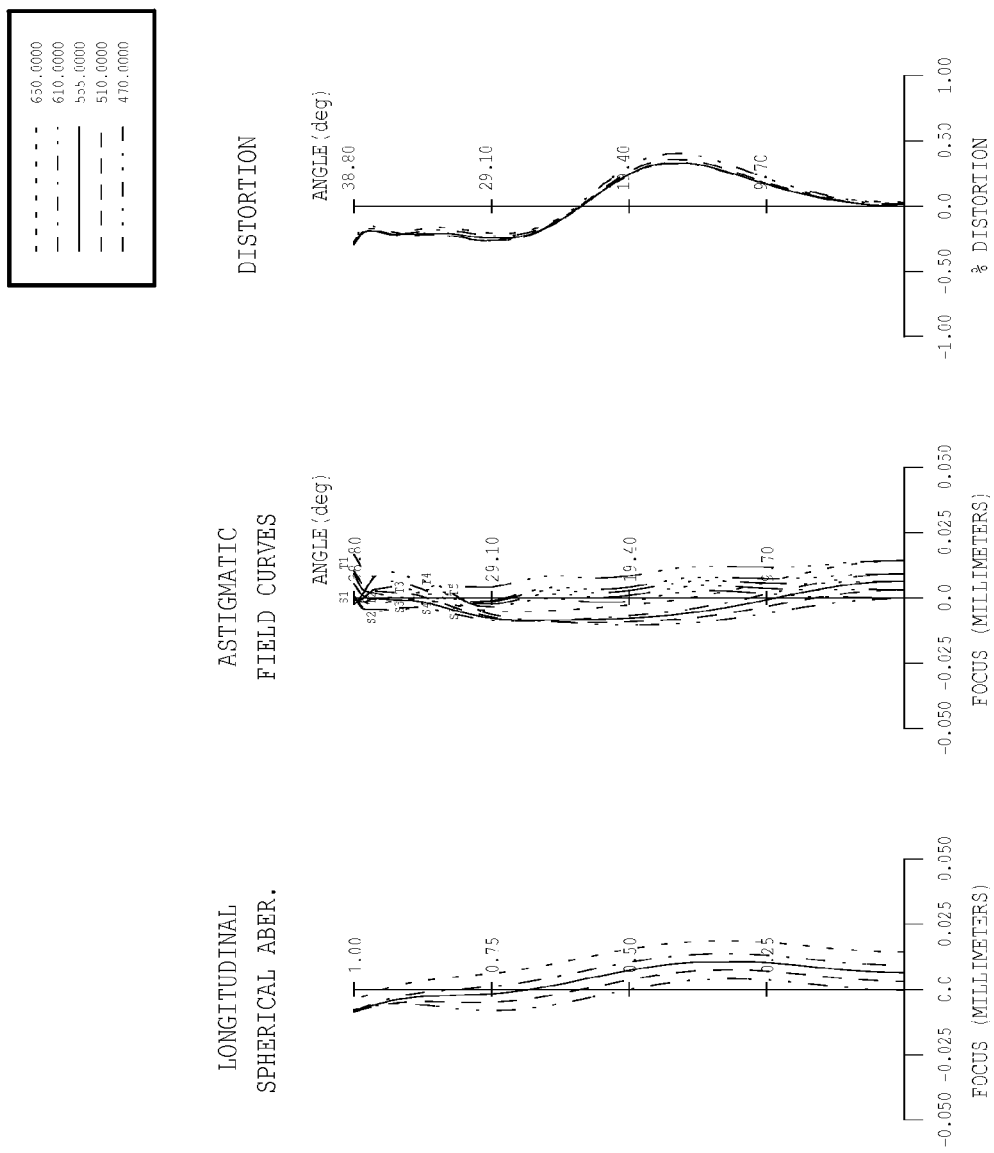
FIG. 18 shows the polychromatic curves of spherical aberration, astigmatism, and distortion over the visible band ranging 470 nm to 650 nm for the lens system illustrated in FIG. 16.

FIG. 18 shows the polychromatic curves for the chromatic variations of spherical aberration, astigmatic field curves, and distortion for the lens system 610 as illustrated in FIG. 16 and described in Tables 6A and 6B. Note that the plots illustrated in FIGS. 17 and 18 illustrate corrected aberrations of the lens system in FIG. 16.

In the example embodiment of the lens system 610 as described by the optical prescription in Tables 6A and 6B, the refractive powers of the lens components are distributed such that the ratios of the focal lengths of the lens component relative to the system focal length f are as follows:

$|f_1/f|=1.082$, $|f_2/f|=1.615$, $|f_3/f|=1.780$, $|f_4/f|=6.351$, $|f_5/f|=2.671$, and $|f_6/f|=1.087$.

The lens components have vertex radii of curvature that satisfy the following relations:

$L_1 R_1/R_2=-0.591$, $L_2 R_3/R_4=1.940$, $L_3 R_5/R_6=-0.566$, $L_4 R_7/R_8=1.014$, $L_5 R_9/R_{10}=0.781$, and $L_6 R_{11}/R_{12}=-20.098$.

The aspheric coefficients for the surfaces of the lens components in lens system 610 in the example embodiment are listed in Table 6B. Configuring lens system 610 according to the arrangement of the power distribution of the lens components, and adjusting the radii of curvature and aspheric coefficient as shown in Tables 6A and 6B, the total track length (TTL), of the lens system 610 may be reduced (e.g., to 5.809 mm as shown in Table 6A). Aberration of the system may effectively be corrected to obtain optical performance of high image quality resolution, for object scene at infinity in a small form factor f/1.80 lens system 610.

FIG. 19 is a cross-sectional illustration of an example embodiment of a compact lens system 710. The lens system 710 includes six lens components (701-706) with refractive power. The lens system 710 may be viewed as a variation of lens system 110 of FIG. 1 and components of the two systems 110 and 710 may be similar.

Tables 7A and 7B provide example values of various optical and physical parameters of an example embodiment of a lens system 710 as illustrated in FIG. 19. Tables 7A and 7B may be referred to as providing an optical prescription for a lens system 710. The optical prescription in Tables 7A and 7B is for a lens system 710 with an effective focal length f of 4.1 mm at 555 nm wavelength, a focal ratio of f/2.0, with 77.8 degrees FOV, TTL of 5.750 mm, and with TTL/f equal to 1.4024. Lens system 710 is a compact imaging system designed for visible spectrum covering 470 nm to 650 nm.

The lens components $L_1$, $L_2$, $L_3$, $L_4$, $L_5$, and $L_6$ 701-706 of the lens system 710 may be composed of plastic materials with refractive indices and Abbe numbers as listed in Table 7A. In this example embodiment of a lens system 710, the choice of lens materials is as listed in Table 7A. Referring to the lens system 710, the lens component $L_1$, $L_3$, $L_4$, and $L_5$ 701, 703-705 may be composed of a plastic material having an Abbe number of $V_1$=55.9. The lens components $L_2$ 702 and $L_6$ 706 may be composed of a plastic material with Abbe number $V_2$=22.4.

The lens system 710 as specified in Tables 7A and 7B is configured to correct optical aberrations as described above for the lens system 110 specified by the optical prescription in Tables 1A and 1B.

Figure 20:
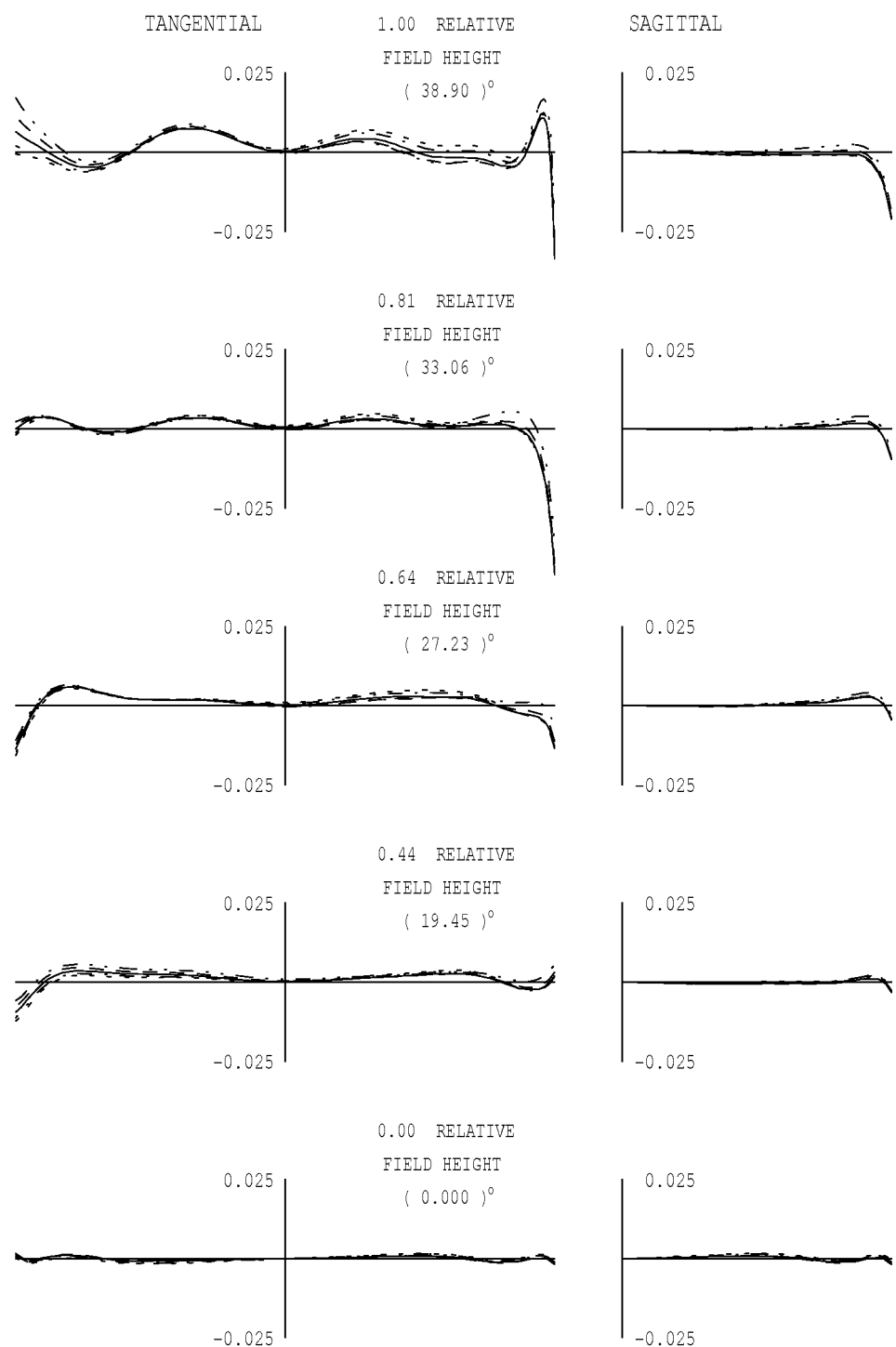
FIG. 20 shows the polychromatic ray aberration curves over the half field of view and over the visible spectral band ranging 470 nm to 650 nm for the lens system illustrated in FIG. 19.

FIG. 20 shows the polychromatic ray aberration curves over the half field of view (HFOV=38.8 degrees) for an object located at infinity (object distance>20 meters) for object point on-axis (at 0 degree) to an off-axis field point at 38.8 degrees, and over the visible band ranging from 470 nm to 650 nm for a compact lens system 710 as illustrated in FIG. 19 and described in Tables 7A and 7B.

Figure 21:
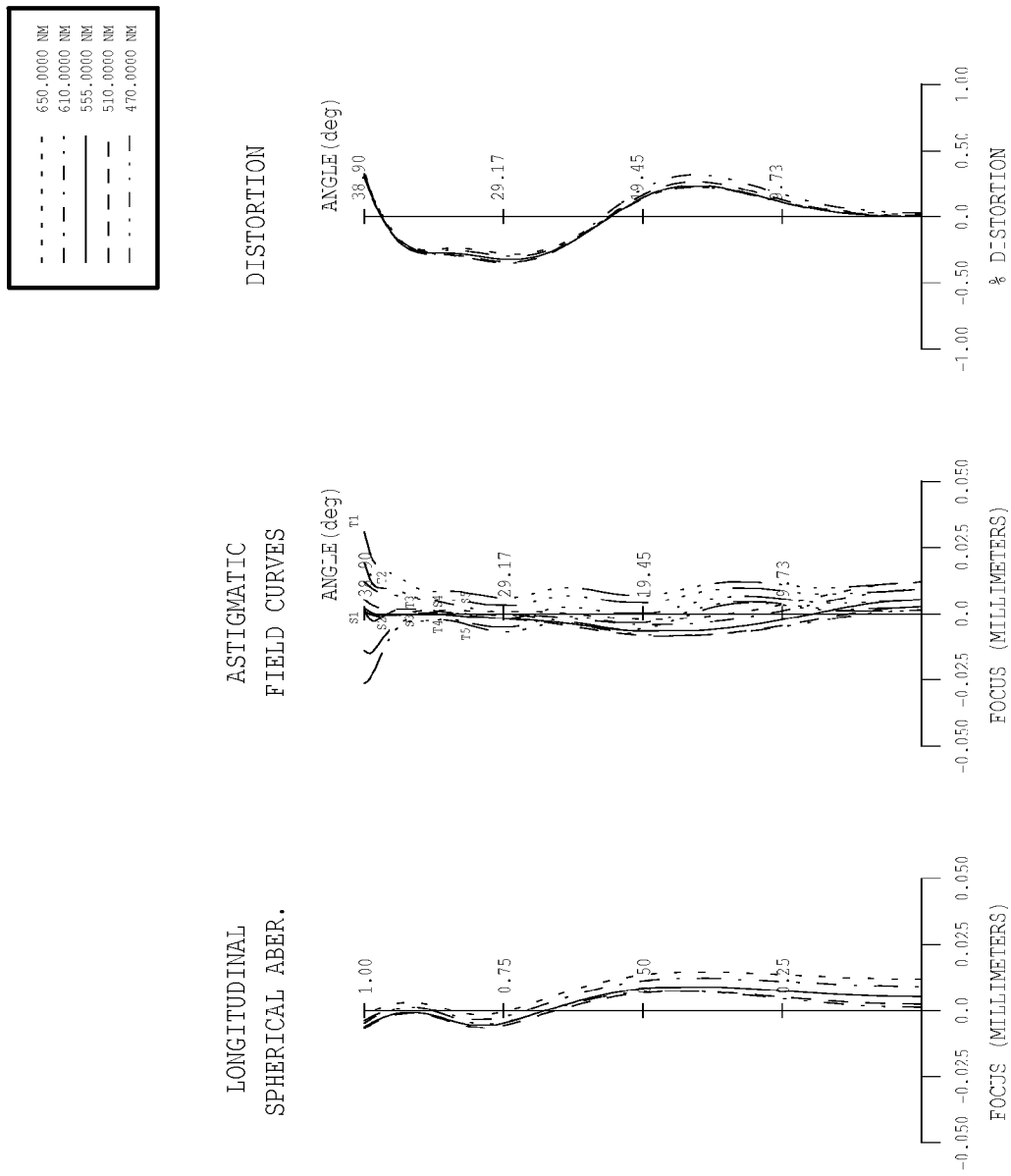
FIG. 21 shows the polychromatic curves of spherical aberration, astigmatism, and distortion over the visible band ranging 470 nm to 650 nm for the lens system illustrated in FIG. 19.

FIG. 21 shows the polychromatic curves for the chromatic variations of spherical aberration, astigmatic field curves, and distortion for the lens system 710 as illustrated in FIG. 19 and described in Tables 7A and 7B.

In the example embodiment of the lens system 710 as described by the optical prescription in Tables 7A and 7B, the refractive powers of the lens components are distributed such that the ratios of the focal lengths of the lens component relative to the system focal length f are as follows:

$|f_1/f|=0.962$, $|f_2/f|=1.740$, $|f_3/f|=25.215$, $|f_4/f|=1.719$, $|f_5/f|=2.818$, and $|f_6/f|=0.976$.

The lens components have vertex radii of curvature that satisfy the following relations:

$L_1 R_1/R_2=-0.392$, $L_2 R_3/R_4=5.718$, $L_3 R_5/R_6=0.917$, $L_4 R_7/R_8=1.667$, $L_5 R_9/R_{10}=0.768$, and $L_6 R_{11}/R_{12}=-3.885$.

The aspheric coefficients for the surfaces of the lens components in the lens system 710 in the example embodiment are listed in Table 7B. Configuring lens system 710 according to the arrangement of the power distribution of the lens components, and adjusting the radii of curvature and aspheric coefficient as shown in Tables 7A and 7B, the total track length (TTL), of the lens system 710 may be reduced (e.g., to 5.750 mm as shown in Table 7A). Aberration of the system may effectively be corrected to obtain optical performance of high image quality resolution, for object scene at infinity in a small form factor f/2.0 lens system 710.

FIG. 22 is a cross-sectional illustration of an example embodiment of a compact lens system 810. The lens system 810 includes a wafer lens group component $L_1$ 801, comprising a first wafer lens component 820 and a second wafer lens component 830 each with refractive power, and five additional lens components 802-806 with refractive power. The parts of the lens system 810 are arranged along an optical axis AX of the lens system from an object side to an image side (from left to right in the drawing) as follows:

- a first wafer lens group component $L_1$ 801 with positive refractive power having a convex object side surface and focal length $f_1$,
- an aperture stop AS 814 located between the first wafer lens component 820 and the second wafer lens component 830,
- a second lens component $L_2$ 802 with negative refractive power and focal length $f_2$,
- a third lens component $L_3$ 803 with positive refractive power having a convex object side surface and focal length $f_3$,
- a fourth lens component $L_4$ 804 with positive refractive power having a convex image side surface and focal length $f_4$,
- a fifth lens component $L_5$ 805 with positive refractive power and focal length $f_5$, and
- a sixth lens component $L_6$ 806 with negative refractive power.

The lens system 810 forms an image at the surface of a photosensor 818. In some embodiments, an infrared (IR) filter 816 may be located between the sixth lens component $L_6$ 806 and the photosensor 818. Each of the two wafer lens components 820, 830 comprises a planar substrate 822, 832 with a UV curable layer laminate 824, 834 of polymeric or plastic materials formed on one of the planar surfaces of the substrate, which may be a planar glass substrate.

The wafer lens group component 801 may be equipped with electrochromic layer 814 located between the planar image side surface of the substrate 822 of the first wafer lens component 820 and the planar object side surface of the substrate of the second wafer lens component 830. The electrochromic layer 814 comprises a transparent layer of conductive organic polymer or inorganic material having variable light transmittance in response to an applied electrical voltage. The lens system 810 may also be equipped and used with a standard iris type aperture stop (not shown).

Tables 8A and 8B provide example values of various optical and physical parameters of an example embodiment of a lens system 810 as illustrated in FIG. 22. The lens system 810 may be equipped with an electrochromic layer for dynamically varying the light transmittance of the lens in response to an applied electrical voltage.

Tables 8A and 8B may be referred to as providing an optical prescription for a lens system 810. The optical prescription in Tables 8A and 8B is for lens system 810 with an effective focal length f of 4.10 mm at 555 nm wavelength, a focal ratio of f/2.0, with 74 degrees FOV, TTL of 5.799 mm, and with TTL/f equal to 1.4140. Lens system 810 is a compact imaging system designed for visible spectrum covering 470 nm to 650 nm.

The wafer lens group component $L_1$ 801 may be composed of two wafer lens components 820, 830 having planar substrates 822, 832 and layer laminates 824, 834 of polymeric or plastic materials (with refractive indices and Abbe numbers listed in Table 8A) formed using known manufacturing methods such as casting, molding, or microlithographic process on the planar substrate. The remaining five lens components $L_2$, $L_3$, $L_4$, $L_5$, and $L_6$ 802-806 of the lens system 810 may be composed of plastic materials with refractive indices and Abbe numbers as listed in Table 8A. Referring to the lens system 810 as specified in Table 8A, the lens component $L_3$, $L_4$, and $L_5$ 803-805 may be composed of a plastic material having an Abbe number of $V_1=55.9$. The second lens component $L_2$ 802 may be composed of a plastic material with Abbe number of $V_2=23.9$ and the sixth lens component $L_6$ 806 may be composed of a plastic material with Abbe number $V_3=21.5$.

The lens system 810 as specified in Tables 8A and 8B is configured to correct optical aberrations as described above for the lens system 110 specified by the optical prescription in Tables 1A and 1B.

Figure 23:
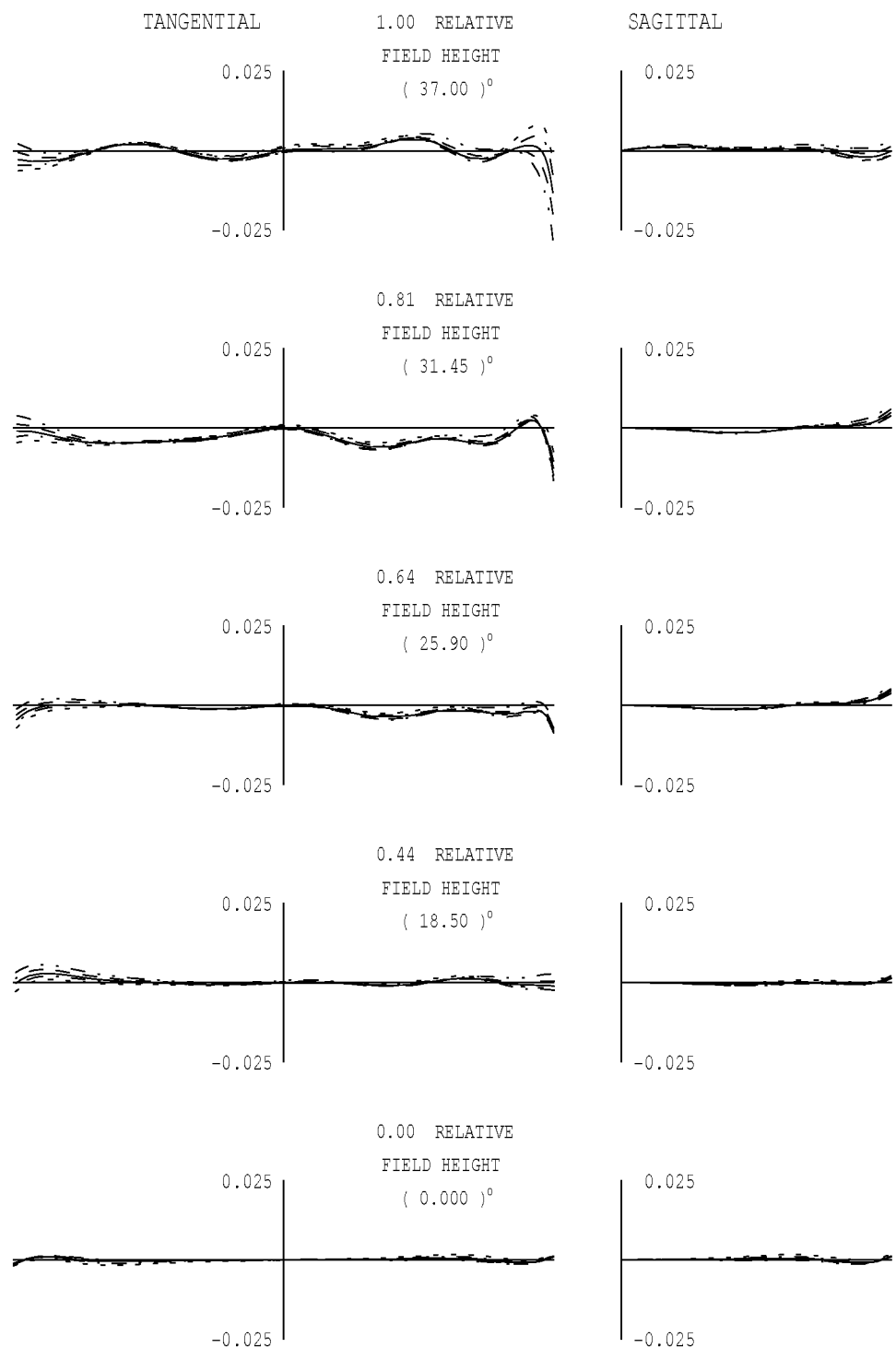
FIG. 23 shows the polychromatic ray aberration curves over the half field of view and over the visible spectral band ranging 470 nm to 650 nm for the lens system illustrated in FIG. 22.

FIG. 23 shows the polychromatic ray aberration curves over the half field of view (HFOV=37 degrees) for an object point on-axis (at 0 degree) to an off-axis field point at 37 degrees, and over the visible band ranging from 470 nm to 650 nm for a compact lens system 810 as illustrated in FIG. 22 and described in Tables 8A and 8B.

Figure 24:
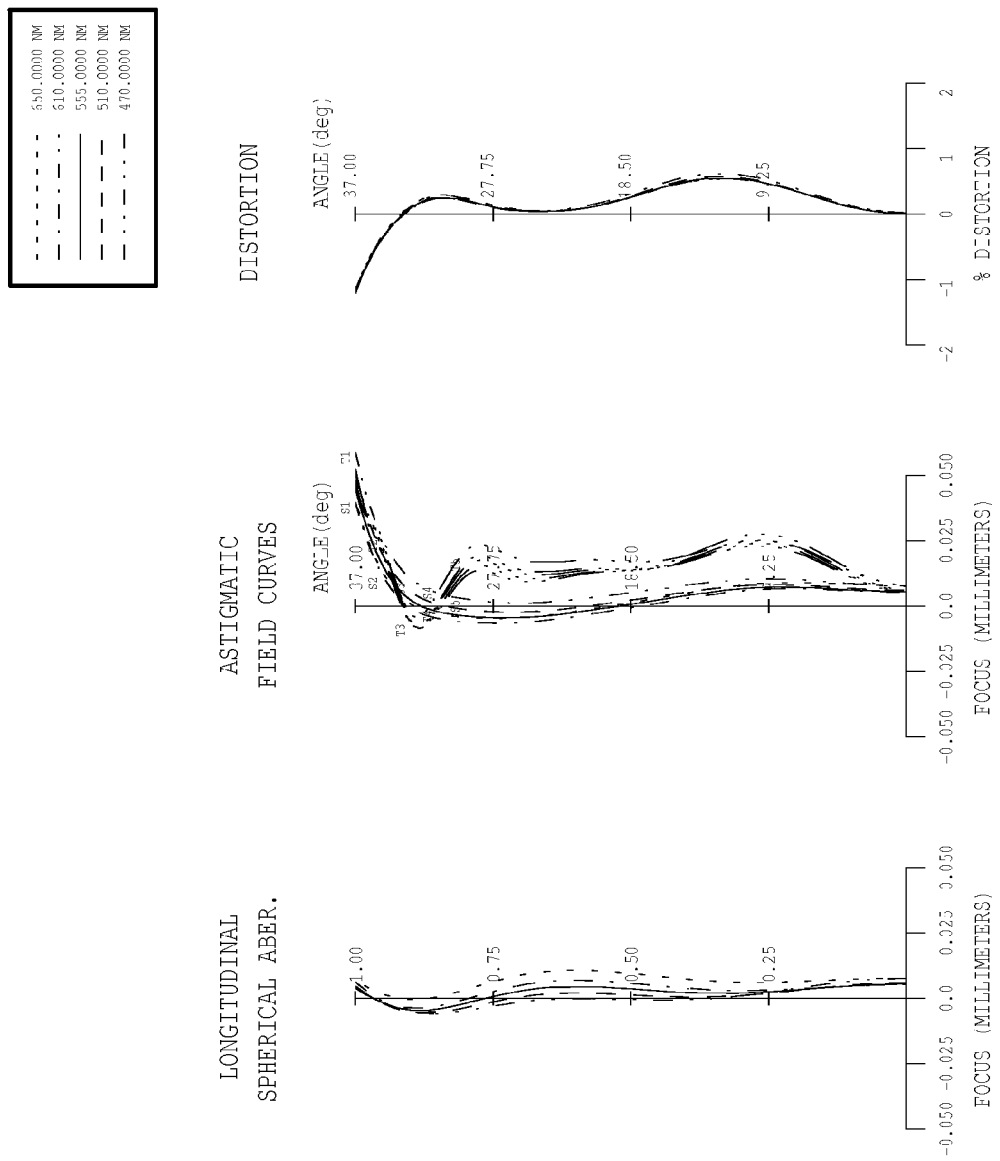
FIG. 24 shows the polychromatic curves of spherical aberration, astigmatism, and distortion over the visible band ranging 470 nm to 650 nm for the lens system illustrated in FIG. 22.

FIG. 24 shows the polychromatic curves for the chromatic variations of spherical aberration, astigmatic field curves, and distortion for the lens system 810 as illustrated in FIG. 22 and described in Tables 8A and 8B. Note that the plots illustrated in FIGS. 23 and 24 illustrate well-corrected aberrations of the lens system in FIG. 22.

In the example embodiment of the lens system 810 as described by the optical prescription in Tables 8A and 8B, the refractive powers of the lens components are distributed such that the ratios of the focal lengths of the lens component relative to the system focal length f are as follows:

$|f_1/f|=1.393$, $|f_2/f|=1.221$, $|f_3/f|=0.928$, $|f_4/f|=14.581$, $|f_5/f|=4.050$, and $|f_6/f|=1.440$.

The lens components have vertex radii of curvature that satisfy the following relations:

$L_1 R_1/R_2=-0.245$, $L_2 R_3/R_4=2.046$, $L_3 R_5/R_6=0.014$, $L_4 R_7/R_8=0.943$, $L_5 R_9/R_{10}=0.884$, and $L_6 R_{11}/R_{12}=6.117$.

The aspheric coefficients for the surfaces of the lens components in lens system 810 in the example embodiment are listed in Table 8B. Configuring lens system 810 according to the arrangement of the power distribution of the lens components, and adjusting the radii of curvature and aspheric coefficient as shown in Tables 8A and 8B, the total track length (TTL), of the lens system 810 may be reduced (e.g., to 5.799 mm as shown in Table 8A). Aberration of the system may effectively be corrected to obtain optical performance of high image quality resolution, for object scene at infinity in a small form factor f/2.0 lens system 810.

FIG. 25 is a cross-sectional illustration of an example embodiment of a compact lens system 910. The lens system 910 includes a wafer lens group component $L_1$ 901, comprising first wafer lens component 920 and second wafer lens component 930 each with refractive power, and five additional lens components 902-906 with refractive power. The parts of the lens system 810 are arranged along an optical axis AX of the lens system from an object side to an image side (from left to right in the drawing) as follows:

- a first wafer lens group component $L_1$ 901 with positive refractive power having a convex object side surface and focal length $f_1$,
- an aperture stop AS 914 located between a first wafer lens component 920 and a second wafer lens component 930,
- a second lens component $L_2$ 902 with negative refractive power and focal length $f_2$,
- a third lens component $L_3$ 903 with positive refractive power having a convex object side surface and focal length $f_3$,
- a fourth lens component $L_4$ 904 with positive refractive power having a convex image side surface and focal length $f_4$,
- a fifth lens component $L_5$ 905 with positive refractive power and focal length $f_5$, and
- a sixth lens component $L_6$ 906 with negative refractive power.

The lens system 910 forms an image at the surface of a photosensor 918. In some embodiments, an infrared (IR) filter 916 may be located between the sixth lens component $L_6$ 906 and the photosensor 918. Each of the two wafer lens components 920, 930 comprises a planar substrate 922, 932 with a UV curable layer laminate 924, 934 of polymeric or plastic materials formed on one of the planar surfaces of the substrate, which may be a planar glass substrate.

The wafer lens group component 901 may be equipped with electrochromic layer 914 located between the planar image side surface of the substrate 922 of the first wafer lens component 920 and the planar object side surface of the substrate of the second wafer lens component 930. The electrochromic layer 914 comprises a transparent layer of conductive organic polymer or inorganic material having variable light transmittance in response to an applied electrical voltage. The lens system 910 may also be equipped and used with a standard iris type aperture stop (not shown).

Tables 9A and 9B provide example values of various optical and physical parameters of an example embodiment of a lens system 910 as illustrated in FIG. 25. The lens system 910 may be equipped with electrochromic layer for dynamically varying the light transmittance of the lens in response to an applied electrical voltage.

Tables 9A and 9B may be referred to as providing an optical prescription for a lens system 910. The optical prescription in Tables 9A and 9B is for lens system 910 with an effective focal length f of 4.10 mm at 555 nm wavelength, a focal ratio of f/2.0, with 74 degrees FOV, TTL of 5.799 mm, and with TTL/f equal to 1.4140. Lens system 810 is a compact imaging system designed for visible spectrum covering 470 nm to 650 nm.

The wafer lens group component $L_1$ 901 may be composed of two wafer lens components 920, 930 having planar substrates 922, 932 and layer laminates 924, 934 of polymeric or plastic materials (with refractive indices and Abbe numbers listed in Table 9A) formed using known manufacturing methods such as casting, molding, or microlithographic process on the planar substrate. The remaining five lens components $L_2$, $L_3$, $L_4$, $L_5$, and $L_6$ 902-906 of the lens system 910 may be composed of plastic materials with refractive indices and Abbe numbers as listed in Table 9A. Referring to the lens system 910 as specified in Table 9A, the lens component $L_3$, $L_4$, and $L_5$ 903-905 may be composed of a plastic material having an Abbe number of $V_1$=55.9. The second lens component $L_2$ 902 may be composed of a plastic material with Abbe number of $V_2$=23.9 and the sixth lens component $L_6$ 906 may be composed of a plastic material with Abbe number $V_3$=21.5.

The lens system 910 as specified in Tables 9A and 9B is configured to correct optical aberrations as described above for the lens system 110 specified by the optical prescription in Tables 1A and 1B.

Figure 26:
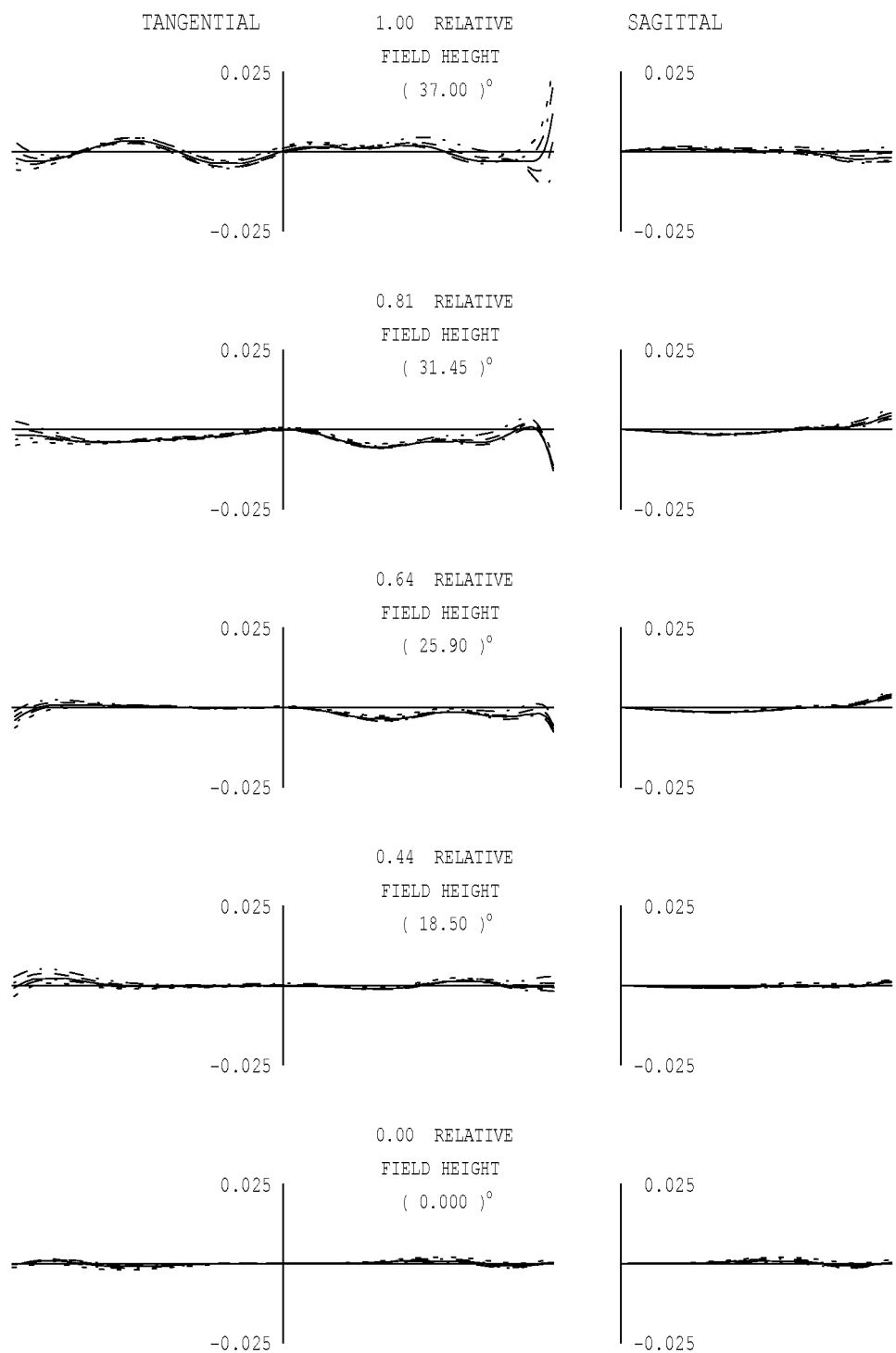
FIG. 26 shows the polychromatic ray aberration curves over the half field of view and over the visible spectral band ranging 470 nm to 650 nm for the lens system illustrated in FIG. 25.

FIG. 26 shows the polychromatic ray aberration curves over the half field of view (HFOV=37 degrees) for an object point on-axis (at 0 degree) to an off-axis field point at 37 degrees, and over the visible band ranging from 470 nm to 650 nm for a compact lens system 910 as illustrated in FIG. 25 and described in Tables 9A and 9B.

Figure 27:
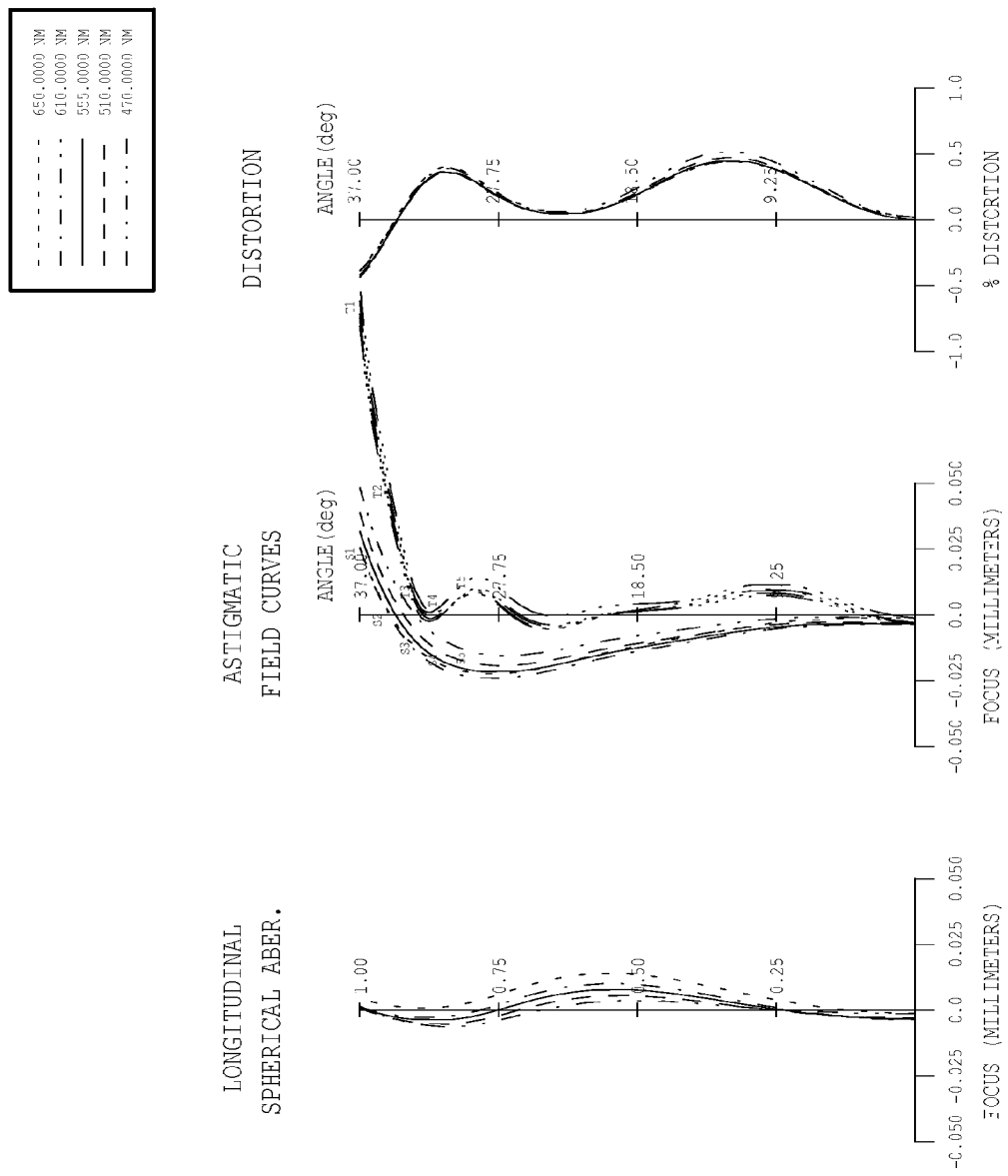
FIG. 27 shows the polychromatic curves of spherical aberration, astigmatism, and distortion over the visible band ranging 470 nm to 650 nm for the lens system illustrated in FIG. 25.

FIG. 27 shows the polychromatic curves for the chromatic variations of spherical aberration, astigmatic field curves, and distortion for the lens system 910 as illustrated in FIG. 25 and described in Tables 9A and 9B. Note that the plots illustrated in FIGS. 26 and 27 illustrate well-corrected aberrations of the lens system in FIG. 25.

In the example embodiment of the lens system 910 as described by the optical prescription in Tables 9A and 9B, the refractive powers of the lens components are distributed such that the ratios of the focal lengths of the lens component relative to the system focal length f are as follows:

$|f_1/f|=1.393,$ $|f_2/f|=1.217,$ $|f_3/f|=0.946,$ $|f_4/f|=10.971,$ $|f_5/f|=3.982,$ and $|f_6/f|=1.437.$ The lens components have vertex radii of curvature that satisfy the following relations:

$L_1\ R_1/R_2=-0.245,$ $L_2\ R_3/R_4=2.047,$ $L_3\ R_5/R_6=0.085,$ $L_4\ R_7/R_8=0.957,$ $L_5\ R_9/R_{10}=0.870,$ and $L_6\ R_{11}/R_{12}=4.904.$ The aspheric coefficients for the surfaces of the lens components in lens system 910 in the example embodiment are listed in Table 9B. Configuring lens system 910 according to the arrangement of the power distribution of the lens components, and adjusting the radii of curvature and aspheric coefficient as shown in Tables 9A and 9B, the total track length (TTL), of the lens system 910 may be reduced (e.g., to 5.799 mm as shown in Table 9A). Aberration of the system may effectively be corrected to obtain optical performance of high image quality resolution, for object scene at infinity in a small form factor f/2.0 lens system 910.

FIG. 28 is a cross-sectional illustration of an example embodiment of a low F-number (f/2.20) lens system 1010. The lens system 1010 includes a wafer lens component $L_1$ 1001 and five additional lens components 1002-1006 with refractive power. The parts of the lens system 1010 are arranged along an optical axis AX of the lens system from an object side to an image side (from left to right in the drawing) as follows:

- a first wafer lens component $L_1$ 1001 with positive refractive power having a convex object side surface and focal length $f_1$,
- an aperture stop AS 1014 applied to the image side plano surface of the substrate 1022 of the first wafer lens component 1001,
- a second lens component $L_2$ 1002 with positive refractive power and focal length $f_2$,
- a third lens component $L_3$ 1003 with negative refractive power and focal length $f_3$,
- a fourth lens component $L_4$ 1004 with positive refractive power having a convex image side surface and focal length $f_4$,
- a fifth lens component $L_5$ 1005 with positive refractive power and focal length $f_5$, and
- a sixth lens component $L_6$ 1006 with negative refractive power.

The lens system 1010 forms an image at the surface of a photosensor 1018. In some embodiments, an infrared (IR) filter 1016 may be located between the sixth lens component $L_6$ 1006 and the photosensor 1018.

An aperture stop (AS) 1014 is applied to the image side plano surface of the planar substrate 1022. The aperture stop 1014 may be a fixed aperture stop in the form of a material applied to the planar substrate 1022 to provide a transparent opening, such as a circular opening, centered on the optical axis. In another embodiment, a thin film layer 1014 of conductive organic or inorganic material may be deposited on the planar substrate 1022, on the circular area inscribed by the circular opening, to provide an aperture stop in the form of an electrochromic lens component having variable light transmittance in response to an applied electrical voltage. The electrochromic lens component 1014 may provide a central transparent opening that can be adjusted by an applied voltage that provides a variable intensity profile distribution across the aperture opening for the light energy transmitted through the optical system. The central transparent opening may be adjustable in size and/or a light intensity profile distribution provided across the aperture stop diameter for the light transmitted through the optical system.

Tables 10A and 10B provide example values of various optical and physical parameters of an example embodiment of the lens system 1010 as illustrated in FIG. 28. The lens system 1010 may be equipped with an electrochromic layer for dynamically varying the light transmittance of the lens in response to an applied electrical voltage.

Tables 10A and 10B may be referred to as providing an optical prescription for a lens system 1010. The optical prescription in Tables 10A and 10B is for lens system 1010 with an effective focal length f of 4.10 mm at 555 nm wavelength, a focal ratio of f/2.2, with 74.0 degrees FOV, TTL of 5.500 mm, and with TTL/f equal to 1.3415. Lens system 1010 is a compact imaging system designed for visible spectrum covering 1070 nm to 650 nm.

The wafer lens component $L_1$ 1001 may be composed of a planar substrate 1022 and a layer laminate 1024 of UV curable polymeric or plastic materials (with refractive indices and Abbe numbers listed in Table 10A) formed using known manufacturing methods such as casting, molding, or microlithographic process on the planar substrate. The remaining five lens components $L_2$, $L_3$, $L_4$, $L_5$, and $L_6$ 1002-1006 of the lens system 1010 may be composed of plastic materials with refractive indices and Abbe numbers as listed in Table 10A.

The lens system 1010 as specified in Tables 10A and 10B is configured to correct optical aberrations as described above for the lens system 110 specified by the optical prescription in Tables 1A and 1B.

Figure 29:
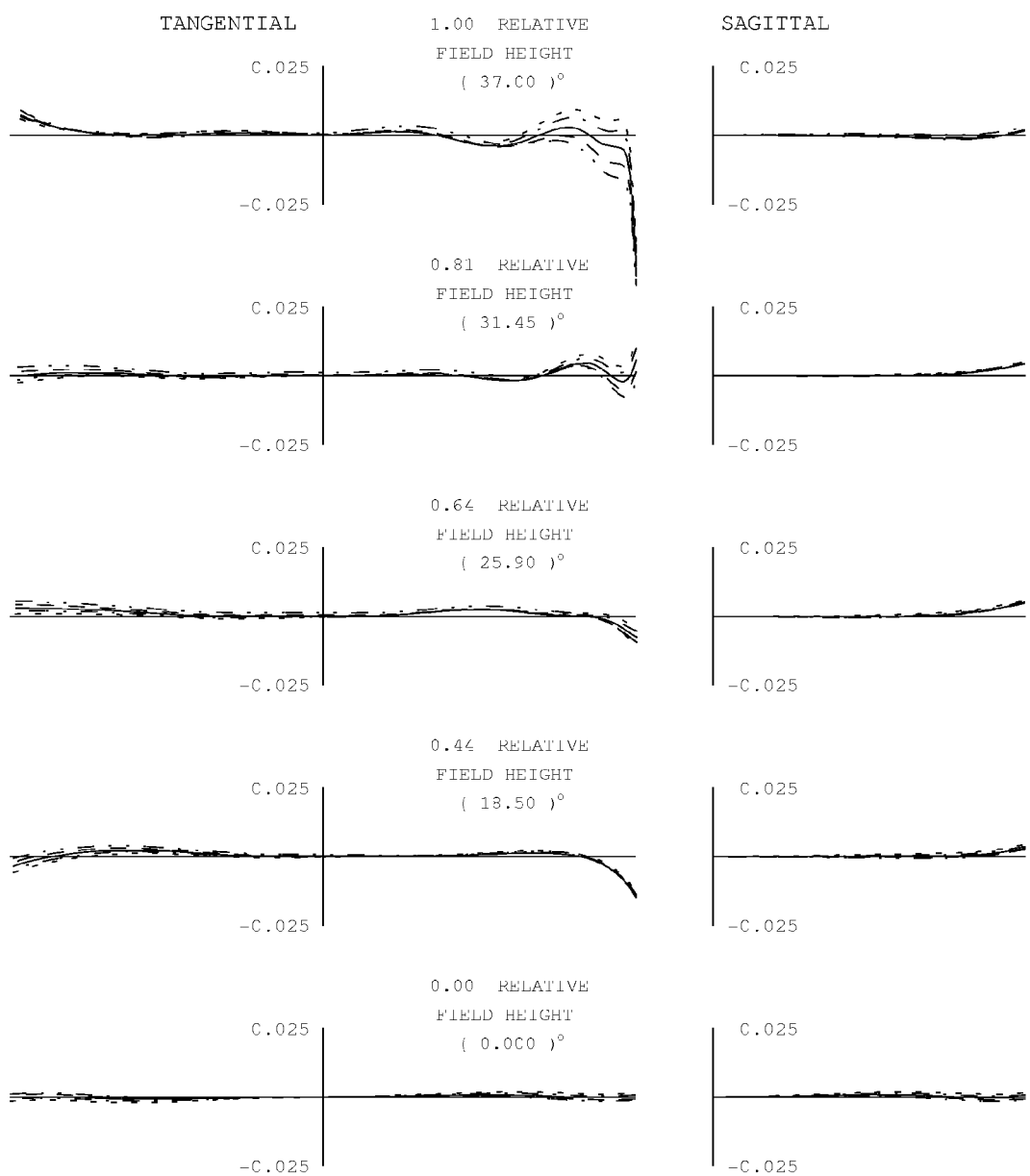
FIG. 29 shows the polychromatic ray aberration curves over the half field of view and over the visible spectral band ranging 470 nm to 650 nm for the lens system illustrated in FIG. 28.

FIG. 29 shows the polychromatic ray aberration curves over the half field of view (HFOV=37.0 degrees) for an object point on-axis (at 0 degree) to an off-axis field point at 37.0 degrees, and over the visible band ranging from 1070 nm to 650 nm for a compact lens system 1010 as illustrated in FIG. 28 and described in Tables 10A and 10B.

Figure 30:
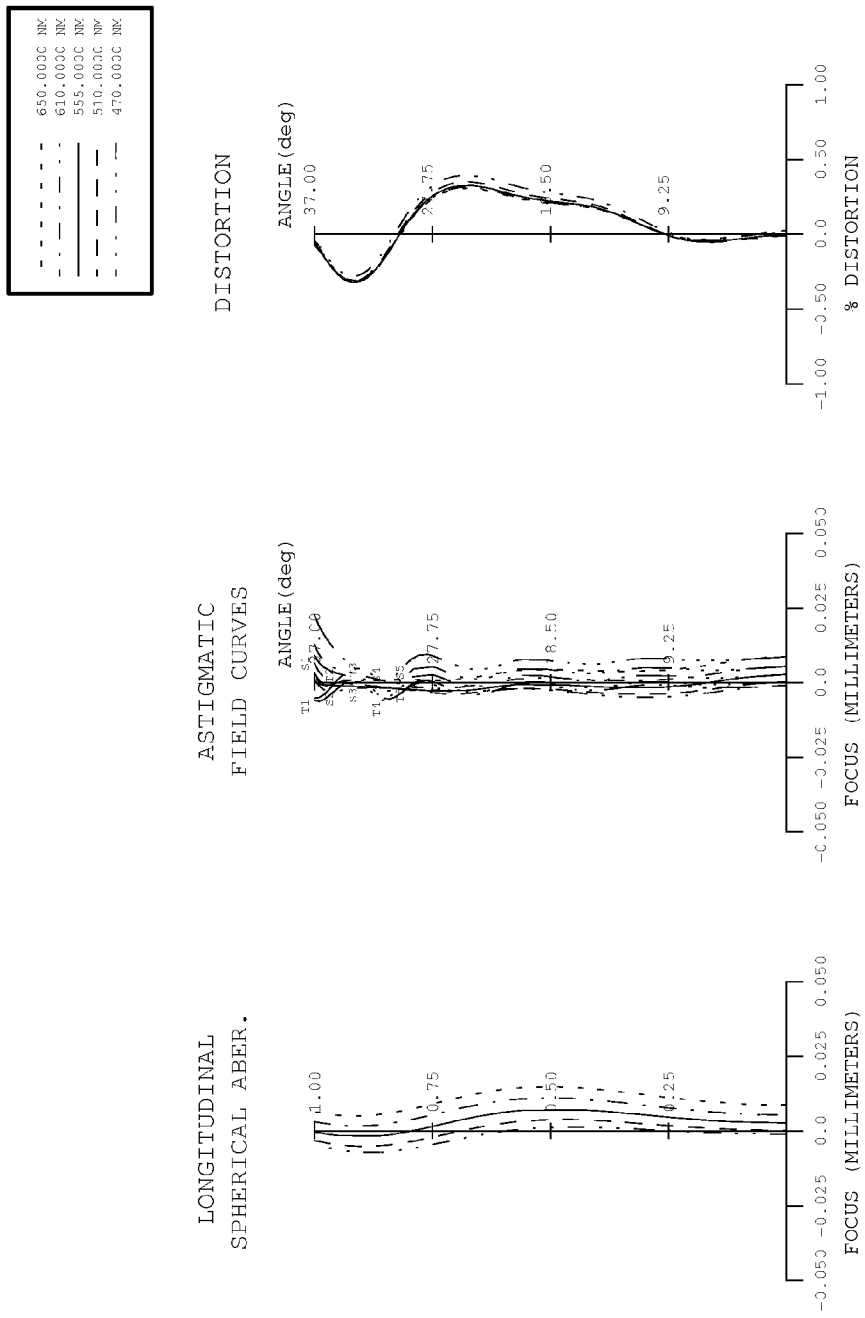
FIG. 30 shows the polychromatic curves of spherical aberration, astigmatism, and distortion over the visible band ranging 470 nm to 650 nm for the lens system illustrated in FIG. 28.

FIG. 29 shows the polychromatic curves for the chromatic variations of spherical aberration, astigmatic field curves, and distortion for the lens system 1010 as illustrated in FIG. 28 and described in Tables 10A and 10B. Note that the plots illustrated in FIGS. 29 and 30 illustrate corrected aberrations of the lens system in FIG. 28.

In the example embodiment of the lens system 1010 as described by the optical prescription in Tables 10A and 10B, the refractive powers of the lens components are distributed such that the ratios of the focal lengths of the lens component relative to the system focal length f are as follows:

$|f_1/f|=2.120,$ $|f_2/f|=1.693,$ $|f_3/f|=1.358,$ $|f_4/f|=1.578,$ $|f_5/f|=25.632,$ and $|f_6/f|=1.849.$ The lens components have vertex radii of curvature that satisfy the following relations:

$L_2\ R_3/R_4=-1.650,$ $L_3\ R_5/R_6=1.865,$ $L_4\ R_7/R_8=-0.584,$ $L_5\ R_9/R_{10}=1.005,$ and $L_6\ R_{11}/R_{12}=1.794.$ The aspheric coefficients for the surfaces of the lens components in lens system 1010 in the example embodiment are listed in Table 10B. Configuring lens system 1010 according to the arrangement of the power distribution of the lens components, and adjusting the radii of curvature and aspheric coefficient as shown in Tables 10A and 10B, the total track length (TTL), of the lens system 1010 may be reduced (e.g., to 5.500 mm as shown in Table 10A). Aberration of the system may effectively be corrected to obtain optical performance of high image quality resolution, for object scene at infinity in a small form factor f/2.20 lens system 1010.

FIG. 31 is a cross-sectional illustration of an example embodiment of a low F-number (f/2.00) lens system 1110. The lens system 1110 includes a wafer lens component $L_1$ 1101 and five additional lens components 1102-1106 with refractive power. The parts of the lens system 1110 are arranged along an optical axis AX of the lens system from an object side to an image side (from left to right in the drawing) as follows:

- a first wafer lens component $L_1$ 1101 with positive refractive power having a convex object side surface and focal length $f_1$,
- an aperture stop AS 1114 applied to the image side plano surface of the substrate 1122 of the first wafer lens component 1101,
- a second lens component $L_2$ 1102 with positive refractive power and focal length $f_2$,
- a third lens component $L_3$ 1103 with negative refractive power and focal length $f_3$,
- a fourth lens component $L_4$ 1104 with positive refractive power having a convex image side surface and focal length $f_4$,
- a fifth lens component $L_5$ 1105 with positive refractive power and focal length $f_5$, and
- a sixth lens component $L_6$ 1106 with negative refractive power.

The lens system 1110 forms an image at the surface of a photosensor 1118. In some embodiments, an infrared (IR) filter 1116 may be located between the sixth lens component $L_6$ 1106 and the photosensor 1118.

An aperture stop (AS) 1114 is applied to the image side plano surface of the planar substrate 1122. The aperture stop 1114 may be a fixed aperture stop in the form of a material applied to the planar substrate 1122 to provide a transparent opening, such as a circular opening, centered on the optical axis. In another embodiment, a thin film layer 1114 of conductive organic or inorganic material may be deposited on the planar substrate 1122, on the circular area inscribed by the circular opening, to provide an aperture stop in the form of an electrochromic lens component having variable light transmittance in response to an applied electrical voltage. The electrochromic lens component 1114 may provide a central transparent opening that can be adjusted by an applied voltage that provides a variable intensity profile distribution across the aperture opening for the light energy transmitted through the optical system. The central transparent opening may be adjustable in size and/or a light intensity profile distribution provided across the aperture stop diameter for the light transmitted through the optical system.

Tables 11A and 11B provide example values of various optical and physical parameters of an example embodiment of the lens system 1110 as illustrated in FIG. 31. The lens system 1110 may be equipped with an electrochromic layer for dynamically varying the light transmittance of the lens in response to an applied electrical voltage.

Tables 11A and 11B may be referred to as providing an optical prescription for a lens system 1110. The optical prescription in Tables 11A and 11B is for lens system 1110 with an effective focal length f of 4.10 mm at 555 nm wavelength, a focal ratio of f/2.00, with 74.0 degrees FOV, TTL of 5.500 mm, and with TTL/f equal to 1.3415. Lens system 1110 is a compact imaging system designed for visible spectrum covering 1170 nm to 650 nm.

The wafer lens component $L_1$ 1101 may be composed of a planar substrate 1122 and a layer laminate 1124 of UV curable polymeric or plastic materials (with refractive indices and Abbe numbers listed in Table 11A) formed using known manufacturing methods such as casting, molding, or microlithographic process on the planar substrate. The remaining five lens components $L_2$, $L_3$, $L_4$, $L_5$, and $L_6$ 1102-1106 of the lens system 1110 may be composed of plastic materials with refractive indices and Abbe numbers as listed in Table 11A.

The lens system 1110 as specified in Tables 11A and 11B is configured to correct optical aberrations as described above for the lens system 110 specified by the optical prescription in Tables 1A and 1B.

Figure 32:
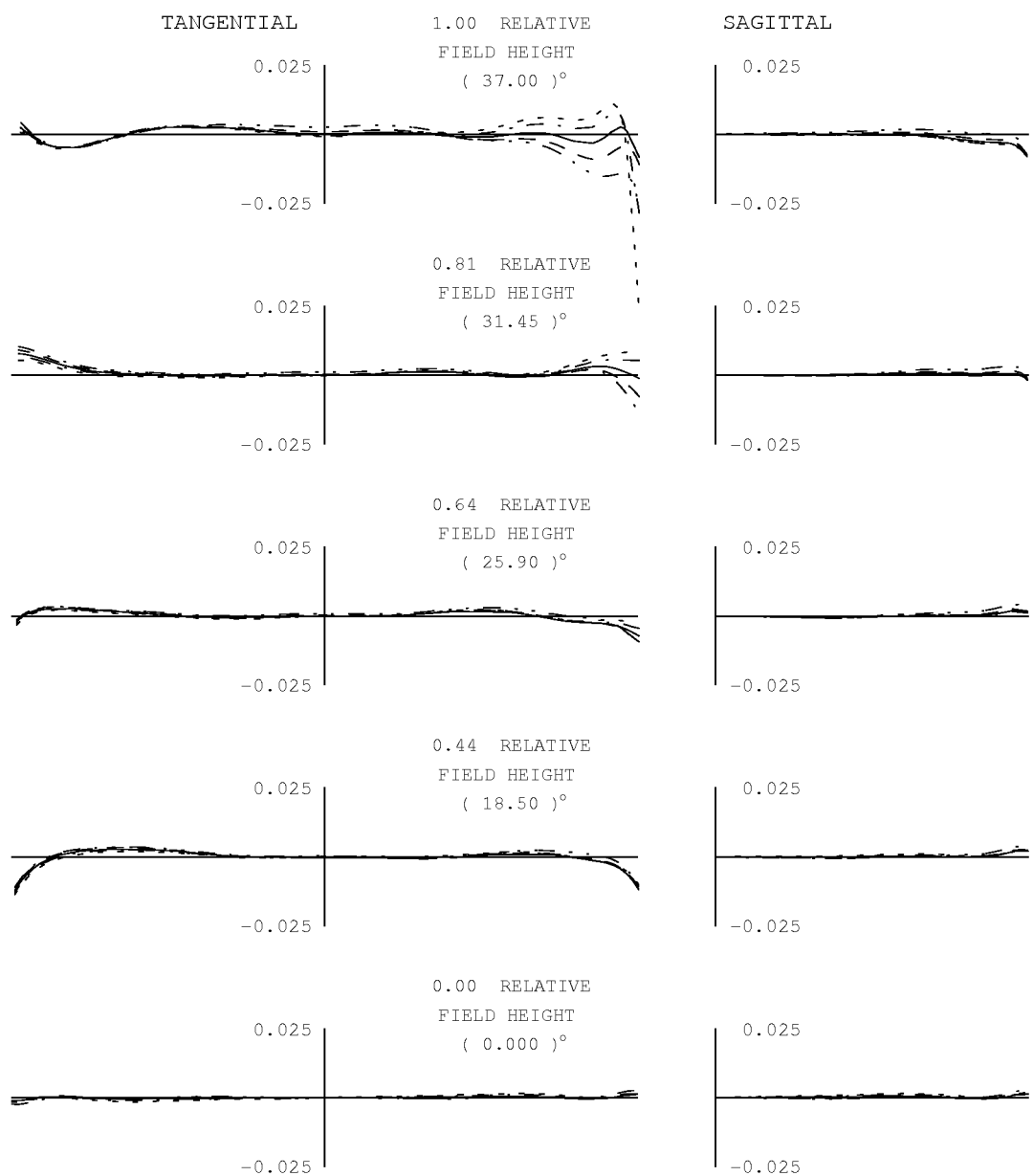
FIG. 32 shows the polychromatic ray aberration curves over the half field of view and over the visible spectral band ranging 470 nm to 650 nm for the lens system illustrated in FIG. 31.

FIG. 32 shows the polychromatic ray aberration curves over the half field of view (HFOV=37.0 degrees) for an object point on-axis (at 0 degree) to an off-axis field point at 37.0 degrees, and over the visible band ranging from 1170 nm to 650 nm for a compact lens system 1110 as illustrated in FIG. 31 and described in Tables 11A and 11B.

Figure 33:
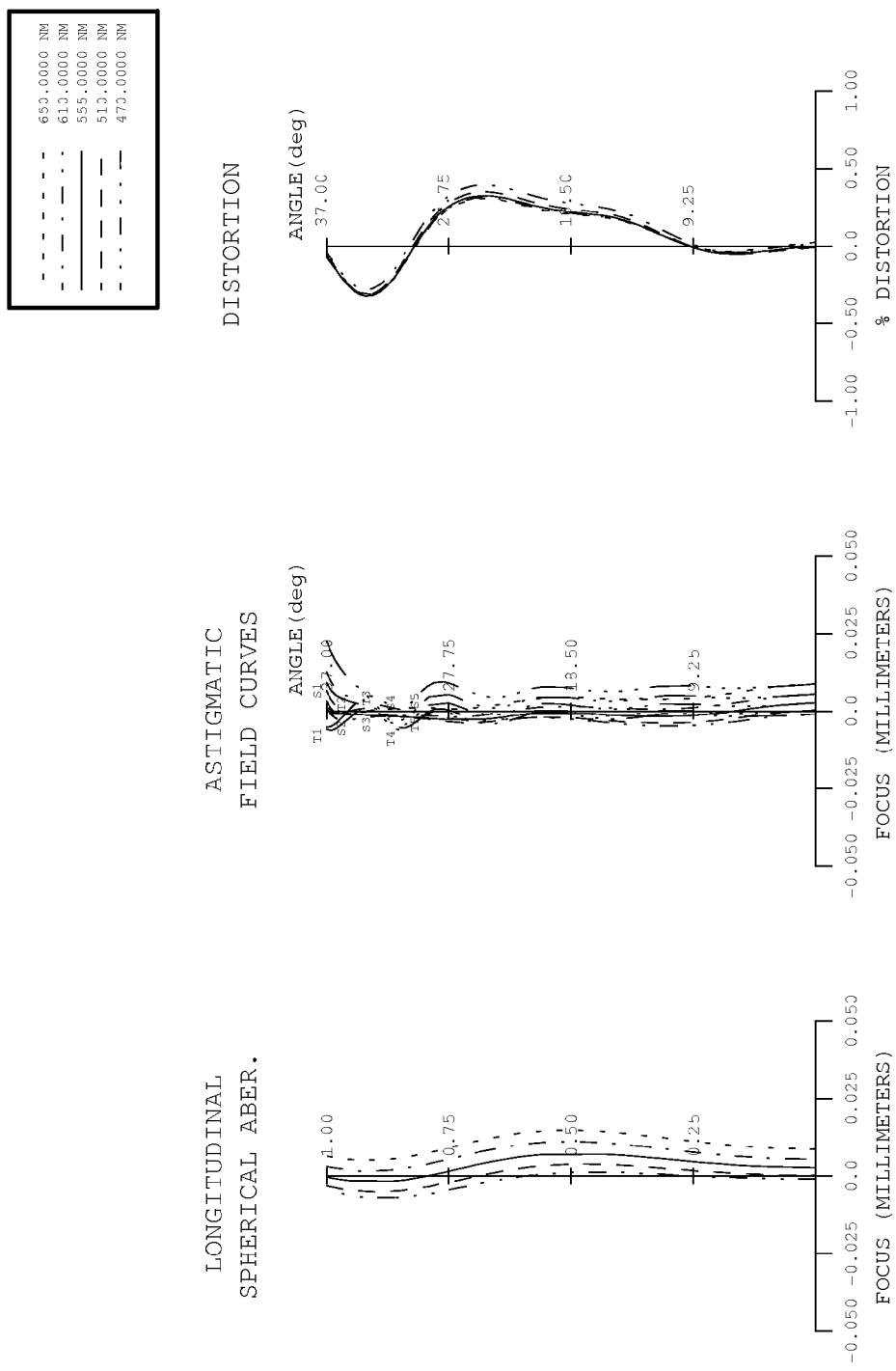
FIG. 33 shows the polychromatic curves of spherical aberration, astigmatism, and distortion over the visible band ranging 470 nm to 650 nm for the lens system illustrated in FIG. 31.

FIG. 33 shows the polychromatic curves for the chromatic variations of spherical aberration, astigmatic field curves, and distortion for the lens system 1110 as illustrated in FIG. 31 and described in Tables 11A and 11B. Note that the plots illustrated in FIGS. 32 and 33 illustrate corrected aberrations of the lens system in FIG. 31.

In the example embodiment of the lens system 1110 as described by the optical prescription in Tables 11A and 11B, the refractive powers of the lens components are distributed such that the ratios of the focal lengths of the lens component relative to the system focal length f are as follows:

$$|f_1/f|=2.161,$$

$$|f_2/f|=1.627,$$

$$|f_3/f|=1.483,$$

$$|f_4/f|=2.285,$$

$$|f_5/f|=2.229, \text{ and}$$

$$|f_6/f|=1.090.$$

The lens components have vertex radii of curvature that satisfy the following relations:

$$L_2\,R_3/R_4=-1.492,$$

$$L_3\,R_5/R_6=2.091,$$

$$L_4\,R_7/R_8=-0.184,$$

$$L_5\,R_9/R_{10}=0.605, \text{ and}$$

$$L_6\,R_{11}/R_{12}=2.611.$$

The aspheric coefficients for the surfaces of the lens components in lens system 1110 in the example embodiment are listed in Table 11B. Configuring lens system 1110 according to the arrangement of the power distribution of the lens components, and adjusting the radii of curvature and aspheric coefficient as shown in Tables 11A and 11B, the total track length (TTL), of the lens system 1110 may be reduced (e.g., to 5.500 mm as shown in Table 11A). Aberration of the system may effectively be corrected to obtain optical performance of high image quality resolution, for object scene at infinity in a small form factor f/2.00 lens system 1110.

The following Tables provide lens prescriptions for the exemplary embodiments of the lens systems as described herein and illustrated in FIGS. 1 through 33. For example, Tables 1A and 1B correspond to the example embodiment of the lens system 110 with six lens components as illustrated in FIG. 1.

In the Tables, all dimensions are in millimeters unless otherwise specified. A positive radius indicates that the center of curvature is to the image side of the surface. A negative radius indicates that the center of curvature is to the object side of the surface. "INF" stands for infinity (as used in optics). "ASP" indicates an aspheric surface, and "FLT" indicates a flat surface. The thickness (or separation) is the axial distance from the intersection of a surface with the optical axis to the intersection of the next surface with the optical axis. The design wavelengths represent wavelengths in the spectral band of the imaging system.

For materials of the lens elements, window, wafer substrate, and IR filter, a refractive index $N_d$ at the helium d-line wavelength is provided, as well as an Abbe number $V_d$ relative to the d-line and the C- and F-lines of hydrogen. The Abbe number, $V_d$, may be defined by the equation:

$$V_d = (N_d - 1)/(N_F - N_C),$$

where $N_F$ and $N_C$ are refractive index values of the material at the F and C lines of hydrogen, respectively.

Referring to the Tables of aspheric constants (Tables 1B, 2B, 3B, 4B, 5B, 6B, 7B, 8B, and 9B), the aspheric equation describing an aspherical surface may be given by:

$$Z = \frac{cr^2}{1 + \sqrt{1-(1+K)c^2 r^2}} + Ar^4 + Br^6 + Cr^8 + Dr^{10} + Er^{12} + Fr^{14}$$

where Z is the sag of the surface parallel to the Z-axis (for all embodiments the Z-axis coincides with the optical axis);
c is the curvature of the surface (the reciprocal of the radius of curvature of the surface);
K is the conic constant; and
A, B, C, D, E, F, G, and H are the aspheric coefficients. In the Tables "E" denotes exponential notation (powers of 10).

Note that the values given in the following Tables for the various parameters in the various embodiments of the lens system are given by way of example and are not intended to be limiting. For example, one or more of the parameters for one or more of the surfaces of one or more of the lens elements in the example embodiments, as well as parameters for the materials of which the elements are composed, may be given different values while still providing similar performance for the lens system. In particular, note that some of the values in the Tables may be scaled up or down for larger or smaller implementations of a camera using an embodiment of a lens system as described herein.

Further note that the surface numbers ($S_i$) of the elements in the various embodiments of the lens system as shown in the Tables are listed from the first surface 0 at the object plane to the last surface at the image plane. Since number and location of element may vary in embodiments, the surface number(s) that correspond to some elements may vary in the different Tables. For example, in the first sets of Tables (e.g., Tables 1A, 2A, 3A, 5A, 7A), the aperture stop is surface 2, and a dummy surface 3, and the first lens element has surfaces 4 and 5. However, in Tables 4A, 6A, 8A, and 9A, the location of the aperture stop is different, and thus the surface numbers are different in the Tables. For example, in Tables 4A, and 6A, the aperture stop is surface 5, while in Tables 8A, and 9A, the aperture stop is surface 6. In particular, note that where reference is given to the radius of curvature ($R_i$) of the surfaces of the lens element in this document, the reference ($R_i$) used (e.g., $R_1$ and $R_2$ for the surfaces of the first lens component are the same for all of the embodiments. But these surface numbers may, but do not necessarily, correspond to the surface numbers of the lens components as given in the Tables.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

TABLE 1A

Optical data for embodiment 1 shown in FIGS. 1-3
f = 4.10 mm, Fno = 1.80, HFOV = 38.8 deg, TTL = 5.802 mm

| $S_i$ | Component | $R_i$ | Shape | $D_i$ | Material | $N_d$ | $V_d$ | $f_i$ |
|---|---|---|---|---|---|---|---|---|
| 0 | Object plane | INF | FLT | INF | | | | |
| 1 | | INF | FLT | 0.1000 | | | | |
| 2 | Aperture Stop | INF | FLT | −0.1000 | | | | |
| 3 | | INF | FLT | 0.0000 | | | | |
| 4 | $L_1$ | 3.478 | ASP | 0.8415 | Plastic | 1.535 | 56.3 | 3.72 |
| 5 | | −4.306 | ASP | 0.1000 | | | | |
| 6 | $L_2$ | 4.988 | ASP | 0.3000 | Plastic | 1.642 | 22.4 | −5.86 |
| 7 | | 2.104 | ASP | 0.4351 | | | | |
| 8 | $L_3$ | 7.382 | ASP | 0.5546 | Plastic | 1.545 | 55.9 | 9.77 |
| 9 | | −18.849 | ASP | 0.2000 | | | | |
| 10 | $L_4$ | −1.808 | ASP | 0.6199 | Plastic | 1.545 | 55.9 | 24.44 |
| 11 | | −1.785 | ASP | 0.1000 | | | | |
| 12 | $L_5$ | 1.977 | ASP | 0.7213 | Plastic | 1.545 | 55.9 | 11.34 |
| 13 | | 2.529 | ASP | 0.5800 | | | | |
| 14 | $L_6$ | 341.527 | ASP | 0.4500 | Plastic | 1.642 | 22.4 | −4.84 |
| 15 | | 3.102 | ASP | 0.2061 | | | | |
| 16 | IR filter | INF | FLT | 0.2000 | Glass | 1.516 | 64.1 | |

TABLE 1A-continued

Optical data for embodiment 1 shown in FIGS. 1-3
f = 4.10 mm, Fno = 1.80, HFOV = 38.8 deg, TTL = 5.802 mm

| $S_i$ | Component | $R_i$ | Shape | $D_i$ | Material | $N_d$ | $V_d$ | $f_l$ |
|---|---|---|---|---|---|---|---|---|
| 17 |  | INF | FLT | 0.4939 |  |  |  |  |
| 18 | Image plane | INF | FLT | 0.0000 |  |  |  |  |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component
Design wavelengths: 650 nm, 610 nm, 555 nm, 510 nm, 470 nm

TABLE 1B

Aspheric coefficients for embodiment 1

| $S_i$ | c | K | A | B | C |
|---|---|---|---|---|---|
| 4 | 0.28750410 | 0 | −1.22660E−02 | −1.80348E−02 | 8.08814E−03 |
| 5 | −0.23224629 | 0 | 4.28982E−03 | −2.40772E−02 | 1.11635E−03 |
| 6 | 0.20046644 | 0 | −8.50145E−02 | 9.78919E−02 | −9.90679E−02 |
| 7 | 0.47535388 | 0 | −1.39210E−01 | 1.37842E−01 | −1.12006E−01 |
| 8 | 0.13546629 | 0 | −8.18461E−02 | 4.04755E−03 | 1.22742E−02 |
| 9 | −0.05305431 | 0 | −3.23811E−03 | −4.31370E−02 | −3.77823E−03 |
| 10 | −0.55324600 | 0 | 2.37318E−01 | −1.80644E−01 | 1.02618E−01 |
| 11 | −0.56017071 | 0 | 5.80029E−02 | −1.93666E−02 | 1.93259E−02 |
| 12 | 0.50575673 | 0 | −1.05377E−01 | 1.23054E−02 | −9.55660E−04 |
| 13 | 0.39535762 | 0 | −2.31359E−02 | −1.18798E−02 | 2.60935E−03 |
| 14 | 0.00292803 | 0 | −1.34742E−02 | −8.07593E−03 | 3.73454E−03 |
| 15 | 0.32234908 | 0 | −5.40835E−02 | 3.85873E−03 | −9.11372E−05 |

| $S_i$ | D | E | F |
|---|---|---|---|
| 4 | −6.44199E−03 |  |  |
| 5 | −2.73123E−04 |  |  |
| 6 | 4.40673E−02 | −6.92648E−03 | 1.21333E−04 |
| 7 | 4.57428E−02 | −7.89421E−03 | 3.54635E−04 |
| 8 | 4.18908E−04 | −7.97154E−04 |  |
| 9 | 2.55378E−02 | −9.41971E−03 | 9.45106E−04 |
| 10 | −2.72490E−02 | 3.17547E−03 | −3.16218E−05 |
| 11 | −3.46939E−03 | −1.39817E−03 | 5.70189E−04 |
| 12 | −3.51103E−03 | 1.48264E−03 | −2.16652E−04 |
| 13 | −2.32234E−04 | −9.11350E−06 |  |
| 14 | −6.33816E−04 | 3.80461E−05 |  |
| 15 | 1.46169E−05 | −2.49181E−06 |  |

TABLE 2A

Optical data for embodiment 2 shown in FIGS. 4-6
f = 4.10 mm, Fno = 1.75, HFOV = 38.8 deg, TTL = 5.801 mm

| $S_i$ | Component | $R_i$ | Shape | $D_i$ | Material | $N_d$ | $V_d$ | $f_l$ |
|---|---|---|---|---|---|---|---|---|
| 0 | Object plane | INF | FLT | INF |  |  |  |  |
| 1 |  | INF | FLT | 0.1000 |  |  |  |  |
| 2 | Aperture Stop | INF | FLT | −0.1000 |  |  |  |  |
| 3 |  | INF | FLT | 0.0000 |  |  |  |  |
| 4 | $L_1$ | 3.438 | ASP | 0.8418 | Plastic | 1.545 | 55.9 | 3.83 |
| 5 |  | −4.907 | ASP | 0.1000 |  |  |  |  |
| 6 | $L_2$ | 4.537 | ASP | 0.3000 | Plastic | 1.642 | 22.4 | −5.87 |
| 7 |  | 2.015 | ASP | 0.4246 |  |  |  |  |
| 8 | $L_3$ | 5.775 | ASP | 0.5758 | Plastic | 1.545 | 55.9 | 9.27 |
| 9 |  | −39.746 | ASP | 0.2000 |  |  |  |  |
| 10 | $L_4$ | −1.817 | ASP | 0.6089 | Plastic | 1.545 | 55.9 | 25.46 |
| 11 |  | −1.797 | ASP | 0.1000 |  |  |  |  |
| 12 | $L_5$ | 1.993 | ASP | 0.7202 | Plastic | 1.545 | 55.9 | 11.04 |
| 13 |  | 2.595 | ASP | 0.5800 |  |  |  |  |
| 14 | $L_6$ | 69.926 | ASP | 0.4500 | Plastic | 1.642 | 22.4 | −4.97 |
| 15 |  | 3.066 | ASP | 0.2072 |  |  |  |  |
| 16 | IR filter | INF | FLT | 0.2000 | Glass | 1.516 | 64.1 |  |

TABLE 2A-continued

Optical data for embodiment 2 shown in FIGS. 4-6
f = 4.10 mm, Fno = 1.75, HFOV = 38.8 deg, TTL = 5.801 mm

| $S_i$ | Component | $R_i$ | Shape | $D_i$ | Material | $N_d$ | $V_d$ | $f_l$ |
|---|---|---|---|---|---|---|---|---|
| 17 | | INF | FLT | 0.4928 | | | | |
| 18 | Image plane | INF | FLT | 0.0000 | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component
Design wavelengths: 650 nm, 610 nm, 555 nm, 510 nm, 470 nm

TABLE 2B

Aspheric coefficients for embodiment 2

| $S_i$ | c | K | A | B | C |
|---|---|---|---|---|---|
| 4 | 0.29089657 | 0 | −1.15067E−02 | −1.34184E−02 | 4.86021E−03 |
| 5 | −0.20380403 | 0 | 1.09377E−02 | −2.73701E−02 | 2.28406E−03 |
| 6 | 0.22040692 | 0 | −7.37741E−02 | 9.37532E−02 | −1.05396E−01 |
| 7 | 0.49632890 | 0 | −1.34247E−01 | 1.39273E−01 | −1.20138E−01 |
| 8 | 0.17315303 | 0 | −7.97668E−02 | 1.19479E−02 | 3.80387E−03 |
| 9 | −0.02515947 | 0 | −9.13996E−03 | −3.69218E−02 | −2.39618E−03 |
| 10 | −0.55039144 | 0 | 2.23858E−01 | −1.67729E−01 | 1.01546E−01 |
| 11 | −0.55634823 | 0 | 5.87339E−02 | −1.91706E−02 | 2.06234E−02 |
| 12 | 0.50179782 | 0 | −9.74163E−02 | 1.21856E−02 | −1.76657E−02 |
| 13 | 0.38530949 | 0 | −1.63365E−02 | −1.31735E−02 | 2.60935E−03 |
| 14 | 0.01430073 | 0 | −1.90327E−02 | −8.09167E−03 | 3.97263E−03 |
| 15 | 0.32614741 | 0 | −5.81269E−02 | 4.43093E−03 | −2.35110E−04 |

| $S_i$ | D | E | F |
|---|---|---|---|
| 4 | −4.37215E−03 | | |
| 5 | 1.81393E−05 | | |
| 6 | 5.13700E−04 | −9.45393E−03 | 4.93946E−04 |
| 7 | 5.14475E−02 | −9.92644E−03 | 6.51872E−04 |
| 8 | 2.50503E−03 | −8.80993E−04 | |
| 9 | 2.09979E−02 | −7.54139E−03 | 7.22142E−04 |
| 10 | −2.93636E−02 | 3.85890E−03 | −9.28392E−05 |
| 11 | −3.85223E−03 | −1.44144E−03 | 5.65440E−04 |
| 12 | −3.07175E−03 | 1.34454E−03 | −1.95675E−04 |
| 13 | −1.84749E−04 | −1.21334E−05 | |
| 14 | −6.39122E−04 | 3.59974E−05 | |
| 15 | 4.49751E−05 | −4.47194E−06 | |

TABLE 3A

Optical data for embodiment 3 shown in FIGS. 7-9
f = 4.10 mm, Fno = 1.80, HFOV = 38.8 deg, TTL = 5.8 mm

| $S_i$ | Component | $R_i$ | Shape | $D_i$ | Material | $N_d$ | $V_d$ | $f_l$ |
|---|---|---|---|---|---|---|---|---|
| 0 | Object plane | INF | FLT | INF | | | | |
| 1 | | INF | FLT | 0.1450 | | | | |
| 2 | Aperture Stop | INF | FLT | −0.1450 | | | | |
| 3 | | INF | FLT | 0.0000 | | | | |
| 4 | $L_1$ wafer lens | 3.264 | ASP | 0.2655 | Polymer | 1.514 | 54.6 | 4.22 |
| 5 | $L_1$ substrate | INF | FLT | 0.2100 | Glass | 1.459 | 67.9 | |
| 6 | $L_1$ wafer lens | INF | FLT | 0.2961 | Polymer | 1.514 | 54.6 | |
| 7 | | −5.997 | ASP | 0.1000 | | | | |
| 8 | $L_2$ | 4.123 | ASP | 0.3000 | Plastic | 1.642 | 22.4 | −6.41 |
| 9 | | 2.009 | ASP | 0.4160 | | | | |
| 10 | $L_3$ | 7.034 | ASP | 0.7531 | Plastic | 1.545 | 55.9 | 8.10 |
| 11 | | −11.508 | ASP | 0.2000 | | | | |
| 12 | $L_4$ | −1.819 | ASP | 0.5294 | Plastic | 1.545 | 55.9 | 26.40 |
| 13 | | −1.782 | ASP | 0.1000 | | | | |
| 14 | $L_5$ | 1.908 | ASP | 0.7100 | Plastic | 1.545 | 55.9 | 10.56 |
| 15 | | 2.474 | ASP | 0.6200 | | | | |
| 16 | $L_6$ | −143.732 | ASP | 0.4000 | Plastic | 1.642 | 22.4 | −4.56 |
| 17 | | 3.014 | ASP | 0.1617 | | | | |
| 18 | IR filter | INF | FLT | 0.2000 | Glass | 1.516 | 64.1 | |

TABLE 3A-continued

Optical data for embodiment 3 shown in FIGS. 7-9
f = 4.10 mm, Fno = 1.80, HFOV = 38.8 deg, TTL = 5.8 mm

| $S_i$ | Component | $R_i$ | Shape | $D_i$ | Material | $N_d$ | $V_d$ | $f_l$ |
|---|---|---|---|---|---|---|---|---|
| 19 | | INF | FLT | 0.5383 | | | | |
| 20 | Image plane | INF | FLT | 0.0000 | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component
Design wavelengths: 650 nm, 610 nm, 555 nm, 510 nm, 470 nm

TABLE 3B

Aspheric coefficients for embodiment 3

| $S_i$ | c | K | A | B | C |
|---|---|---|---|---|---|
| 4 | 0.30636552 | 0 | −5.49659E−04 | −1.94135E−02 | 1.46062E−02 |
| 7 | −0.16674053 | 0 | 4.44902E−03 | −4.58763E−03 | −1.71930E−02 |
| 8 | 0.24256094 | 0 | −1.11588E−01 | 1.21961E−01 | −1.28328E−01 |
| 9 | 0.49771381 | 0 | −1.58419E−01 | 1.52120E−01 | −1.41908E−01 |
| 10 | 0.14216545 | 0 | −6.45028E−02 | 1.19684E−02 | 2.51976E−03 |
| 11 | −0.08689695 | 0 | −6.58575E−04 | −4.36637E−02 | −9.87431E−03 |
| 12 | −0.54974671 | 0 | 2.39432E−01 | −1.97502E−01 | 1.12117E−01 |
| 13 | −0.56129680 | 0 | 6.03550E−02 | −2.08599E−02 | 2.47274E−02 |
| 14 | 0.52416039 | 0 | −1.19833E−01 | 1.91819E−02 | −3.09786E−03 |
| 15 | 0.40414921 | 0 | −2.45426E−02 | −1.31263E−02 | 2.60935E−03 |
| 16 | −0.00695738 | 0 | −3.03299E−02 | −4.85877E−03 | 3.83284E−03 |
| 17 | 0.33179200 | 0 | −7.00772E−02 | 8.42318E−03 | −1.05602E−03 |

TABLE 3B-continued

Aspheric coefficients for embodiment 3

| $S_i$ | D | E | F |
|---|---|---|---|
| 4 | −8.40756E−03 | | |
| 7 | 4.12375E−03 | | |
| 8 | 5.08025E−02 | −5.83535E−03 | −1.15956E−04 |
| 9 | 6.71637E−02 | −1.60902E−02 | 1.68568E−03 |
| 10 | −3.87681E−03 | 1.03184E−03 | |
| 11 | 2.44840E−02 | −8.92772E−03 | 9.75016E−04 |
| 12 | −2.84359E−02 | 2.74025E−02 | 5.99208E−05 |
| 13 | −5.27760E−03 | −9.41927E−04 | 4.80805E−04 |
| 14 | −4.79025E−03 | 2.27861E−03 | −3.54821E−04 |
| 15 | −1.39902E−04 | −2.80100E−05 | |
| 16 | −7.61052E−04 | 5.05100E−05 | |
| 17 | 1.36618E−04 | −8.92466E−06 | |

TABLE 4A

Optical data for embodiment 4 shown in FIGS. 10-12
f = 4.10 mm, Fno = 1.80, HFOV = 38.8 deg, TTL = 5.8 mm

| $S_i$ | Component | $R_i$ | Shape | $D_i$ | Material | $N_d$ | $V_d$ | $f_l$ |
|---|---|---|---|---|---|---|---|---|
| 0 | Object plane | INF | FLT | INF | | | | |
| 1 | | INF | FLT | 0.0000 | | | | |
| 2 | | INF | FLT | 0.0000 | | | | |
| 3 | | INF | FLT | 0.0000 | | | | |
| 4 | $L_1$ wafer lens | 3.264 | ASP | 0.2655 | Polymer | 1.514 | 54.6 | 4.22 |
| 5 | Aperture stop | INF | FLT | 0.2100 | Glass | 1.459 | 67.9 | |
| | $L_1$ substrate | | | 0.0000 | | | | |
| 6 | $L_1$ wafer lens | INF | FLT | 0.2961 | Polymer | 1.514 | 54.6 | |
| 7 | | −5.997 | ASP | 0.1000 | | | | |
| 8 | $L_2$ | 4.123 | ASP | 0.3000 | Plastic | 1.642 | 22.4 | −6.41 |
| 9 | | 2.009 | ASP | 0.4160 | | | | |
| 10 | $L_3$ | 7.034 | ASP | 0.7531 | Plastic | 1.545 | 55.9 | 8.10 |
| 11 | | −11.508 | ASP | 0.2000 | | | | |
| 12 | $L_4$ | −1.819 | ASP | 0.5294 | Plastic | 1.545 | 55.9 | 26.40 |
| 13 | | −1.782 | ASP | 0.1000 | | | | |
| 14 | $L_5$ | 1.908 | ASP | 0.7100 | Plastic | 1.545 | 55.9 | 10.56 |
| 15 | | 2.474 | ASP | 0.6200 | | | | |
| 16 | $L_6$ | −143.732 | ASP | 0.4000 | Plastic | 1.642 | 22.4 | −4.56 |
| 17 | | 3.014 | ASP | 0.1617 | | | | |
| 18 | IR filter | INF | FLT | 0.2000 | Glass | 1.516 | 64.1 | |
| 19 | | INF | FLT | 0.5383 | | | | |
| 20 | Image plane | INF | FLT | 0.0000 | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component
Design wavelengths: 650 nm, 610 nm, 555 nm, 510 nm, 470 nm

TABLE 4B

Aspheric coefficients for embodiment 4

| $S_i$ | c | K | A | B | C |
|---|---|---|---|---|---|
| 4 | 0.30636552 | 0 | −5.49659E−04 | −1.94135E−02 | 1.46062E−02 |
| 7 | −0.16674053 | 0 | 4.44902E−03 | −4.58763E−03 | −1.71930E−02 |
| 8 | 0.24256094 | 0 | −1.11588E−01 | 1.21961E−01 | −1.28328E−01 |
| 9 | 0.49771381 | 0 | −1.58419E−01 | 1.52120E−01 | −1.41908E−01 |
| 10 | 0.14216545 | 0 | −6.45028E−02 | 1.19684E−02 | 2.51976E−03 |
| 11 | −0.08689695 | 0 | −6.58575E−04 | −4.36637E−02 | −9.87431E−03 |
| 12 | −0.54974671 | 0 | 2.39432E−01 | −1.97502E−01 | 1.12117E−01 |
| 13 | −0.56129680 | 0 | 6.03550E−02 | −2.08599E−02 | 2.47274E−02 |
| 14 | 0.52416039 | 0 | −1.19833E−01 | 1.91819E−02 | −3.09786E−03 |
| 15 | 0.40414921 | 0 | −2.45426E−02 | −1.31263E−02 | 2.60935E−03 |
| 16 | −0.00695738 | 0 | −3.03299E−02 | −4.85877E−03 | 3.83284E−03 |
| 17 | 0.33179200 | 0 | −7.00772E−02 | 8.42318E−03 | −1.05602E−03 |

TABLE 4B-continued

Aspheric coefficients for embodiment 4

| $S_i$ | D | E | F |
|---|---|---|---|
| 4 | −8.40756E−03 | | |
| 7 | 4.12375E−03 | | |
| 8 | 5.08025E−02 | −5.83535E−03 | −1.15956E−04 |
| 9 | 6.71637E−02 | −1.60902E−02 | 1.68568E−03 |
| 10 | −3.87681E−03 | 1.03184E−03 | |
| 11 | 2.44840E−02 | −8.92772E−03 | 9.75016E−04 |
| 12 | −2.84359E−02 | 2.74025E−03 | 5.99208E−05 |
| 13 | −5.27760E−03 | −9.41927E−04 | 4.80805E−04 |
| 14 | −4.79025E−03 | 2.27861E−03 | −3.54821E−04 |
| 15 | −1.39902E−04 | −2.80100E−05 | |
| 16 | −7.61052E−04 | 5.05100E−05 | |
| 17 | 1.36618E−04 | −8.92466E−06 | |

TABLE 5A

Optical data for embodiment 5 shown in FIGS. 13-15
f = 4.10 mm, Fno = 1.80, HFOV = 38.8 deg, TTL = 5.809 mm

| $S_i$ | Component | $R_i$ | Shape | $D_i$ | Material | $N_d$ | $V_d$ | $f_i$ |
|---|---|---|---|---|---|---|---|---|
| 0 | Object plane | INF | FLT | INF | | | | |
| 1 | | INF | FLT | 0.1500 | | | | |
| 2 | Aperture Stop | INF | FLT | −0.1500 | | | | |
| 3 | | INF | FLT | 0.0000 | | | | |
| 4 | $L_1$ wafer lens | 3.536 | ASP | 0.2502 | Polymer | 1.514 | 54.6 | 4.44 |
| 5 | $L_1$ substrate | INF | FLT | 0.2000 | Glass | 1.523 | 54.5 | |
| 6 | $L_1$ wafer lens | INF | FLT | 0.3000 | Polymer | 1.514 | 54.6 | |
| 7 | | −5.987 | ASP | 0.1011 | | | | |
| 8 | $L_2$ | 3.767 | ASP | 0.3000 | Plastic | 1.642 | 22.4 | −6.62 |
| 9 | | 1.942 | ASP | 0.4589 | | | | |
| 10 | $L_3$ | 6.162 | ASP | 0.6772 | Plastic | 1.545 | 55.9 | 7.30 |
| 11 | | −10.884 | ASP | 0.2303 | | | | |
| 12 | $L_4$ | −1.818 | ASP | 0.5769 | Plastic | 1.545 | 55.9 | 26.04 |
| 13 | | −1.793 | ASP | 0.1000 | | | | |
| 14 | $L_5$ | 1.925 | ASP | 0.7145 | Plastic | 1.545 | 55.9 | 10.95 |
| 15 | | 2.466 | ASP | 0.7000 | | | | |
| 16 | $L_6$ | −60.978 | ASP | 0.3000 | Plastic | 1.642 | 22.4 | −4.46 |
| 17 | | 3.034 | ASP | 0.2064 | | | | |
| 18 | IR filter | INF | FLT | 0.2000 | Glass | 1.516 | 64.1 | |
| 19 | | INF | FLT | 0.4936 | | | | |
| 20 | Image plane | INF | FLT | 0.0000 | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_i$: focal length of lens component
Design wavelengths: 650 nm, 610 nm, 555 nm, 510 nm, 470 nm

TABLE 5B

Aspheric coefficients for embodiment 5

| $S_i$ | c | K | A | B | C |
|---|---|---|---|---|---|
| 4 | 0.28280877 | 0 | −1.50475E−03 | −1.40582E−02 | 9.69797E−03 |
| 7 | −0.16701613 | 0 | 1.39148E−02 | −6.91190E−03 | −1.75341E−02 |
| 8 | 0.26544972 | 0 | −1.04295E−01 | 1.12965E−01 | −1.21551E−01 |
| 9 | 0.51486288 | 0 | −1.59244E−01 | 1.44680E−01 | −1.30340E−01 |
| 10 | 0.16228073 | 0 | −5.69215E−02 | 4.72225E−06 | 1.13604E−02 |
| 11 | −0.09188138 | 0 | 1.18962E−02 | −4.90515E−02 | −5.17486E−03 |
| 12 | −0.55011630 | 0 | 2.49732E−01 | −1.96532E−01 | 1.09648E−01 |
| 13 | −0.55778804 | 0 | 6.74387E−02 | −2.69490E−02 | 2.34045E−02 |
| 14 | 0.51943600 | 0 | −1.09990E−01 | 9.30399E−03 | 2.30891E−03 |
| 15 | 0.40559696 | 0 | −2.69307E−02 | −1.23070E−02 | 2.60935E−03 |
| 16 | −0.01639926 | 0 | −3.57117E−02 | −4.58896E−03 | 3.87766E−03 |
| 17 | 0.32960394 | 0 | −7.50685E−02 | 9.06250E−03 | −9.94141E−04 |

TABLE 5B-continued

Aspheric coefficients for embodiment 5

| $S_i$ | D | E | F |
|---|---|---|---|
| 4 | −6.08580E−03 | | |
| 7 | 4.69879E−03 | | |
| 8 | 4.71812E−02 | −6.53804E−03 | 4.94216E−04 |
| 9 | 5.62430E−02 | −1.07063E−02 | 6.53201E−04 |
| 10 | −1.31272E−03 | −2.22092E−04 | |
| 11 | 2.57927E−02 | −9.36247E−03 | 9.75016E−04 |
| 12 | −2.84398E−02 | 3.08408E−03 | 1.01345E−05 |
| 13 | −4.94994E−03 | −1.05322E−03 | 5.22163E−04 |
| 14 | −5.92646E−03 | 2.17124E−03 | −3.07418E−04 |
| 15 | −2.16879E−04 | −1.45797E−05 | |
| 16 | −7.37169E−04 | 4.68569E−05 | |
| 17 | 1.17801E−04 | −7.78831E−06 | |

TABLE 6A

Optical data for embodiment 6 shown in FIGS. 16-18
f = 4.10 mm, Fno = 1.80, HFOV = 38.8 deg, TTL = 5.809 mm

| $S_i$ | Component | $R_i$ | Shape | $D_i$ | Material | $N_d$ | $V_d$ | $f_l$ |
|---|---|---|---|---|---|---|---|---|
| 0 | Object plane | INF | FLT | INF | | | | |
| 1 | | INF | FLT | 0.0000 | | | | |
| 2 | | INF | FLT | 0.0000 | | | | |
| 3 | | INF | FLT | 0.0000 | | | | |
| 4 | $L_1$ wafer lens | 3.536 | ASP | 0.2502 | Polymer | 1.514 | 54.6 | 4.44 |
| 5 | Aperture stop | INF | FLT | 0.2000 | Glass | 1.523 | 54.5 | |
| | $L_1$ substrate | | | 0.0000 | | | | |
| 6 | $L_1$ wafer lens | INF | FLT | 0.3000 | Polymer | 1.514 | 54.6 | |
| 7 | | −5.987 | ASP | 0.1011 | | | | |
| 8 | $L_2$ | 3.767 | ASP | 0.3000 | Plastic | 1.642 | 22.4 | −6.62 |
| 9 | | 1.942 | ASP | 0.4589 | | | | |
| 10 | $L_3$ | 6.162 | ASP | 0.6772 | Plastic | 1.545 | 55.9 | 7.30 |
| 11 | | −10.884 | ASP | 0.2303 | | | | |
| 12 | $L_4$ | −1.818 | ASP | 0.5769 | Plastic | 1.545 | 55.9 | 26.04 |
| 13 | | −1.793 | ASP | 0.1000 | | | | |
| 14 | $L_5$ | 1.925 | ASP | 0.7145 | Plastic | 1.545 | 55.9 | 10.95 |
| 15 | | 2.466 | ASP | 0.7000 | | | | |
| 16 | $L_6$ | −60.978 | ASP | 0.3000 | Plastic | 1.642 | 22.4 | −4.46 |
| 17 | | 3.034 | ASP | 0.2064 | | | | |
| 18 | IR filter | INF | FLT | 0.2000 | Glass | 1.516 | 64.1 | |
| 19 | | INF | FLT | 0.4936 | | | | |
| 20 | Image plane | INF | FLT | 0.0000 | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component
Design wavelengths: 650 nm, 610 nm, 555 nm, 510 nm, 470 nm

TABLE 6B

Aspheric coefficients for embodiment 6

| $S_i$ | c | K | A | B | C |
|---|---|---|---|---|---|
| 4 | 0.28280877 | 0 | −1.50475E−03 | −1.40582E−02 | 9.69797E−03 |
| 7 | −0.16701613 | 0 | 1.39148E−02 | −6.91190E−03 | −1.75341E−02 |
| 8 | 0.26544972 | 0 | −1.04295E−01 | 1.12965E−01 | −1.21551E−01 |
| 9 | 0.51486288 | 0 | −1.59244E−01 | 1.44680E−01 | −1.30340E−01 |
| 10 | 0.16228073 | 0 | −5.69215E−02 | 4.72225E−06 | 1.13604E−02 |
| 11 | −0.09188138 | 0 | 1.19962E−02 | −4.90515E−02 | −5.17486E−03 |
| 12 | −0.55011630 | 0 | 2.49732E−01 | −1.96532E−01 | 1.09648E−01 |
| 13 | −0.55778804 | 0 | 6.74387E−02 | −2.69490E−02 | 2.34045E−02 |
| 14 | 0.51943600 | 0 | −1.09990E−01 | 9.30399E−03 | 2.30891E−03 |
| 15 | 0.40559696 | 0 | −2.69307E−02 | −1.23070E−02 | 2.60935E−03 |
| 16 | −0.01639926 | 0 | −3.57117E−02 | −4.58896E−03 | 3.87766E−03 |
| 17 | 0.32960394 | 0 | −7.50685E−02 | 9.06250E−03 | −9.94141E−04 |

TABLE 6B-continued

Aspheric coefficients for embodiment 6

| $S_i$ | D | E | F |
|---|---|---|---|
| 4 | −6.08580E−03 | | |
| 7 | 4.69879E−03 | | |
| 8 | 4.71812E−02 | −6.53804E−03 | 4.94216E−04 |
| 9 | 5.62430E−02 | −1.07063E−02 | 6.53201E−04 |
| 10 | −1.31272E−03 | −2.22092E−04 | |
| 11 | 2.57927E−02 | −9.36247E−03 | 9.75016E−04 |
| 12 | −2.84398E−02 | 3.08408E−03 | 1.01345E−05 |
| 13 | −4.94994E−03 | −1.05322E−03 | 5.22163E−04 |
| 14 | −5.92646E−03 | 2.17124E−03 | −3.07418E−04 |
| 15 | −2.16879E−04 | −1.45797E−05 | |
| 16 | −7.37169E−04 | 4.68569E−05 | |
| 17 | 1.17801E−04 | −7.78831E−06 | |

TABLE 7A

Optical data for embodiment 7 shown in FIGS. 19-21
f = 4.10 mm, Fno = 2.00, HFOV = 38.9 deg, TTL = 5.75 mm

| $S_i$ | Component | $R_i$ | Shape | $D_i$ | Material | $N_d$ | $V_d$ | $f_l$ |
|---|---|---|---|---|---|---|---|---|
| 0 | Object plane | INF | FLT | INF | | | | |
| 1 | | INF | FLT | 0.1000 | | | | |
| 2 | Aperture Stop | INF | FLT | −0.1000 | | | | |
| 3 | | INF | FLT | 0.0000 | | | | |
| 4 | $L_1$ | 2.927 | ASP | 0.7540 | Plastic | 1.545 | 55.9 | 3.94 |
| 5 | | −7.462 | ASP | 0.1004 | | | | |
| 6 | $L_2$ | 21.63 | ASP | 0.3200 | Plastic | 1.642 | 22.4 | −7.13 |
| 7 | | 3.783 | ASP | 0.4857 | | | | |
| 8 | $L_3$ | 6.353 | ASP | 0.5760 | Plastic | 1.545 | 55.9 | 103.38 |
| 9 | | 6.928 | ASP | 0.2314 | | | | |
| 10 | $L_4$ | −3.056 | ASP | 0.6505 | Plastic | 1.545 | 55.9 | 7.05 |
| 11 | | −1.833 | ASP | 0.1001 | | | | |
| 12 | $L_5$ | 2.06 | ASP | 0.7118 | Plastic | 1.545 | 55.9 | 11.55 |
| 13 | | 2.683 | ASP | 0.6000 | | | | |
| 14 | $L_6$ | −12.755 | ASP | 0.3200 | Plastic | 1.642 | 22.4 | −4.00 |
| 15 | | 3.283 | ASP | 0.3497 | | | | |
| 16 | IR filter | INF | FLT | 0.2000 | Glass | 1.516 | 64.1 | |
| 17 | | INF | FLT | 0.3503 | | | | |
| 18 | Image plane | INF | FLT | 0.0000 | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component
Design wavelengths: 650 nm, 610 nm, 555 nm, 510 nm, 470 nm

TABLE 7B

Aspheric coefficients for embodiment 7

| $S_i$ | c | K | A | B | C |
|---|---|---|---|---|---|
| 4 | 0.34170254 | 0 | −5.24592E−03 | −2.52093E−02 | 2.22410E−02 |
| 5 | −0.13401359 | 0 | −5.67166E−02 | 4.22624E−02 | −4.90450E−02 |
| 6 | 0.04623186 | 0 | −1.23909E−01 | 1.62520E−01 | −1.52104E−01 |
| 7 | 0.26435256 | 0 | −1.16169E−01 | 1.44632E−01 | −1.18920E−01 |
| 8 | 0.15739955 | 0 | −1.23371E−01 | 2.90183E−01 | −4.96919E−02 |
| 9 | 0.14433149 | 0 | −2.17615E−02 | −5.58962E−02 | 2.12051E−02 |
| 10 | −0.32725905 | 0 | 1.84854E−01 | −1.69669E−01 | 6.37742E−02 |
| 11 | −0.54569396 | 0 | 2.49552E−02 | −1.15589E−02 | 3.66118E−03 |
| 12 | 0.48554219 | 0 | −1.13966E−01 | 5.14297E−02 | 1.17551E−03 |
| 13 | 0.37272941 | 0 | −3.63398E−02 | −5.76586E−03 | 1.71744E−03 |
| 14 | −0.07840018 | 0 | −1.42030E−02 | −2.40083E−04 | 3.96810E−04 |
| 15 | 0.30461492 | 0 | −5.17864E−02 | 3.77687E−03 | 6.71947E−05 |

| $S_i$ | D | E | F |
|---|---|---|---|
| 4 | −1.74366E−02 | | |
| 5 | 1.05678E−02 | | |
| 6 | 6.24354E−02 | −7.57519E−03 | |

TABLE 7B-continued

Aspheric coefficients for embodiment 7

| | | |
|---|---|---|
| 7 | 5.13912E−02 | −8.26591E−03 |
| 8 | 4.57293E−04 | |
| 9 | −2.21788E−03 | −5.98601E−04 |
| 10 | −9.07999E−03 | 2.28743E−04 |
| 11 | 1.75784E−03 | |
| 12 | −6.47208E−04 | |
| 13 | −2.36109E−04 | |
| 14 | −6.89044E−05 | |
| 15 | −2.40595E−05 | |

TABLE 8A

Optical data for embodiment 8 shown in FIGS. 22-24
f = 4.10 mm, Fno = 2.00, HFOV = 37.0 deg, TTL = 5.799 mm

| $S_i$ | Component | $R_i$ | Shape | $D_i$ | Material | $N_d$ | $V_d$ | $f_i$ |
|---|---|---|---|---|---|---|---|---|
| 0 | Object plane | INF | FLT | INF | | | | |
| 1 | | INF | FLT | 0.0000 | | | | |
| 2 | | INF | FLT | 0.0000 | | | | |
| 3 | | INF | FLT | 0.0000 | | | | |
| 4 | $L_1w_1$ wafer lens | 3.602 | ASP | 0.2500 | Polymer | 1.514 | 54.6 | 5.71 |
| 5 | $L_1w_1$ substrate | INF | FLT | 0.2000 | Glass | 1.523 | 54.5 | |
| 6 | Aperture stop | INF | FLT | 0.0300 | EC* | 1.472 | 65.5 | |
| 7 | $L_1w_2$ substrate | INF | FLT | 0.2000 | Glass | 1.523 | 54.5 | |
| 8 | $L_1w_2$ wafer lens | INF | FLT | 0.1800 | Polymer | 1.514 | 54.6 | |
| 9 | | −14.733 | ASP | 0.1000 | | | | |
| 10 | $L_2$ | 3.108 | ASP | 0.3000 | Plastic | 1.636 | 23.9 | −5.01 |
| 11 | | 1.519 | ASP | 0.1000 | | | | |
| 12 | $L_3$ | 2.054 | ASP | 0.8551 | Plastic | 1.545 | 55.9 | 3.80 |
| 13 | | 146.849 | ASP | 0.4522 | | | | |
| 14 | $L_4$ | −1.509 | ASP | 0.4698 | Plastic | 1.545 | 55.9 | 59.78 |
| 15 | | −1.601 | ASP | 0.0500 | | | | |
| 16 | $L_5$ | 2.142 | ASP | 0.8256 | Plastic | 1.545 | 55.9 | 16.61 |
| 17 | | 2.422 | ASP | 0.3702 | | | | |
| 18 | $L_6$ | 19.579 | ASP | 0.5165 | Plastic | 1.651 | 21.5 | −5.90 |
| 19 | | 3.201 | ASP | 0.2941 | | | | |
| 20 | IR filter | INF | FLT | 0.2000 | Glass | 1.516 | 64.1 | |
| 21 | | INF | FLT | 0.4059 | | | | |
| 22 | Image plane | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_i$: focal length of lens component
*EC: electrochromic media, modeled data, exact data unavailable
Design wavelengths: 650 nm, 610 nm, 555 nm, 510 nm, 470 nm

TABLE 8B

Aspheric coefficients for embodiment 8

| $S_i$ | c | K | A | B | C |
|---|---|---|---|---|---|
| 4 | 0.27762165 | 0 | −1.53046E−02 | −8.81942E−03 | 3.94984E−04 |
| 9 | −0.06787259 | 0 | 3.00793E−02 | −1.15440E−01 | 6.60296E−02 |
| 10 | 0.32175841 | 0 | −9.75184E−03 | −6.65000E−02 | 2.02022E−02 |
| 11 | 0.65851378 | 0 | −1.61474E−01 | 1.03269E−01 | −9.69970E−02 |
| 12 | 0.48678203 | 0 | −9.82156E−02 | 5.69474E−02 | −1.58593E−02 |
| 13 | 0.00680969 | 0 | 1.59563E−02 | −5.08762E−02 | 2.21621E−02 |
| 14 | −0.66259823 | 0 | 2.42440E−01 | −2.41260E−01 | 1.39617E−01 |
| 15 | 0.62449088 | 0 | 6.43812E−02 | −5.81055E−02 | 2.94540E−02 |
| 16 | 0.46675448 | 0 | −1.42411E−01 | 2.31785E−01 | −1.45856E−01 |
| 17 | 0.41280238 | 0 | −4.85666E−02 | −1.23605E−02 | 4.79435E−03 |
| 18 | 0.05107600 | 0 | −7.24467E−02 | 2.03904E−02 | −9.89985E−04 |
| 19 | 0.31240283 | 0 | −9.72346E−02 | 2.07161E−02 | −2.06560E−03 |

| $S_i$ | D | E | F |
|---|---|---|---|
| 4 | −1.84415E−03 | | |
| 9 | −1.47681E−02 | −1.06832E−04 | |
| 10 | 2.69213E−03 | −1.85232E−03 | |

TABLE 8B-continued

Aspheric coefficients for embodiment 8

| | | |
|---|---|---|
| 11 | 4.36120E−02 | −9.94064E−03 |
| 12 | −2.38579E−04 | |
| 13 | −5.45726E−03 | |
| 14 | −3.45297E−02 | 4.26712E−03 |
| 15 | 1.16857E−03 | |
| 16 | 6.01874E−03 | −1.34223E−03 |
| 17 | −6.37472E−04 | |
| 18 | −3.64897E−04 | 3.40631E−05 |
| 19 | 6.29097E−05 | |

TABLE 9A

Optical data for embodiment 9 shown in FIGS. 25-27
f = 4.10 mm, Fno = 1.80, HFOV = 38.8 deg, TTL = 5.802 mm

| $S_i$ | Component | $R_i$ | Shape | $D_i$ | Material | $N_d$ | $V_d$ | $f_i$ |
|---|---|---|---|---|---|---|---|---|
| 0 | Object plane | INF | FLT | INF | | | | |
| 1 | | INF | FLT | 0.0000 | | | | |
| 2 | | INF | FLT | 0.0000 | | | | |
| 3 | | INF | FLT | 0.0000 | | | | |
| 4 | $L_1w_1$ wafer lens | 3.602 | ASP | 0.2500 | Polymer | 1.514 | 54.6 | 5.71 |
| 5 | $L_1w_1$ substrate | INF | FLT | 0.2000 | Glass | 1.523 | 54.5 | |
| 6 | Aperture stop | INF | FLT | 0.0300 | EC* | 1.472 | 65.5 | |
| 7 | $L_1w_2$ substrate | INF | FLT | 0.2000 | Glass | 1.523 | 54.5 | |
| 8 | $L_1w_2$ wafer lens | INF | FLT | 0.1800 | Polymer | 1.514 | 54.6 | |
| 9 | | −14.733 | ASP | 0.1000 | | | | |
| 10 | $L_2$ | 3.097 | ASP | 0.3000 | Plastic | 1.636 | 23.9 | −4.99 |
| 11 | | 1.513 | ASP | 0.1000 | | | | |
| 12 | $L_3$ | 1.969 | ASP | 0.8551 | Plastic | 1.545 | 55.9 | 3.88 |
| 13 | | 23.261 | ASP | 0.4281 | | | | |
| 14 | $L_4$ | −1.543 | ASP | 0.4698 | Plastic | 1.545 | 55.9 | 44.98 |
| 15 | | −1.609 | ASP | 0.0500 | | | | |
| 16 | $L_5$ | 2.19 | ASP | 0.8256 | Plastic | 1.545 | 55.9 | 16.33 |
| 17 | | 2.516 | ASP | 0.3939 | | | | |
| 18 | $L_6$ | 14.835 | ASP | 0.5165 | Plastic | 1.651 | 21.5 | −5.89 |
| 19 | | 3.025 | ASP | 0.2941 | | | | |
| 20 | IR filter | INF | FLT | 0.2000 | Glass | 1.516 | 64.1 | |
| 21 | | INF | FLT | 0.4059 | | | | |
| 22 | Image plane | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_i$: focal length of lens component
*EC: electrochromic media, modeled data, exact data unavailable
Design wavelengths: 650 nm, 610 nm, 555 nm, 510 nm, 470 nm

TABLE 9B

Aspheric coefficients for embodiment 9

| $S_i$ | c | K | A | B | C |
|---|---|---|---|---|---|
| 4 | 0.27762165 | 0 | −1.61133E−02 | −6.12050E−03 | −1.40968E−03 |
| 9 | −0.06787259 | 0 | 2.73873E−02 | −1.20496E+00 | 7.48179E−02 |
| 10 | 0.32291254 | 0 | −1.68170E−02 | −6.27849E−02 | 1.83515E−02 |
| 11 | 0.66076459 | 0 | −1.70112E−01 | 1.03415E−01 | −9.49920E−02 |
| 12 | 0.50778700 | 0 | −1.07302E−01 | 5.48757E−02 | −1.74288E−02 |
| 13 | 0.04298967 | 0 | 2.32408E−02 | −4.98282E−02 | 2.36758E−02 |
| 14 | −0.64788520 | 0 | 2.51197E−01 | −2.33783E−01 | 1.40417E−01 |
| 15 | −0.62167595 | 0 | 6.23081E−02 | −5.26817E−02 | 2.74941E−02 |
| 16 | 0.45651821 | 0 | −1.42448E−01 | 2.21766E−01 | −1.49025E−02 |
| 17 | 0.39744364 | 0 | −4.42719E−02 | −1.66528E−02 | 6.54516E−03 |
| 18 | 0.06740787 | 0 | −7.53034E−02 | 1.53727E−02 | 5.64255E−04 |
| 19 | 0.33063134 | 0 | −1.04407E−01 | 2.13734E−02 | −2.23191E−03 |

| $S_i$ | D | E | F |
|---|---|---|---|
| 4 | −1.54698E−03 | | |
| 9 | −1.87366E−02 | −1.06824E−04 | |
| 10 | 6.11101E−03 | −3.89990E−03 | |

TABLE 9B-continued

Aspheric coefficients for embodiment 9

| | | |
|---|---|---|
| 11 | 4.29889E-02 | -9.96789E-03 |
| 12 | 6.93913E-04 | |
| 13 | -5.97372E-03 | |
| 14 | -3.51704E-02 | 3.87289E-03 |
| 15 | 1.20392E-03 | |
| 16 | 6.57234E-03 | -1.53369E-03 |
| 17 | -8.90249E-04 | |
| 18 | -5.00299E-04 | 1.35185E-05 |
| 19 | 6.63282E-05 | |

TABLE 10A

Optical data for embodiment 10 shown in FIGS. 28-30
f = 4.10 mm, Fno = 2.20, HFOV = 37.0 deg, TTL = 5.500 mm

| $S_i$ | Component | $R_i$ | Shape | $D_i$ | Material | $N_d$ | $V_d$ | $f_l$ |
|---|---|---|---|---|---|---|---|---|
| 0 | Object plane | INF | FLT | INF | | | | |
| 1 | | INF | FLT | 0.0000 | | | | |
| 2 | | INF | FLT | 0.0000 | | | | |
| 3 | | INF | FLT | 0.0000 | | | | |
| 4 | L1 wafer lens | 4.478 | ASP | 0.2000 | Polymer | 1.514 | 54.6 | 8.69 |
| 5 | L1 substrate | INF | FLT | 0.2000 | Glass | 1.523 | 54.5 | |
| 6 | Aperture stop | INF | FLT | 0.1000 | | | | |
| 7 | L2 | 9.759 | ASP | 0.5177 | Plastic | 1.535 | 56.3 | 6.94 |
| 8 | | -5.915 | ASP | 0.1001 | | | | |
| 9 | L3 | 2.884 | ASP | 0.3001 | Plastic | 1.651 | 21.5 | -5.57 |
| 10 | | 1.546 | ASP | 0.2844 | | | | |
| 11 | L4 | 5.506 | ASP | 0.7508 | Plastic | 1.552 | 55.9 | 6.47 |
| 12 | | -9.433 | ASP | 0.5684 | | | | |
| 13 | L5 | 3.116 | ASP | 0.5181 | Plastic | 1.552 | 55.9 | 105.09 |
| 14 | | 3.101 | ASP | 0.3071 | | | | |
| 15 | L6 | 2.503 | ASP | 0.7539 | Plastic | 1.552 | 55.9 | -7.58 |
| 16 | | 1.395 | ASP | 0.3500 | | | | |
| 17 | IR filter | INF | FLT | 0.2000 | Glass | 1.516 | 64.1 | |
| 18 | | INF | FLT | 0.3500 | | | | |
| 19 | Image plane | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component
Design wavelengths: 650 nm, 610 nm, 555 nm, 510 nm, 470 nm

TABLE 10B

Aspheric coefficients for embodiment 10

| $S_i$ | c | K | A | B | C |
|---|---|---|---|---|---|
| 4 | 0.22331141 | 0 | -2.16361E-02 | 1.62943E-03 | 2.20577E-03 |
| 7 | 0.10246718 | 0 | 1.34699E-02 | -2.19748E-02 | -8.03120E-03 |
| 8 | -0.16905894 | 0 | 4.88659E-02 | -1.03574E-01 | 6.07549E-02 |
| 9 | 0.34673568 | 0 | -5.23701E-02 | -7.61703E-03 | -4.37841E-03 |
| 10 | 0.64691942 | 0 | -1.48485E-01 | 1.00325E-01 | -1.05525E-01 |
| 11 | 0.18160645 | 0 | -2.65234E-02 | 4.25966E-02 | -2.05494E-02 |
| 12 | -0.10600724 | 0 | -5.50676E-02 | -6.70601E-03 | 2.69608E-02 |
| 13 | 0.32095787 | 0 | 2.35762E-03 | -8.58559E-02 | 4.01230E-02 |
| 14 | 0.32250676 | 0 | 2.05244E-02 | -5.45955E-02 | 2.05671E-02 |
| 15 | 0.39950240 | 0 | -2.11619E-01 | 6.92158E-02 | -7.38029E-03 |
| 16 | 0.71701343 | -5.04077888 | -7.81914E-02 | 2.25263E-02 | -4.35741E-03 |

| $S_i$ | D | E | F |
|---|---|---|---|
| 4 | -5.89599E-04 | | |
| 7 | 3.23003E-03 | | |
| 8 | -1.40560E-02 | | |
| 9 | 1.36806E-02 | 1.28286E-04 | -2.29763E-03 |

TABLE 10B-continued

| | Aspheric coefficients for embodiment 10 | | |
|---|---|---|---|
| 10 | 5.74088E−02 | −1.13118E−02 | −1.17832E−03 |
| 11 | 3.99115E−03 | 4.30409E−03 | −1.59654E−03 |
| 12 | −9.98028E−03 | −2.24427E−03 | 2.55090E−03 |
| 13 | −1.60232E−02 | 3.18830E−03 | −3.78718E−04 |
| 14 | −2.81978E−03 | −5.17012E−05 | 2.02126E−05 |
| 15 | −1.89401E−04 | −1.00294E−04 | 2.23299E−05 |
| 16 | 4.44412E−04 | −1.82311E−05 | |

TABLE 11A

Optical data for embodiment 11 shown in FIGS. 31-33
f = 4.10 mm, Fno = 2.00, HFOV = 37.0 deg, TTL = 5.500 mm

| $S_i$ | Component | $R_i$ | Shape | $D_i$ | Material | $N_d$ | $V_d$ | $f_l$ |
|---|---|---|---|---|---|---|---|---|
| 0 | Object plane | INF | FLT | INF | | | | |
| 1 | | INF | FLT | 0.0000 | | | | |
| 2 | | INF | FLT | 0.0000 | | | | |
| 3 | | INF | FLT | 0.0000 | | | | |
| 4 | L1 wafer lens | 4.565 | ASP | 0.2000 | Polymer | 1.514 | 54.6 | 8.86 |
| 5 | L1 substrate | INF | FLT | 0.2000 | Glass | 1.523 | 54.5 | |
| 6 | Aperture stop | INF | FLT | 0.1000 | | | | |
| 7 | L2 | 8.824 | ASP | 0.5299 | Plastic | 1.535 | 56.3 | 6.67 |
| 8 | | −5.914 | ASP | 0.1000 | | | | |
| 9 | L3 | 4.111 | ASP | 0.3000 | Plastic | 1.651 | 21.5 | −6.08 |
| 10 | | 1.966 | ASP | 0.5047 | | | | |
| 11 | L4 | 6.027 | ASP | 0.6550 | Plastic | 1.552 | 55.9 | 9.37 |
| 12 | | −32.798 | ASP | 0.4444 | | | | |
| 13 | L5 | 2.172 | ASP | 0.4040 | Plastic | 1.552 | 55.9 | 9.14 |
| 14 | | 3.589 | ASP | 0.4888 | | | | |
| 15 | L6 | 3.504 | ASP | 0.6734 | Plastic | 1.552 | 55.9 | −4.47 |
| 16 | | 1.342 | ASP | 0.3500 | | | | |
| 17 | IR filter | INF | FLT | 0.2000 | Glass | 1.516 | 64.1 | |
| 18 | | INF | FLT | 0.3500 | | | | |
| 19 | Image plane | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component
Design wavelengths: 650 nm, 610 nm, 555 nm, 510 nm, 470 nm

TABLE 11B

| | Aspheric coefficients for embodiment 11 | | | | |
|---|---|---|---|---|---|
| $S_i$ | c | K | A | B | C |
| 4 | 0.21904221 | 0 | −3.53205E−02 | 7.40469E−03 | −2.35244E−04 |
| 7 | 0.11332407 | 0 | 5.62394E−02 | −4.52245E−02 | 8.03545E−03 |
| 8 | −0.16908705 | 0 | 4.17862E−02 | −1.08919E−01 | 5.55381E−02 |
| 9 | 0.24325145 | 0 | −1.18168E−01 | 1.12603E−04 | −1.95298E−03 |
| 10 | 0.50853109 | 0 | −1.83974E−01 | 1.10144E−01 | −9.96899E−02 |
| 11 | 0.16593012 | 0 | −4.17040E−02 | 3.45716E−02 | −1.41134E−02 |
| 12 | −0.03048947 | 0 | −9.28217E−02 | 2.80591E−02 | 7.80852E−03 |
| 13 | 0.46037044 | 0 | 2.61662E−03 | −7.42071E−02 | 3.44516E−02 |
| 14 | 0.27865523 | 0 | 8.02350E−02 | −8.10489E−02 | 2.28301E−02 |
| 15 | 0.28542276 | 0 | −2.17443E−01 | 7.12621E−02 | −7.16745E−03 |
| 16 | 0.74529479 | −5.0919178 | −8.43477E−02 | 2.62584E−02 | −5.11070E−03 |

| $S_i$ | D | E | F |
|---|---|---|---|
| 4 | | | |
| 7 | −1.38925E−03 | −7.71100E−03 | |
| 8 | −1.86905E−02 | −3.38142E−04 | |
| 9 | 1.42282E−02 | −3.81412E−03 | 3.92806E−05 |
| 10 | 6.41426E−02 | −2.16768E−02 | 2.76549E−03 |
| 11 | −2.87396E−03 | 5.11498E−03 | −1.07184E−03 |
| 12 | −5.46666E−03 | −3.95604E−05 | 7.41611E−04 |
| 13 | −1.63290E−02 | 4.36408E−03 | −5.02876E−04 |
| 14 | −2.66925E−03 | 5.23517E−05 | −2.73421E−06 |
| 15 | −3.12518E−04 | −1.03896E−04 | 2.90063E−05 |
| 16 | 4.69322E−04 | −1.28516E−05 | −3.04910E−07 |

What is claimed is:

1. An optical imaging lens assembly comprising, in order sequentially from an object side to an image side: a first lens component with positive refractive power; a second lens component with negative refractive power; a third lens component with positive refractive power; a fourth lens component with positive refractive power; a fifth lens component with positive refractive power and a concave image side surface; and a sixth lens component with negative refractive power; wherein f is a focal length of the optical imaging lens assembly, $f_5$ is a focal length of the fifth lens component, $f_6$ is a focal length of the sixth lens component, and the following relations are satisfied:

$$0.2 < |f/f_5| < 0.4$$

$$|f/f_5| + |f/f_6| < 1.4.$$

2. The optical imaging lens assembly of claim 1 wherein the following further relation is satisfied:

$$0.5 < |f/f_5| + |f/f_6|.$$

3. The optical imaging lens assembly of claim 1 wherein the following further relation is satisfied:

$$0.9 < |f/f_5| + |f/f_6| < 1.3.$$

4. The optical imaging lens assembly of claim 1 wherein the following further relation is satisfied:

$$1.2 \leq |f/f_5| + |f/f_6| \leq 1.3.$$

5. The optical imaging lens assembly of claim 1 wherein the following further relation is satisfied:

$$0.9 \leq |f/f_5| + |f/f_6| \leq 1.0.$$

6. The optical imaging lens assembly of claim 1 wherein the first lens component includes a wafer lens having a lens element molded on a surface of a planar substrate.

7. The optical imaging lens assembly of claim 6 wherein the first lens component further includes an electrochromic surface on one surface of the planar substrate.

8. The optical imaging lens assembly of claim 1 wherein the first lens component includes two wafer lenses, each of the two wafer lenses having a lens element molded on only one surface of a planar substrate.

9. The optical imaging lens assembly of claim 8 wherein the first lens component further includes an electrochromic surface on one surface of the planar substrate of one of the two wafer lenses.

10. The optical imaging lens assembly of claim 1 wherein at least one of an object-side refracting surface or an image-side refracting surface of each of the six lens components is aspheric.

11. The optical imaging lens assembly of claim 1 wherein an object-side refracting surface and an image-side refracting surface of each of the six lens components are both aspheric.

12. An optical imaging lens assembly comprising, in order sequentially from an object side to an image side: a first lens component with positive refractive power; a second lens component with positive refractive power; a third lens component with negative refractive power; a fourth lens component with positive refractive power; a fifth lens component with positive refractive power and a concave image side surface; and a sixth lens component with negative refractive power; wherein f is a focal length of the optical imaging lens assembly, $f_5$ is a focal length of the fifth lens component, $f_6$ is a focal length of the sixth lens component, and the following relation is satisfied:

$$-0.6 < f/f_5 + f/f_6 < -0.4.$$

13. The optical imaging lens assembly of claim 12 wherein the following further relation is satisfied:

$$-0.5 < f/f_5 + f/f_6 < -0.4.$$

14. The optical imaging lens assembly of claim 12 wherein the following further relation is satisfied:

$$-0.6 < f/f_5 + f/f_6 < -0.5.$$

15. The optical imaging lens assembly of claim 12 wherein the first lens component includes a wafer lens having a lens element molded on a surface of a planar substrate.

16. The optical imaging lens assembly of claim 15 wherein the first lens component further includes an electrochromic surface on one surface of the planar substrate.

17. The optical imaging lens assembly of claim 12 wherein the first lens component includes two wafer lenses, each of the two wafer lenses having a lens element molded on only one surface of a planar substrate.

18. The optical imaging lens assembly of claim 17 wherein the first lens component further includes an electrochromic surface on one surface of the planar substrate of one of the two wafer lenses.

19. The optical imaging lens assembly of claim 12 wherein at least one of an object-side refracting surface or an image-side refracting surface of each of the six lens components is aspheric.

20. The optical imaging lens assembly of claim 12 wherein an object-side refracting surface and an image-side refracting surface of each of the six lens components are both aspheric.

21. A portable wireless communications device comprising: an outer housing; and a digital camera integrated inside the outer housing, the digital camera having an optical imaging lens assembly comprising, in order sequentially from an object side to an image side: a first lens component with positive refractive power; a second lens component with negative refractive power; a third lens component with positive refractive power; a fourth lens component with positive refractive power; a fifth lens component with positive refractive power and a concave image side surface; and a sixth lens component with negative refractive power; wherein f is a focal length of the optical imaging lens assembly, $f_5$ is a focal length of the fifth lens component, $f_6$ is a focal length of the sixth lens component, and the following relations are satisfied:

$$0.2 < |f/f_5| < 0.4$$

$$|f/f_5| + |f/f_6| < 1.4.$$

22. The portable wireless communications device of claim 21 wherein the following further relation is satisfied:

$$0.5 < |f/f_5| + |f/f_6|.$$

23. The portable wireless communications device of claim 21 wherein the optical imaging lens assembly has a total track length of less than 6 millimeters.

* * * * *